US005642128A

United States Patent [19]

Inoue

[11] Patent Number: 5,642,128

[45] Date of Patent: Jun. 24, 1997

[54] DISPLAY CONTROL DEVICE

[75] Inventor: Hiroshi Inoue, Yokohama, Japan

[73] Assignee: Canon Kabushiki Kaisha, Tokyo, Japan

[21] Appl. No.: 396,904

[22] Filed: Mar. 1, 1995

Related U.S. Application Data

[63] Continuation of Ser. No. 54,634, Apr. 30, 1993, abandoned, which is a continuation of Ser. No. 774,648, Oct. 15, 1991, abandoned, which is a continuation of Ser. No. 255,151, Sep. 30, 1988, abandoned.

[30] Foreign Application Priority Data

| | | | |
|---|---|---|---|
| Oct. 2, 1987 | [JP] | Japan | 62-247943 |
| Oct. 2, 1987 | [JP] | Japan | 62-247944 |
| Oct. 2, 1987 | [JP] | Japan | 62-247945 |

[51] Int. Cl.$^6$ .......... G09G 3/36; G02F 1/141

[52] U.S. Cl. .......... 345/96; 345/97

[58] Field of Search .......... 350/332, 333, 350/350 S; 340/784, 805; 359/55, 56, 85, 100; 345/94, 95, 96, 97, 209

[56] References Cited

U.S. PATENT DOCUMENTS

| | | | |
|---|---|---|---|
| 3,895,372 | 7/1975 | Kaji et al. | 359/86 |
| 4,413,256 | 11/1983 | Yasuda et al. | 350/333 |
| 4,638,310 | 1/1987 | Ayliffe | 340/805 |
| 4,645,303 | 2/1987 | Sekiya et al. | 350/332 |
| 4,705,345 | 11/1987 | Ayliffe et al. | 359/56 |
| 4,715,688 | 12/1987 | Harada et al. | 350/333 |
| 4,746,197 | 5/1988 | Endo et al. | 350/333 |
| 4,770,502 | 9/1988 | Kitazima et al. | 359/56 |
| 4,776,676 | 10/1988 | Inoue et al. | 350/350 S |
| 4,795,239 | 1/1989 | Yamashita et al. | 350/350 S |
| 4,830,467 | 5/1989 | Inoue et al. | 350/333 |
| 4,836,656 | 6/1989 | Mouri et al. | 359/56 |
| 4,844,590 | 7/1989 | Okada et al. | 350/350 S |
| 4,922,241 | 5/1990 | Inoue et al. | 350/350 S |
| 4,938,574 | 7/1990 | Kaneko et al. | 359/56 |
| 4,952,032 | 8/1990 | Inoue et al. | 350/332 |
| 5,041,821 | 8/1991 | Onitsuka et al. | 359/56 |
| 5,488,388 | 1/1996 | Taniguchi et al. | 359/56 |

FOREIGN PATENT DOCUMENTS 62-50732 3/1987 Japan .

*Primary Examiner*—William L. Sikes
*Assistant Examiner*—Tai V. Duong
*Attorney, Agent, or Firm*—Fitzpatrick, Cella, Harper & Scinto

[57] ABSTRACT

A display control device controls a display device provided with a group of scanning electrodes and a group of signal electrodes and a display element placed therebetween. A driver circuit applies a non-zero first scanning signal to a selected one of the group of scanning electrodes during a first period and applies a non-zero second scanning signal to the selected scanning electrode in a second period after the first period. The first and second scanning signals are applied to the selected scanning electrode when a driving signal is applied to a predetermined number of signal electrodes of the group of signal electrodes. The first and second periods are separated by a rest period, and a polarity of a portion of the first scanning signal immediately before the rest period is opposite to a polarity of a portion of the second scanning signal immediately after the rest period.

53 Claims, 58 Drawing Sheets

BUSY
CLK
D
CONNECTED TO 1
IRQ
FEN
DS0~DS1
611
FEN GENERATION UNIT
IRQ GENERATION UNIT
603
Tout
16 MHz OSC
1/2 DIVIDING
661
690
MULTIPLIER
DS1
MP GENERATION UNIT
MR
A/D
CLK
DATA INPUT UNIT
D0~D3
601
RND
4 PHASE RING COUNTER
667
663A
663B
669
3 PHASE
4 PHASE
6 PHASE
12 PHASE
MPX
MPX
LATH
650
DECODER UNIT
CS0~CS7
CA0~CA6
663C
663D
665
FROM FIG. 16A
MPX 11
675
CCLR
MPX 12
CEN
MPX 13
CM1
MPX 14
CM2
MPX 15
SCLR
MPX 16
SEN
MPX 17
SM1
MPX 18
SM2
DACT
FEN
GATE ARRAY
680
V1,CVc,V2,V3,SVc,V4 (TO 700)

DISPLAY CONTROL DEVICE

This application is a continuation of application Ser. No. 08/054,634, filed Apr. 30, 1993, which is a continuation of application Ser. No. 07/774,648, filed Oct. 15, 1991, which is a continuation of application Ser. No. 07/255,151, filed Sep. 30, 1988, all now abandoned.

BACKGROUND OF THE INVENTION

1. Field of the Invention

The present invention relates to a display control device, and more particularly to a display control device adapted for use in a display device employing a display element exhibiting bistability to the electric field, such as ferroelectric liquid crystal display device.

2. Related Background Art

Among display devices employing liquid crystal compound, there is already known a device in which a group of scanning electrodes and a group of signal electrodes are positioned in the form of a matrix and a liquid crystal compound is filled therebetween for forming plural pixels thereby displaying image information.

For such a display device there has been employed so-called time-division driving method in which voltage signals are cyclically applied to the scanning electrodes and information signals are applied in parallel manner to the signal electrodes, in synchronization with the voltage signals supplied to the scanning electrodes. Such a display device and such driving method are associated with a difficulty in increasing the density of the pixels, or in increasing the image size.

In various liquid crystal compounds, there has almost solely been employed, in the display devices, the twisted nematic (TN) liquid crystal because of a relatively high response speed and a low power consumption. In the liquid crystal of this type, the nematic liquid crystal molecule with positive dielectric anitropy assumes a twisted (helical) structure in the absence of electric field, as shown in FIG. 50A, in the direction of thickness of the liquid crystal layer, and the liquid crystal molecules constitute, between the electrodes, twisted structures which are parallel mutually and in each layer. On the other hand, under an electric field, as shown in FIG. 50B, the nematic liquid crystal molecules with positive dielectric anisotropy are aligned in the direction of electric field, thus inducing optical modulation. If a display device is formed by employing such liquid crystal in combination with electrodes of a matrix structure, in an area where a scanning electrode and a signal electrode are both selected (selected point), there is applied a voltage exceeding the threshold value required for orienting the liquid crystal molecules perpendicularly to the electrodes, but, in an area where both of the scanning electrode and the signal electrode are not selected (unselected point), the above-mentioned voltage is not applied so that the liquid crystal molecules retain the twisted stable orientation parallel to the electrodes. By placing linear polarizers in mutually crossing relationship on both sides of such liquid crystal cell, the light is intercepted in the selected point but is transmitted in the unselected point because of the light-rotating property of the twisted structure of the liquid crystal. In this manner an image display device can be obtained.

However, in such a matrix electrode structure, a certain electric field is applied also to so-called half-selected point where the scanning electrode is selected but the signal electrode is not selected, or, the scanning electrode is not selected but the signal electrode is selected. The display device functions in normal manner as long as the voltage supplied to the selected point is sufficiently different from that supplied to the half-selected point, and the threshold voltage required for orienting the liquid crystal molecules perpendicularly to the electrodes is present between the above-mentioned voltages.

However, when the number N of the scanning lines is increased in such structure, the duty ratio, or the ratio of duration of effective electric field on a selected point to the period of scanning of the entire frame decreases as 1/N. Consequently the voltage difference, in the effective value, between the selected point and the unselected point in the repeated scanning operations decreases with the increase in the number of scanning lines, thus giving rise to lowered image contrast and crosstalk.

Such phenomena are fundamentally unavoidable in driving conventional liquid crystal lacking bistability (in which liquid crystal molecules are stable when oriented parallel to the electrodes and are perpendicularly oriented only during effective application of the electric field) by means of time accumulating effect (namely by repetitive scanning). In order to overcome such difficulties there have been proposed various methods such as voltage averaging method, two-frequency driving method, multiple matrix method etc., but these methods are still insufficient and the image size and the pixel density of the display devices have been limited by the limitation in the number of scanning lines.

Also for overcoming the above-mentioned drawbacks, the present applicant has already proposed driving methods for liquid crystal exhibiting bistability to the electric field, for example in the U.S. Pat. No. 4,655,561 issued on Apr. 7, 1987. For use in such driving methods, there is preferred chiral smectic liquid crystal with ferroelectricity, particularly that of C-phase (SmC* or H-phase (SmH*).

In the SmC* phase, as shown in FIG. 51, the liquid crystal molecules have parallel layered structure, in which the longer axis of the molecule is inclined to the layer. The molecules constitute a spiral structure as the direction of inclination of molecules is different amount different layers.

In the SmH* phase, as shown in FIG. 52, the molecules show parallel layered structure, with an inclination of the longer axis of the molecule to the layer, exhibiting a hexagonal packed structure in a plane perpendicular to the longer axis of the molecule.

In the SmC* or SmH* phase, the liquid crystal molecules assume a spiral structure, as schematically shown in FIG. 53.

In FIG. 53, e3 indicates a liquid crystal molecule; e4 an electric dipole moment; and e5 a boundary of layers. Each liquid crystal molecule e3 has a dipole moment in a direction perpendicular to the longer axis of the molecule, and moves with a fixed angle θ to the Z-axis perpendicular to the boundary plane e5 of the layers, thus constituting a spiral structure. The illustrated state exists in the absence of an applied voltage, but, in the presence of a voltage exceeding a certain threshold value in the direction of X-axis, the liquid crystal molecule is oriented in such a manner that the electric dipole moment e4 becomes parallel to the X-axis.

As the SmC* or SmH* phase can be realized in the course of phase transition by temperature, it is desirable, in case of using such liquid crystal compound, to select the display device according to the temperature range of use of the display device.

FIG. 54 schematically illustrates a cell utilizing the ferroelectric liquid crystal (FLC) explained above. Substrates (glass plates)el, el' respectively have transparent electrodes composed for example of $In_2O_2$, $SnO_2$ or indium tin oxide (ITO), and the liquid crystal of SmC* phase is sealed therebetween in such a manner that the layers e2 of the liquid crystal molecules become perpendicular to the glass plate surfaces. The liquid crystal molecule e3, represented by a thick line, has a dipole moment e4 in a direction perpendicular thereto. When a voltage, exceeding a fixed threshold value, is applied between the electrodes of the substrates el and el', the spiral structure of the liquid crystal molecule e3 is unwound and the orientation of the molecules e3 is changed in such a manner that the dipole moments e4 are all aligned in the direction of electric field. Because of the oblong shape, the liquid crystal molecule e3 shows anisotropy in the refractive index between the longer and shorter axis. It will therefore be easily understood that a liquid crystal optical modulating device in which the optical properties vary according to the polarity of applied voltage can be obtained by placing mutually crossing polarizers on both sides of the glass plates.

If the liquid crystal cell is made sufficiently thin (for example 1 μm), the spiral structure of the liquid crystal molecule becomes unwound even in the absence of the electric field, as shown in FIG. 55, and the dipole moment p or p' thereof assumes an upward or downward position. If an electric field E or E' exceeding a threshold value is applied for a predetermined period, as shown in FIG. 55, the dipole moment is changed upwards or downwards according to the field vector of the electric field E or E', and the liquid crystal molecules are correspondingly oriented in a first stable state f3 or a second stable state f3'.

The use of such ferroelectric liquid crystal in the optical modulating device provides following two advantages: first, a very high response speed (1 μsec–100 μsec), and, second, bistable nature of the orientation of the liquid crystal molecules.

The above-mentioned second advantage will be further explained with reference to FIG. 55. Under the application of an electric field E, the liquid crystal molecules e3 are oriented in the first stable state f3, which remains stable even after the application of the electric field is discontinued. Under the application of the inverse electric field E', the liquid crystal molecules e3 are reoriented into the second stable state f3', which again remains stable even after the application of the electric field is terminated. Thus the liquid crystal molecules have a memory property, and retain their oriented state unless the applied electric field exceeds a certain threshold value.

In order to effectively exploit such high response speed and memory property, the cell is preferably as thin as possible, generally in a range of 0.5 to 20 μm, particularly 1 to 5 μm.

Now reference is made to FIGS. 47 to 49D for outlining the driving method for the ferroelectric liquid crystal.

FIG. 56 is a schematic view of a cell having matrix electrodes, between which a ferroelectric liquid crystal compound (not shogun) is sandwiched. There are illustrated common scanning electrodes com and signal electrodes sig. At first there will be explained a case in which a scanning electrode com1 is selected.

FIGS. 57A and 57B respectively show an example of an electrical scanning signal supplied to the selected scanning electrode com1 and an electrical scanning signal supplied to other (unselected) scanning electrodes com2, com3, com4, . . . FIGS. 57C and 57D respectively show an example of an electrical information signal supplied to the selected signal electrodes seg1, seg3, seg5 and an electrical information signal supplied to other unselected signal electrodes seg2, seg4.

In FIGS. 57A–57D and 58A–58D, the ordinates indicates voltage while the abscissa indicates time. For example, in case of displaying a moving image, the scanning electrodes com are cyclically selected in succession. It is assumed that, in a liquid crystal cell showing histability for a predetermined voltage duration $\Delta t_1$ or $\Delta t_2$, a threshold voltage $-V_{th1}$ is required for realizing the first stable state and a threshold value $+V_{th2}$ is required for realizing the second stable state. The voltage supplied to the selected scanning electrode coml is, for example, as shown in FIG. 57A, an alternating voltage which is 2 V for a phase (duration) $\Delta t_1$ and −2 V for another phase (duration) $\Delta t_2$. The application of such electrical signal having different voltages in plural phases to the selected scanning electrode can cause rapid state changes between first and second stable states corresponding to optically dark and light states.

On the other hand, the other scanning electrodes com2, . . . , com5, . . . are given, as shown in FIG. 57B, a central potential of the voltages supplied to the cell, namely a reference potential (for example ground potential). The selected signal electrodes seg1, seg3, seg5 are given an electrical signal V as shown in FIG. 57C, while the unselected signal electrodes seg2, seg4 are given an electrical signal −V as shown in FIG. 57D. The above-mentioned voltages are suitably selected so as to satisfy the following relations:

$$V<V_{th2}<3\ V$$

$$-3\ V<-V_{th1}<-V$$

FIGS. 58A and 58B respectively shown the voltages supplied to the pixels A and B show the FIG. 56. As will be apparent from these charts, the pixel A, positioned on the selected scanning line, receives a voltage 3 V exceeding the threshold value $V_{th2}$ in a phase $\Delta t_2$. Also the pixel B, positioned on the same scanning line, receives a voltage −3 V exceeding the threshold value $-V_{th1}$ in a phase $\Delta t_1$. Therefore, on the selected scanning line, the liquid crystal molecules are oriented in the first or second stable state, respectively according to whether the signal electrode is selected or not.

On the other hand, as shown in FIGS. 58C and 58D, on the unselected scanning line, each pixel receives a voltage V or −V, which does not exceed the threshold values. Therefore, in each pixel which is not on the selected scanning line, the molecules retain an orientation corresponding to the signal state in the preceding scanning operation. In this manner signal of a line are written when a corresponding scanning electrode is selected, and the written signal states are retained until the succeeding selection in the next frame. Consequently the effective duration of selection per line remains same even when the number of scanning electrodes is increased, so that image contrast is not affected.

As explained in the foregoing, there have been made proposals on the ferroelectric liquid crystals in order to realize a display device exhibiting bistability to the electric field and capable of retaining the stable state even in the absence of electric field, thereby overcoming the difficulties associated with the conventional display devices relying on the twisted nematic liquid crystal, but there still remain various issues to be considered on the driving method of such display device utilizing the ferroelectric liquid crystal.

SUMMARY OF THE INVENTION

An object of the present invention is to provide a display control device, adapted for use in a display apparatus utilizing an optical modulating device with bistability to the electric field, such as a ferroelectric liquid crystal device, and capable of appropriate drive control with effective utilization of the characteristics of such optical modulating device.

Another object of the present invention is to provide a display control device, adapted for use in combination with a display device provided with a group of scanning electrodes and a group of signal electrodes which are arranged in a matrix structure to define a group of pixels and which contain a display element therebetween, and provided with means for inverting the polarity of the driving signal waves at least for the scanning electrodes.

Still another object of the present invention is to provide a display control device capable of inverting the driving signal wave during the drive of a scanning electrode (one horizontal scanning period) to bring the sum of driving energy to zero in said period thereby ensuring the stable state of the display device such as the ferroelectric liquid crystal device, and/or inverting the driving signal wave at every scanning electrode or at every predetermined number of scanning electrodes thereby preventing the waving of the displayed image that may occur when the scanning electrodes are driven in succession with a same signal wave.

Still another object of the present invention is to provide a display control device adapted for use in combination with a display device having a group of scanning electrodes and a group of signal electrodes and containing a display element between said groups, and comprising means capable of combining plural driving signal waves with intervals therebetween during the drive of one of said scanning electrodes thereby completing the preparation for the drive of the scanning and signal electrodes.

Still another object of the present invention is to provide a display control device capable, for example, of releasing a signal wave and an inverted signal wave within a driving duration of a scanning electrode ( one horizontal scanning period) to drive the scanning electrode, thereby bringing the sum of the driving energy to zero and ensuring the stable state of the ferroelectric liquid crystal display device.

Still another object of the present invention is to provide a display control device, adapted for use in combination with a display device having a group of scanning electrodes and a group of signal electrodes and containing a display element positioned between the groups, and comprising means capable of combining plural driving signal waves during the drive of one of the scanning electrodes thereby completing the preparation for the drive of the scanning and signal electrodes.

Still another object of the present invention is to provide a display control device capable of combining a signal wave and an inverted signal wave thereof with an interval within a horizontal scanning period for driving a scanning electrode, thereby bringing the sum of the driving energy to zero and thus ensuring the stable state of the optical modulating device such as a ferroelectric liquid crystal display device, and/or combining plural signal waves without intervals therebetween thereby generating an entirely new appropriate signal wave.

DETAILED DESCRIPTION OF THE PREFERRED EMBODIMENTS

Figure 1:
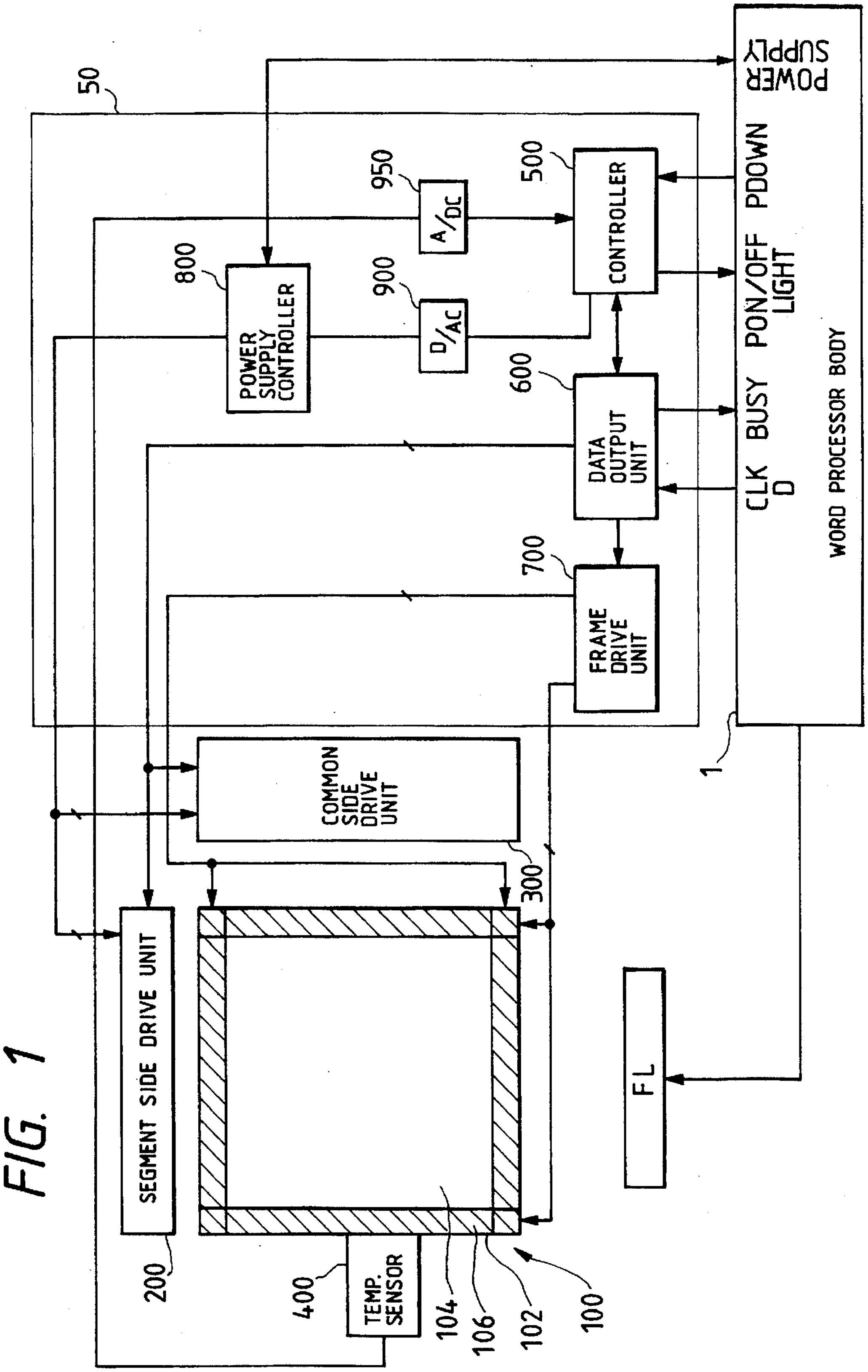
FIG. 1 is a block diagram of a display device and a control system, constituting an embodiment of the present invention.

Now the present invention will be clarified in detail by embodiments thereof shown in the attached drawings. The following description will be given in the following order:

(1) Outline of device
(2) Structure of display device
(3) Outline of display control
 (3.1) Frame of display device
 (3.2) Driving signal waves for display device
 (3.3) Driving voltages for display device
 (3.4) Temperature compensation
 (3.5) Driving method for display device
 (3.6) Clearing of displayed image
(4) Structure of units of display control device
 (4.1) Symbols
 (4.2) Control unit
 (4.3) Memory space
 (4.4) Data output unit
 (4.5) A/D converter
 (4.6) D/A converter and power supply controller
 (4.7) Frame drive unit
 (4.8) Display device driving unit
 (4.8.1) Segment driving unit
 (4.8.2) Common driving unit
 (4.9) Driving signal waves
(5) Display control
 (5.1) Outline of control sequence
 (5.2) Details of control sequence
 (5.2.1) Power supply on (initialization)
 (5.2.2) Block access
 (5.2.3) Line access
 (5.2.4) Power supply off
(6) Effect of the embodiment
 (6.1) Effect of frame formation
 (6.2) Effect of temperature compensation
 (6.3) Effect of control responsive to image data input
 (6.4) Effect of the presence of display device control unit
 (6.5) Effect of forced image clearing
 (6.6) Effect of presence of power supply controller
 (6.7) Effect of wave form variation and inverted drive
(7) Variation
 (7.1) Frame structure
 (7.2) Timing of temperature compensation and partial rewriting
 (7.3) One horizontal scanning period and driving voltage
 (7.4) Wave form setting
 (7.5) Selection of block access or line access
 (7.6) Number of scanning lines
 (7.7) Erasure of effective display area
 (7.8) Position of temperature sensor
 (7.9) Display device, display control device and word processor

(1) Outline of Device

FIG. 1 shows an embodiment of the present invention, wherein shown are a word processor 1 constituting a host apparatus for generating image data for supply to the display device of the present embodiment; a display control device 50 of the present embodiment for effecting the drive control for the display device according to various conditions to be explained later, based on the display data supplied from the word processor 1; a display device 100 employing ferroelectric liquid crystal; segment drive unit 200 for driving signal electrodes of the display device 100 and common drive unit 300 for driving scanning electrodes in response to driving data supplied from the display control device 50; and a temperature sensor 400 provided at a suitable position of the display device 100, for example at a position showing the average temperature.

In the display device 100 there are shown a display frame 102; an effective display area 104 thereon; and a frame area 106 defined outside the effective display area 104 on the display frame 102. In the present embodiment, electrodes corresponding to the frame 106 are provided on the display device 100 and the frame is formed on the display frame 102 by the drive of the electrodes.

Figure 16A:
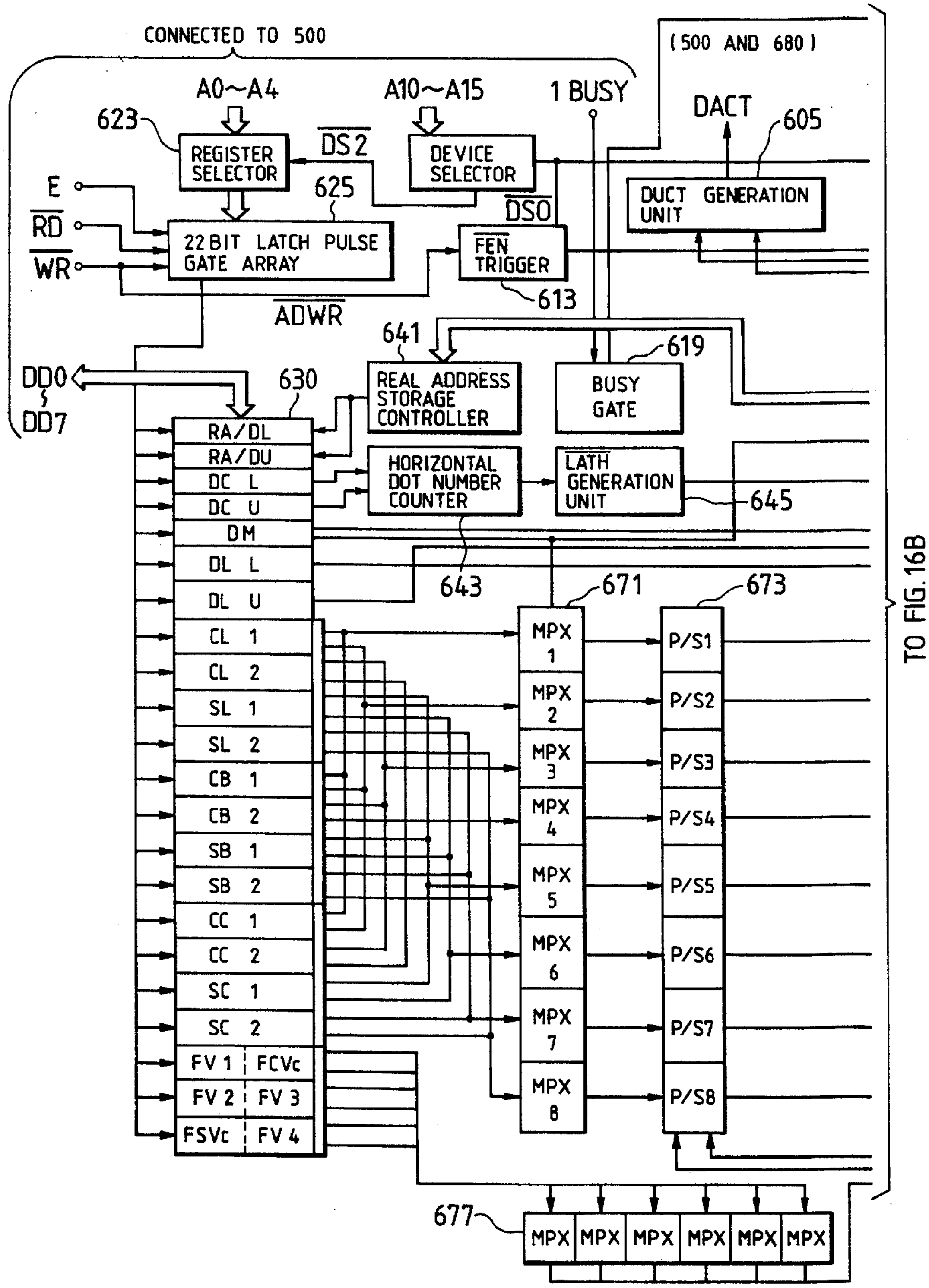
FIGS. 16A and 16B are respectively block diagrams showing an examples of the structure of a data output unit in the embodiment.
Figure 16B:
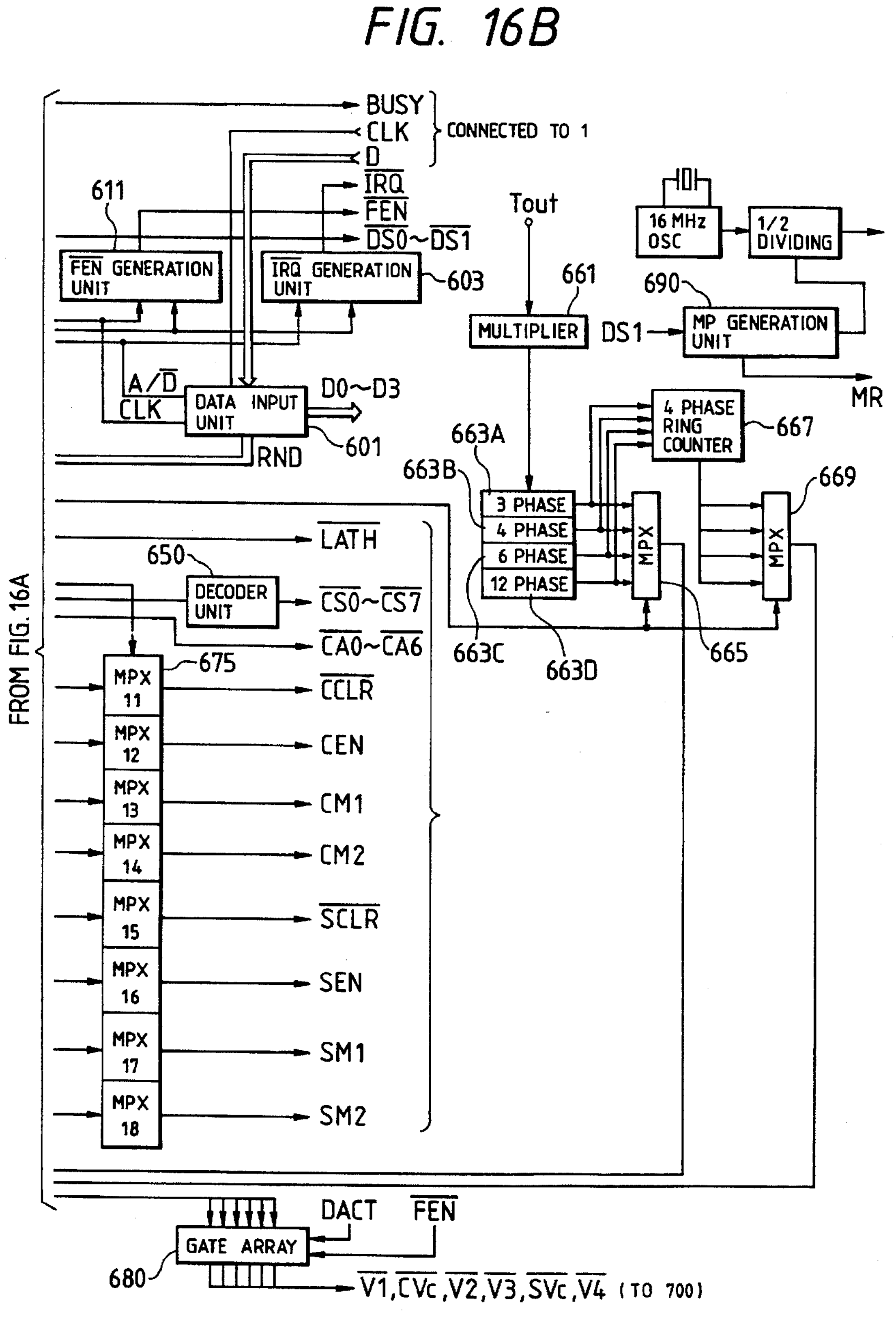

In the display control device 50 there are provided a controller 500 for controlling the exchange of various data with the display device 100 and the word processor 1 as will be explained later in relation with FIG. 11; a data output unit 600 for driving the display drive units 200, 300 in response to data from the controller 500 and initializing said controller 500 for data setting, as will be explained later in relation to FIG. 16; and a frame drive unit 700 for forming the frame 106 on the display area 102 in response to the data from the data output unit 600.

A power supply controller 800 generates voltages to be supplied to the electrodes by the display drive units 200, 300 by suitably varying the voltage signals from the word processor 1 under the control of the controller 500. A D/A converter 900 provided between the controller 500 and the power supply controller 800 converts the digital data from the controller 500 into analog data for supply to the power supply controller 800. An A/D converter 950 provided between the temperature sensor 400 and the controller 500 converts the analog temperature data detected on the display device 100 into digital data for supply to the controller.

The word processor 1 functions as a host apparatus or a supply source of display data to the display device 100 or the display control device 50, and may naturally be replaced by another host apparatus such as a computer or an image reader. In any case it is assumed, in the present embodiment, that such apparatus is capable of releasing or receiving following data. The data to be supplied to the display control device 50 include:

D: Image data, including address data and horizontal synchronization signals for designating the display position of the data. The address data, for designating the display address of image data (corresponding to the display position on the effective display area 104) may be obtained directly if the host apparatus has a VRAM corresponding to the effective display area 104. In the present embodiment the address data are given from the word processor to the data output unit 600, in superposition with horizontal synchronization signals or with blanking signals;

CLK: Transfer clock signals for image data PD0–PD3 to be supplied to the data output unit 600; and PDOWN: A signal for informing the turning-off of the power supply of the system, to be supplied as a non-mass couple interruption (NMI) to the controller 500.

The data to be supplied from the display control device 50 to the word processor 1 include:

ON/OFF: A status signal indicating the completion of the starting or ending of the display control device 50 at the start or termination of the power supply of the system, the signal to be released by the controller 50;

Light: A signal for instructing the on/off state of a light: source FL to be combined with the display device 100, to be released by the controller 500; and Busy: A synchronization signal for causing the word processor 1 to withhold, for example, the transfer of a signal D in order to enable the display control device 50 to effect various settings in the initialization or during the display operation. In the present embodiment the word processor 1 is capable of receiving said Busy signal, which is supplied from the controller 500 through the data output unit 600.

(2) Structure of Display Device

Figure 2:
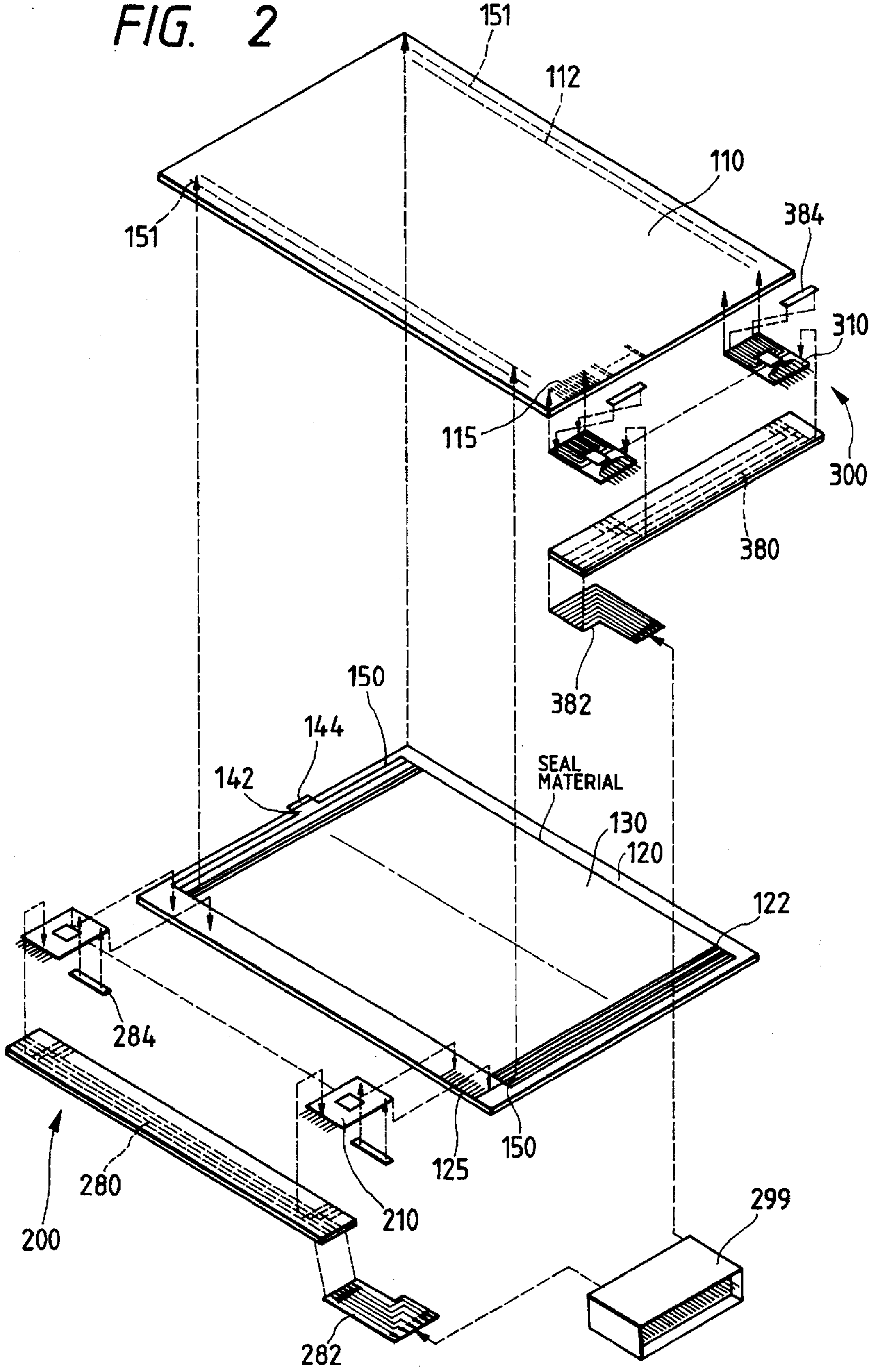
FIGS. 2 and 3 are respectively an exploded perspective view and a cross-sectional view of an example of the display device of the embodiment.
Figure 3:
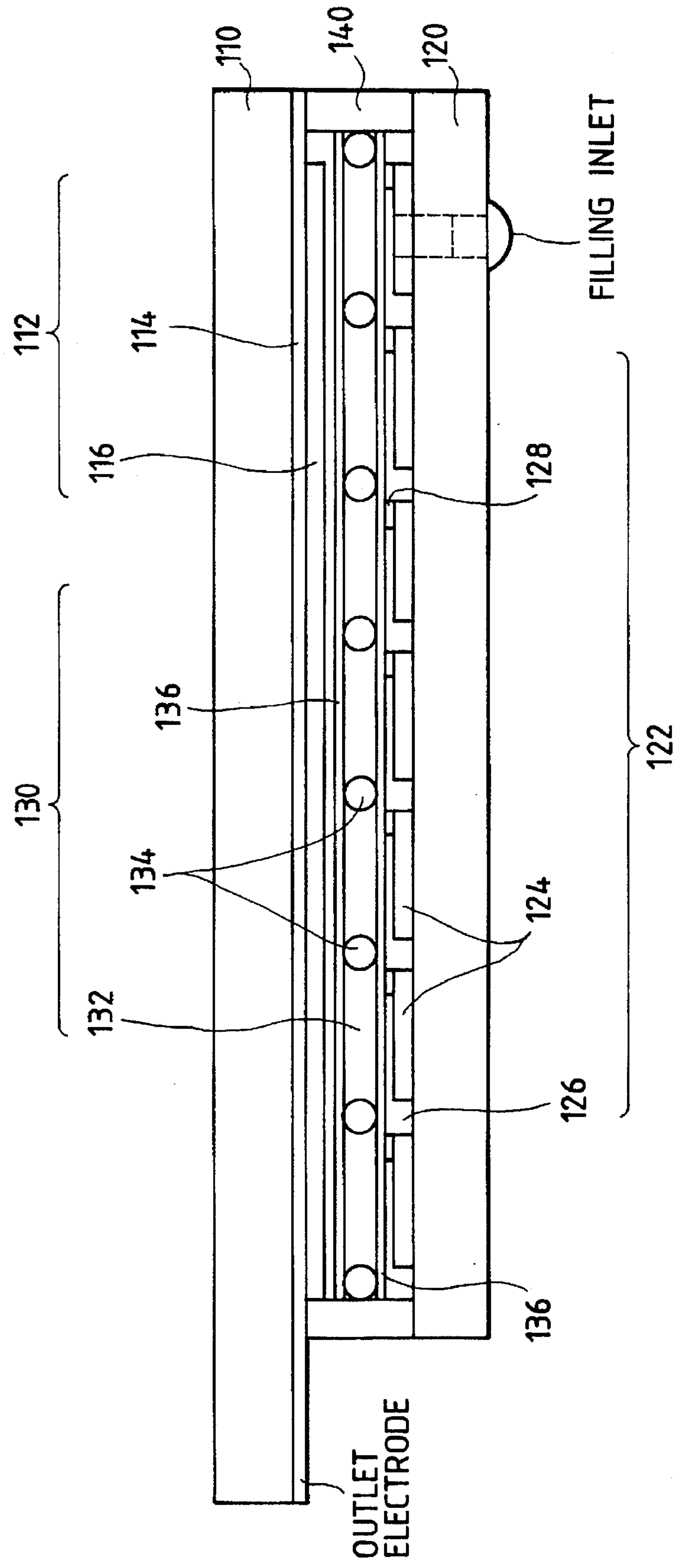

FIGS. 2 and 3 are respectively an exploded perspective view and a cross-sectional view of an example of the display device 100 employing ferroelectric liquid crystal. In these figures there are shown upper and lower glass plates 110, 120 respectively provided with polarizers which are so positioned to constitute a crossing Nicol polarizer with respect to the orienting direction of the ferroelectric liquid crystal; a wiring section 122 provided on the lower glass substrate 120 and composed for example of ITO transparent electrodes 124 and an insulating film 126; metal layers 128 which are attached on the transparent electrodes 124 for reducing the resistance thereof but which may be dispensed with in case of a small display device; a wiring section 112 provided on the upper glass substrate 110 composed of transparent electrodes 114 and an insulating film 116, which are similar to those 124, 126 in the wiring section 122 of the lower glass substrate 120.

The wirings of the wiring sections 112, 122 are mutually perpendicular. In case of obtaining an effective display area 104 of A5 size with a resolution of 400×800 dots with the horizontal scanning direction along the longer side, the above-mentioned wiring sections have 400 and 800 transparent electrodes, respectively, corresponding to the effective display area. In the present embodiment, the horizontal scanning direction is taken as the common side, and the upper wiring section 112 is provided with 400 transparent electrodes 114, while the lower wiring section 122 is provided with 800 transparent electrodes 124. Also there are provided transparent electrodes 150, 151 for displaying the frame in an area outside the effective display area 104, in a same form as or a different form from that of the transparent electrodes 124, 114 for data display.

Figure 55:
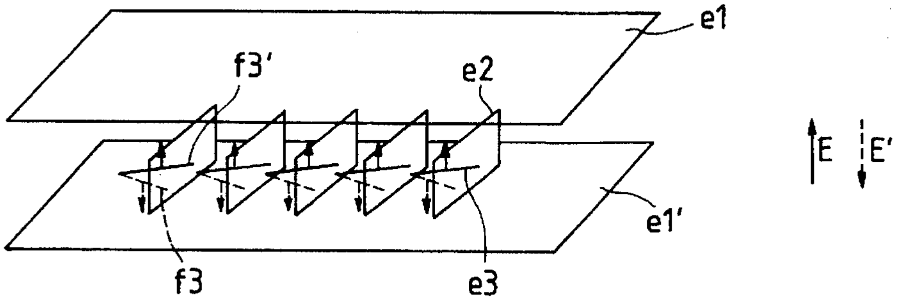
FIG. 55 is a schematic view of an example of display device employing ferroelectric liquid crystal.

A seal section 130 for the ferroelectric liquid crystal 132 comprises a pair of orienting films 136 for aligning the axis (Z-axis in FIG. 44) of the ferroelectric liquid crystal element and spacers 134 for defining the distance of the orienting films 136 for enabling that the ferroelectric liquid crystal assumes the first or second stable state as shown in FIG. 55. There are further shown sealants 140 such as epoxy resin for sealing the liquid crystal 132; a filling inlet 142 for filling the seal section 130 with the liquid crystal 132; and a seal member 144 for stopping the inlet 142 after filling.

Segment driving elements 210 constituting the segment drive unit 200 and common driving elements 310 constituting the common drive unit 300 are composed of integrated circuits each capable of driving 80 transparent electrodes in the present embodiment, and are provided in 10 units and 5 units, respectively. There are further provided boards 280, 380 for respectively supporting the segment driving elements 210 and the common driving elements 310; flexible cables 282, 382 respectively connected to the boards 280, 380; and a connector 299 for connecting the flexible cables 282, 382 with the display control device 50 shown in FIG. 1.

Outlet electrodes 115, 125 respectively connected to the transparent electrodes 114, 124 are connected to the driving elements 310, 210 through film-shaped conductors 384, 284.

In the present embodiment, the display is achieved by irradiating light from a light source FL positioned below the lower glass substrate 120 and by driving the ferroelectric liquid crystal into the first or second stable state.

(3) Outline of Display Control

The display device as shown in FIGS. 2 and 3 are associated with the following drawbacks in relation to the characteristics of ferroelectric liquid crystal. The present embodiment aims at realizing an appropriate structure of the ferroelectirc liquid crystal display device 100 and an appropriate drive control therefor, in consideration of such drawbacks.

(3.1) Frame of Display Device

In a display device 100 as shown in FIGS. 2 and 3, the effective display area 104 actually usable for the display of image data is defined in an area of the display area 102, where the common transparent electrodes 114 and the segment transparent electrodes 124 are positioned in a matrix structure. In order that the effective display area 104 becomes completely visible, the display area 102 preferably includes an area at least corresponding to a part of the area which is positioned inside the sealant 140 but outside the matrix area of the common and segment transparent electrodes.

In such area, however, if provided with the common or segment transparent electrodes alone, the ferroelectric liquid crystal in a floating state regardless of the image data. In such state, the ferroelectric liquid crystal in the area may assume the first or second stable state. Consequently such area will mixedly contain light transmitting portions (white) and opaque portions (black), thus deteriorating the aesthetic aspect of the display. Besides the effective display area 104 may become unclearly defined, and the operator may cause mistakes in observation.

In the present embodiment, therefore, a frame 106 is formed by providing transparent electrodes 151, 150 (hereinafter called frame transparent electrodes) crossing the common or segment transparent electrodes outside the effective display area 104 and suitable driving the frame transparent electrodes. More specifically, there are provided for example 16 frame transparent electrodes 151, 150 on both sides of the common transparent electrodes 114 on the upper glass substrate 110 and of the segment transparent electrodes 124 on the lower glass substrate 120. In FIG. 2, for the purpose of simplicity, there is illustrated only one electrode on either side on the glass substrate 120 or 110.

(3.2) Driving Signal Waves for Display Device

Memory property is one of the features of the ferroelectric liquid crystal display device. In relation to this property, there will be explained, in the following, a difficulty relating to the driving signal wave and a resolution therefor, resulting from the dependence of threshold values for such memory property on the duration of voltage application, to be explained later with reference to FIG. 4.

Figure 56:
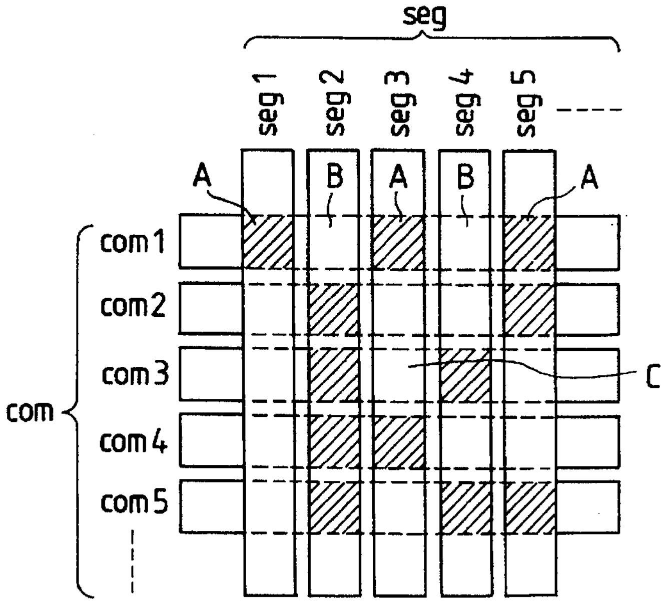
FIG. 56 is a schematic view of an example of the cell with matrix electrodes in which the present invention is applicable.
Figure 57A:
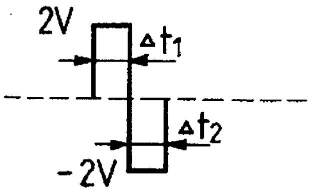
FIGS. 57A to 57D and 58A to 58D are wave form charts showing voltage signal waves to be supplied to the ferroelectric liquid crystal display device.
Figure 57C:
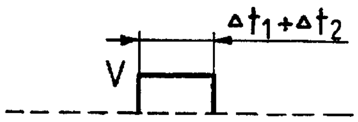
Figure 57B:
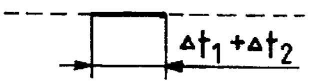
Figure 57D:
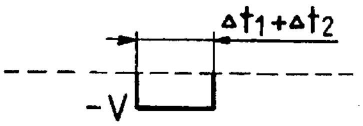
Figure 58A:
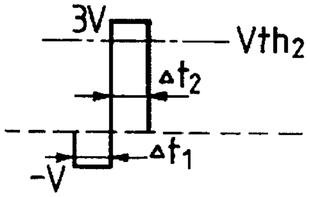
Figure 58C:
Figure 58B:
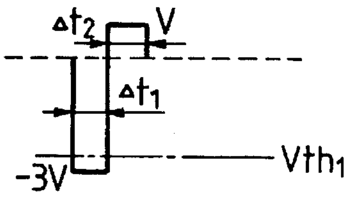
Figure 58D:

Referring to FIG. 56, among the pixels defined at the crossing points of the scanning electrodes com1, . . . , com5, . . . and the signal electrodes seg1, . . . , seg5, . . . , the hatched pixels correspond to the "light" (white) state while the blank ones correspond to the "dark" (black) state, further respectively corresponding to the aforementioned first and second stable states of the ferroelectric liquid crystal. Along the signal electrode seg1 shown in FIG. 56, a pixel A corresponding to the scanning electrode com1 is in the "light" state but other pixels B are all in the "dark" state.

Figure 5B:
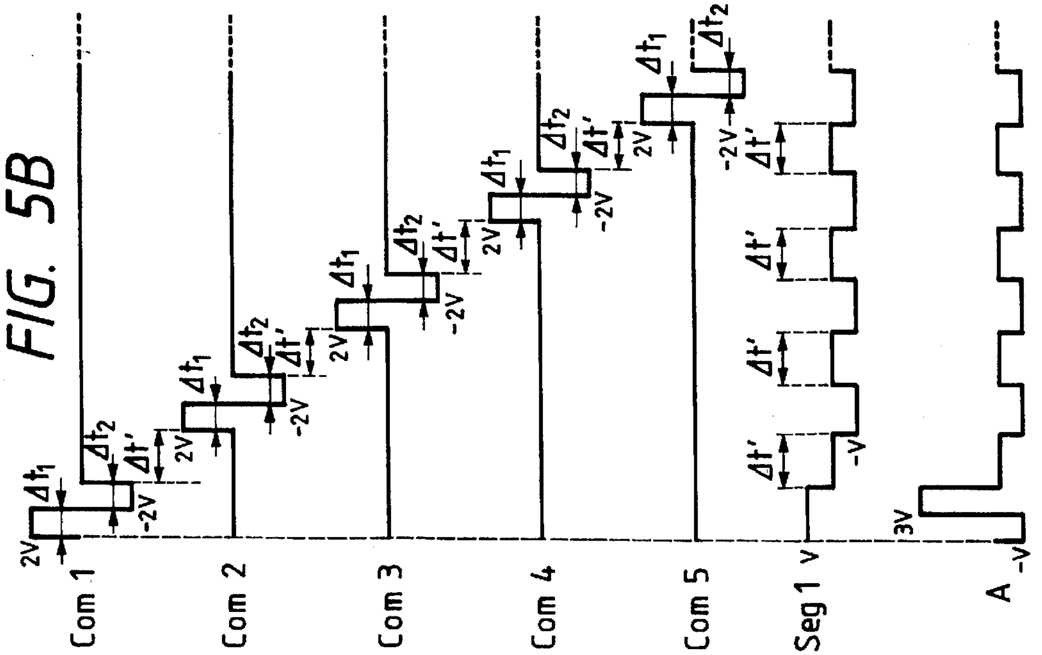
FIGS. 5A, 5B and 6 are wave form charts showing driving signal waves for a ferroelectric liquid crystal display device.
Figure 5A:
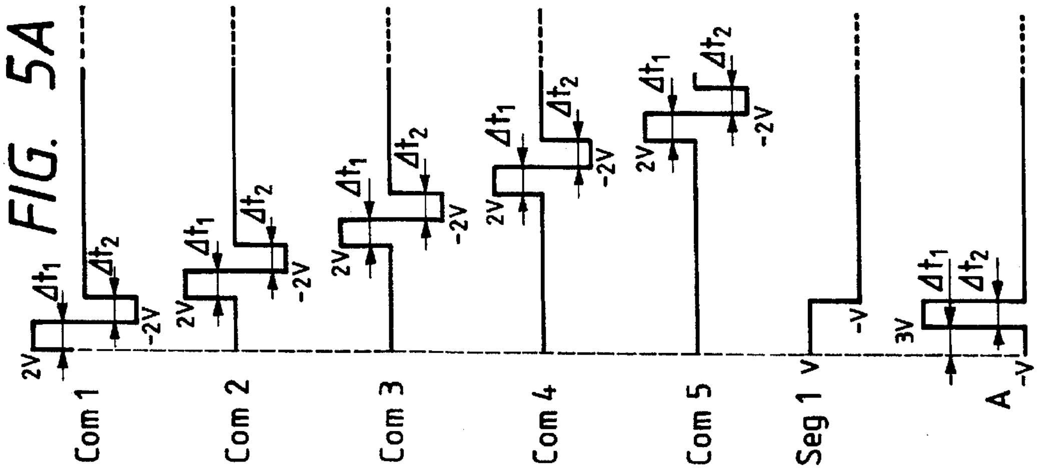

FIG. 5A time-sequentially illustrates, as an example, a scanning signal, an information signal supplied to the signal electrode seg1 and the voltage applied to the pixel A.

For example in the drive shown in FIG. 5A, when the scanning electrode com1 is selected, the pixel A receives a voltage of 3 V exceeding the threshold value $V_{th}$ in a period $\Delta t_1$ and moves to a stable state corresponding to the "light" state, regardless of the prior history. During the subsequent scanning of the electrodes com1–com5 the pixel A continues to receive a voltage −V as shown in FIG. 5A but retains the "light" state since the voltage does not exceed the threshold value $-V_{th}$.

However, continuation of same signals on a signal electrode ("dark" states in this case) gives rise to a drawback if the number of scanning lines is very large and a high-speed drive is required.

Figure 4:
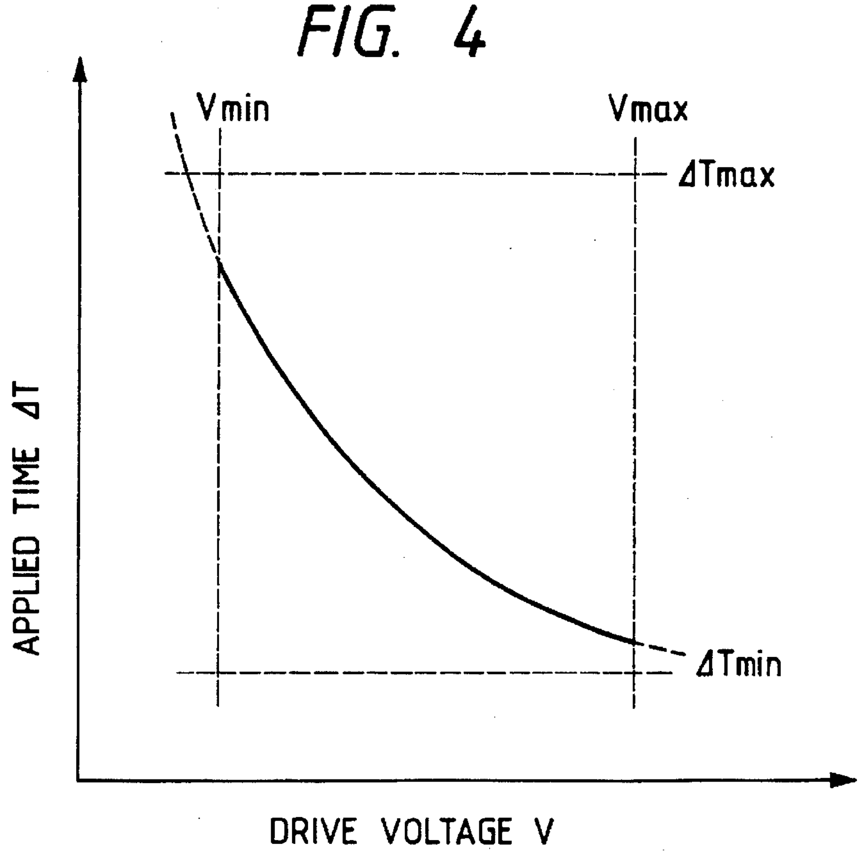
FIG. 4 is a chart showing the relation between the driving voltage and the period of application.

This phenomenon is characteristically shown in FIG. 4, which shows the pulse duration ΔT in the ordinate as a function of the driving voltage V in the abscissa. As will be evident from FIG. 4, the threshold value $V_{th}$ (driving voltage) is dependent on the duration of voltage application, and the curve becomes steeper as the duration of voltage application becomes shorter. Thus, if the driving signals shown in FIG. 5A are applied to a display device which has a very large number of scanning lines and is driven at a high speed, the pixel A, for example, after being converted to the "light" state at the scanning of the electrode com1, continues to receive the voltage −V thereafter and may be inverted to the "dark" state since the inversion may become possible even at a low threshold value by the accumulation of the durations of voltage application until the scanning electrode com1 is again selected.

In order to prevent such phenomenon there may be employed driving signal waves as shown in FIG. 5B. In this method the scanning signal and the information signal are not supplied continuously but a predetermined period Δt' is provided as a period for the application of auxiliary signal, during which an auxiliary signal is given with the signal electrode being grounded. During the period the scanning electrode is similarly grounded, so that the reference potential is applied between the scanning electrode and the signal electrode. It is therefore rendered possible to practically resolve the dependence of threshold voltage of the ferroelectric liquid crystal on the duration of voltage application shown in FIG. 4. It is therefore possible to prevent the conventions of the pixel A in the "light" state to the "dark" state. Same applies also to other pixels.

Figure 6:
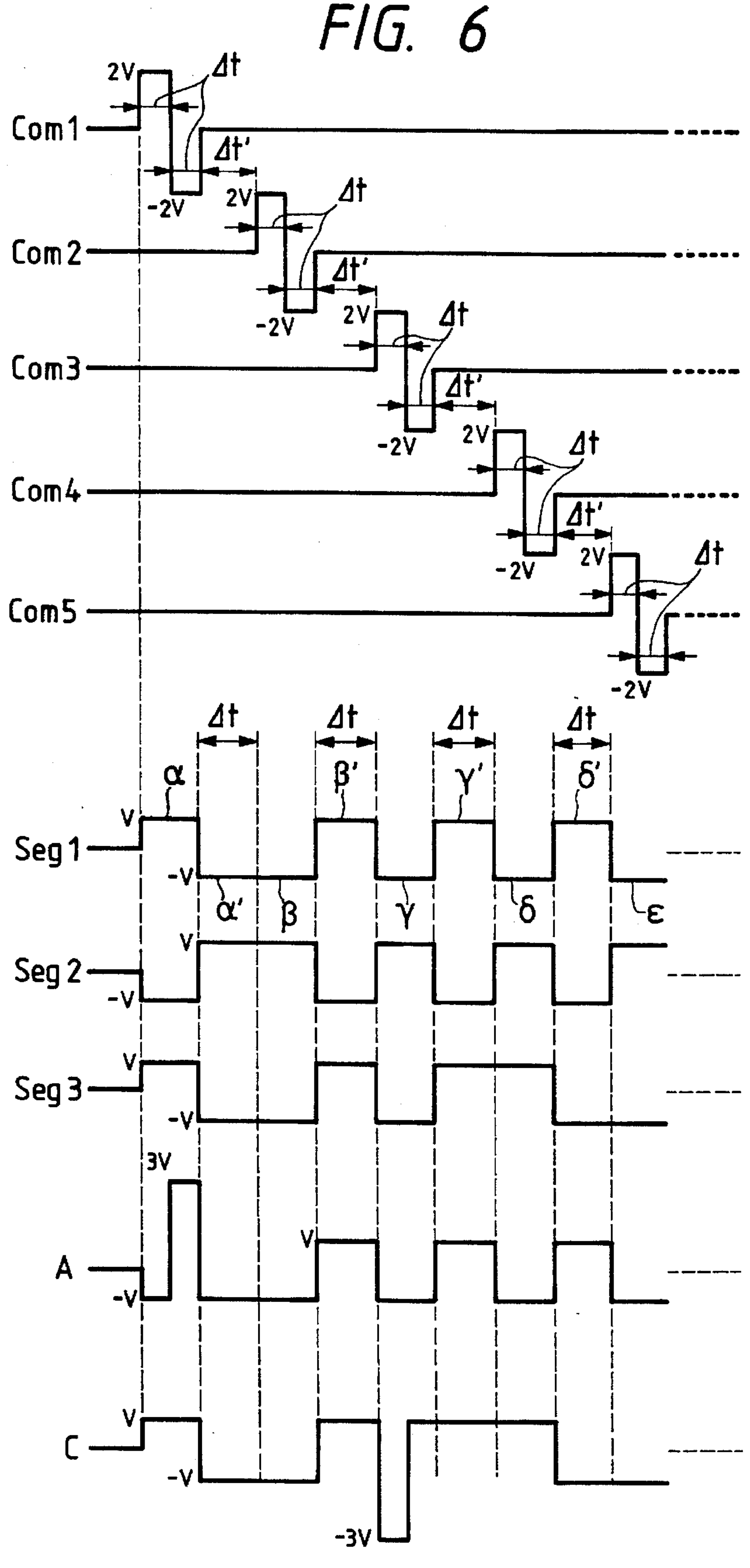

In a still preferred embodiment, driving signal waves shown in FIG. 6 are supplied to the scanning electrodes and signal electrodes.

Referring to FIG. 6, the scanning signal is composed of an alternating pulse signal of ±2 V. In synchronization with the pulse signal, the signal electrodes receive information signals which assume a voltage +V or −V respectively corresponding to the "light" or "dark" state. A period Δt' for auxiliary signal application is provided between the selection of the n-th scanning electrode com-n and that of the (n+1)-th scanning electrode com-n+1, and, in the period there is supplied an auxiliary signal of a polarity opposite to that of the signals for the signal electrodes during the scanning of the scanning electrode com-n. Thus the signal electrodes receive time-sequential signals seg1–seg3 shown in FIG. 6, wherein the polarity of the auxiliary signals α'-ε' is opposite to that of the information signals α-ε. For example in the pixel A, even if same information signals are consecutively given to the signal electrode, the voltage actually applied to the pixel A is alternating below the threshold value $V_{th}$. Consequently the aforementioned dependence of the threshold voltage of the ferroelectric liquid crystal on the period of voltage application is resolved, and the desired information ("light" in this case) formed during the selection of the scanning electrode com1 is not inverted until the next information writing.

The above-explained two examples of driving signal waves are conceptually given for the purpose of explanation, but, in the following embodiments, there are employed various suitable driving signal waves depending on the mode of drive in the effective display area 104 and the frame 106 in the display area 102, the actual mode of access and the temperature. Also the aforementioned wave forms are symmetrical in the positive and negative sides, but they are not necessarily symmetrical in the following embodiments.

(3.3) Driving Voltage for Display Device

The ferroelectric liquid crystal display device of the present embodiment is featured by a fact, as explained before, that the liquid crystal molecules are oriented so as to show the dipole moments thereof in the direction of electric field and can retain such orientation even when the electric field is eliminated.

The change from a stable state to another explained above takes place in different modes depending on the voltage applied to the display device.

Figure 7B:
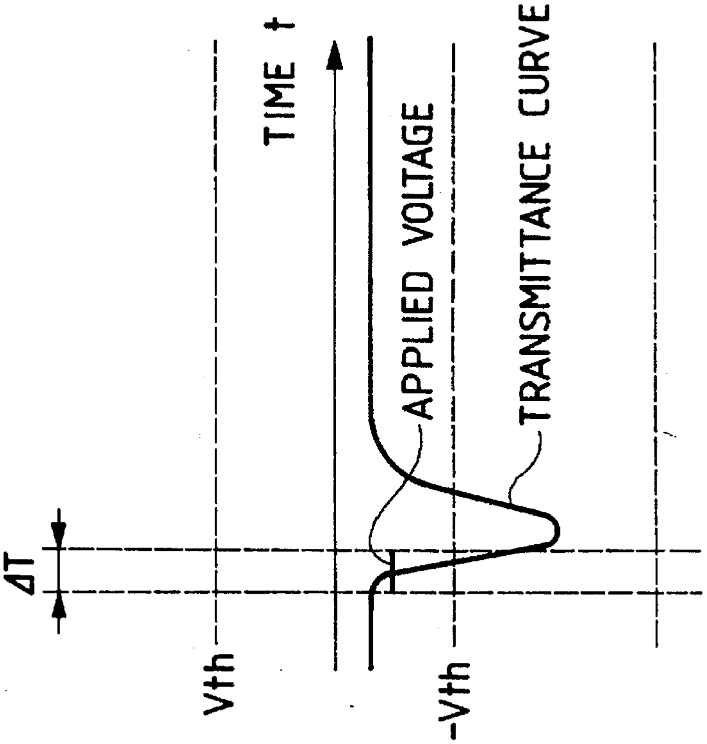
FIGS. 7A and 7B are charts showing the relation between the driving voltage and the transmittance of a ferroelectric liquid crystal display device.
Figure 7A:
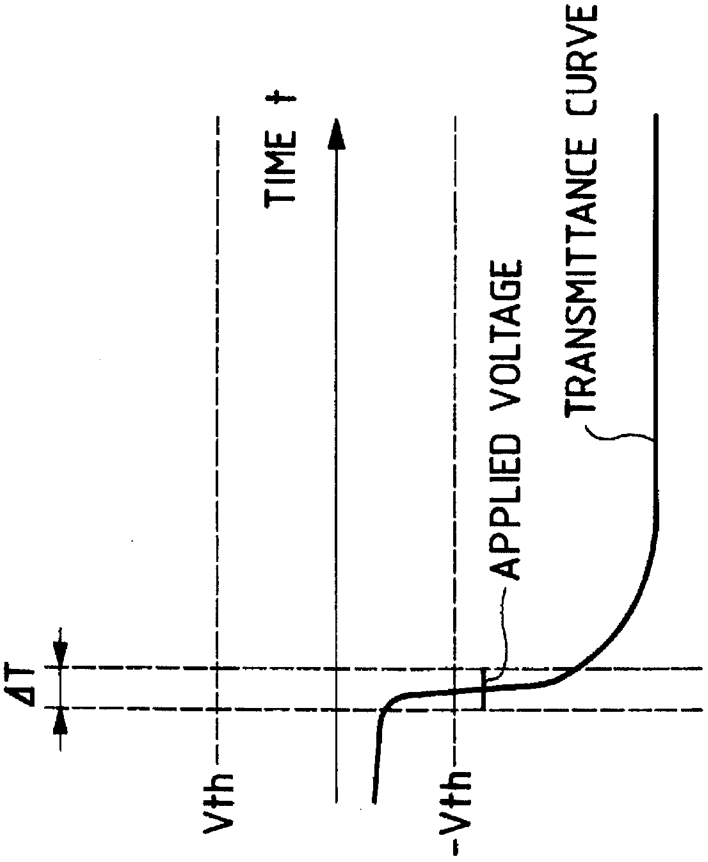

FIG. 7A and 7B illustrate the change of driving voltage and transmittance of ferroelectric liquid crystal in time. FIG. 7A shows a case in which the driving voltage exceeds the threshold voltage $-V_{th}$, whereby the transmittance changes from a state to the other (for example from "light" to "dark"). FIG. 7B shows a case in which the driving voltage does not exceed the threshold value. In such case the liquid crystal molecules react, but the orientation is not inverted and the transmittance returns to the original state.

Also the threshold value varies depending on the kind of the ferroelectric liquid crystal and on the driving temperature, as will be explained later with reference to FIG. 8.

As already explained in relation to FIGS. 4 and 6, the driving voltage is defined by five parameters; namely positive and negative values of the scanning signal, positive and negative values of the information signal, and the reference potential. The driving voltages are generated by the device of the present embodiment to be explained later, through the use of a suitable power supply source.

As will be apparent from the foregoing explanation, the determination of the driving voltage requires suitable temperature compensation, in consideration of the threshold value and other factors.

(3.4) Temperature Compensation

In the control of the ferroelectric liquid crystal display device of the present embodiment, it is necessary to consider a fact, in relation to temperature compensation, that the ferroelectric liquid crystal of SmC* phase requires detailed temperature compensation in the drive, since the mutually correlated driving conditions such as the pulse duration and the driving voltage fluctuate considerably the temperature of the liquid crystal and have to be in very narrow ranges at a given temperature.

The temperature compensation is conducted by detecting the temperature of the ferroelectric liquid crystal, practically the temperature around the display area 102, and setting the driving voltage and the pulse duration or the horizontal scanning period in response to the detected temperature. However, manual compensation is extremely difficult in consideration of the operating speed of the display area 102. Consequently the temperature compensation is a specific requirement in the control of the ferroelectric liquid crystal display device.

In the following there will be explained the temperature-dependent changes of the driving conditions including the pulse duration and the driving voltage explained above.

As explained in the foregoing, FIG. 4 shows the relation between the driving voltage and the pulse duration, and indicates a fact that a shorter pulse duration $\Delta T$ requires a larger driving voltage.

The pulse duration $\Delta T$ has an upper limit $\Delta T_{max}$ and a lower limit $\Delta T_{min}$ because of the following reasons. The upper limit $\Delta T_{max}$, or the lower limit in the frequency $f(=1/\Delta T)$ of the applied voltage exists because the displayed image flickers if the frequency f is lower than about 30 Hz in the so-called refreshing drive. Also the lower limit $\Delta T_{min}$, or the upper limit of the frequency f exists since the communication between the display area 102 and the word processor 1 becomes impossible if the frequency f is selected higher than the video rate, or the data transfer rate from the word processor 1.

Also the driving voltage V has an upper limit $V_{max}$ and a lower limit $V_{min}$, primarily resulting from the functions of the driving device.

Figure 8:
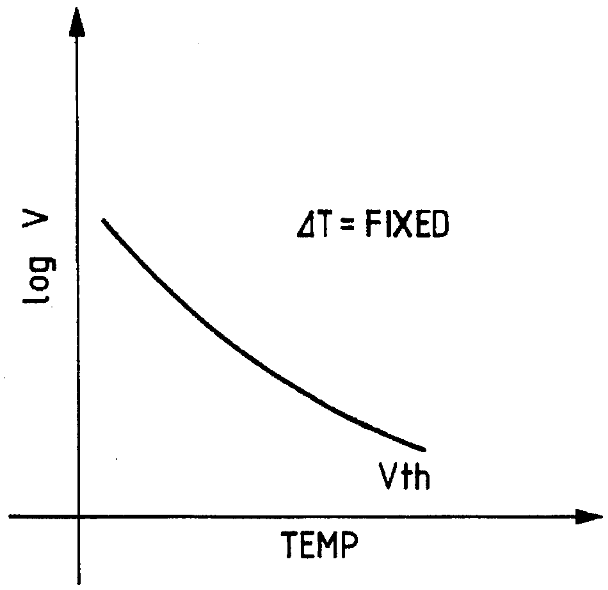
FIG. 8 is a chart showing the relation between the driving voltage and the temperature of a ferroelectric liquid crystal display device.

FIG. 8 shows the relation between the temperature in abscissa and the driving voltage V in logarithmic scale in ordinate, illustrating the temperature-dependent change of the threshold voltage $V_{th}$ for a fixed pulse duration $\Delta T$. As will be understood from FIG. 8, a lower driving voltage is required at a higher temperature.

From FIGS. 4 and 8, it will be understood that a higher temperature results in a lower driving voltage or a shorter pulse duration.

Figure 9:
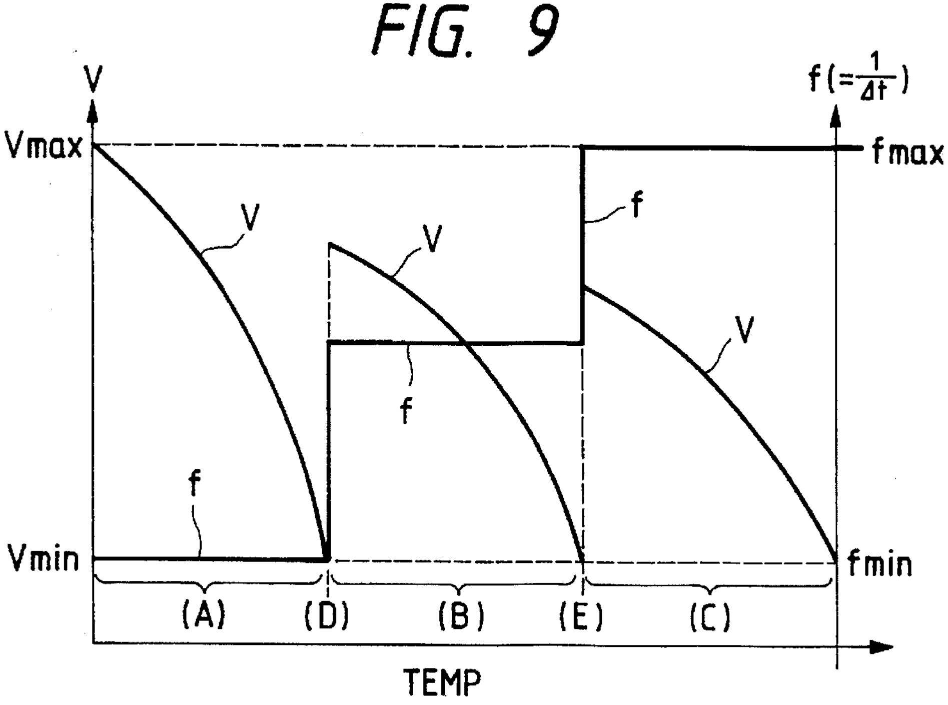
FIG. 9 is a chart showing an example of the relation among temperature, driving voltage and frequency to be stored in a memory area of the control unit in the present embodiment.

FIG. 9 is a chart for applying the above-mentioned relations of the driving conditions to the actual drive. FIG. 9 is an analog representation of a look-up table to be explained later, which stores the data of various driving conditions corresponding to the value detected by the temperature sensor 400.

FIG. 9 shows the temperature in abscissa, and the driving voltage V and the frequency f $(=1/\Delta T)$ in ordinate. If the frequency f is fixed in a temperature range (A), a temperature increase reduces the driving voltage V beyond $V_{min}$. Thus, at a temperature (D), a higher frequency f is fixed, and the driving voltage is determined in response thereto. Similar operations are repeated also in the temperature ranges (B), (C) and a temperature (E). The shape of the curves is determined by the property of the liquid crystal, but the number of steps and of sawtooth waves can be determined suitably.

Furthermore, following factors are considered in the present embodiment.

The ferroelectric liquid crystal display device shows significant changes in the characteristics even in the usually temperature range, so that the regulation of the pulse duration and the voltage by a single driving signal wave as explained above may be insufficient. For example the operating speed may vary several times even in a temperature range of 45° to 5° C., so that the user may have different impression on the function, depending on the time or season of use.

In a following embodiment, the usual temperature range of use is divided into plural ranges and a suitable driving signal wave is defined for each divided temperature range, and the temperature-dependent regulation of pulse duration and voltage is conducted in response to the temperature is conducted for each driving signal wave. In this manner the operating characteristics are averaged.

(3.5) Driving Method for Display Device

In the present embodiment, the data access to the display area 102 is conducted either in a line access mode for each horizontal scanning line (corresponding to the common transparent electrode 114), or a block access mode for a block of several lines. The mode is recognized by the real address data from the word processor 1.

Figure 10:
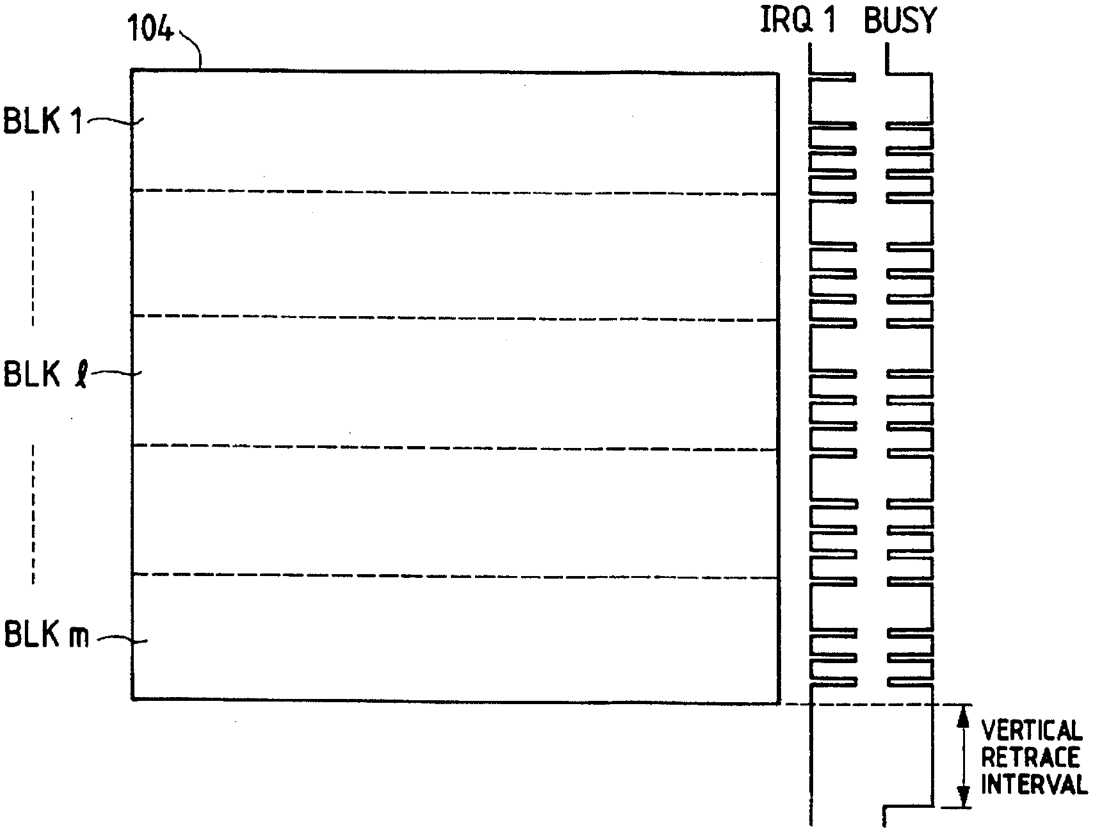
FIG. 10 is a schematic view showing block divisions in the effective display area in the embodiment.

FIG. 10 shows the division of the effective display area 104 into m blocks BLK1, . . . , BLKl, BLKm ($1 \leqq l \leqq m$) each containing a predetermined number of lines. In the present embodiment, the effective display area 104 containing 400 common transparent electrodes 114 (114 lines) in the vertical scanning direction is divided into 20 blocks (m=20) each containing 20 lines. The data access to thus divided block is conducted by erasing the display in all the lines contained in the block and then writing the data in succession from the first line to the last line in the block.

The display device 100 shown in FIGS. 2 and 3 with the ferroelectric liquid crystal has memory property. Consequently the displayed data not to be altered need not be refreshed, and the access to the display area is required only for the data to be altered.

The present embodiment is capable, depending on the function of the word processor 1 constituting the host apparatus, of refreshing drive in which the display of the effective display area 104 is constantly refreshed from the first line to the last line, as in the refreshing drive for a display device lacking the memory property, and partial rewriting drive in which a line or a block, requiring alteration, is rewritten. It is therefore possible to effect the refreshing drive if the word processor 1 transmits the refreshing data as in a display device lacking the memory property, or the partial rewriting drive if the word processor 1 transmits the image data of a block or a line in case of an alteration.

In addition, at the erasure of a block or the writing of a line, the drive is conducted according to the temperature compensation data explained in (3.4). The temperature compensation data are renewed, in the refreshing drive mode, in the vertical flyback period, namely in a period from the termination of access to the last line to the start of access to the first line. On the other hand, in the partial rewriting mode, the renewal is made at a predetermined interval by periodical interruptions.

In addition, in consideration of the driving conditions explained in (3.2), a driving signal wave which asymmetric in the positive and negative sides will provide the line with a positive or negative energy, thereby affecting the stable state of the display device and eventually causing an undesirable influence on the control relying on the memory property of the ferroelectric liquid crystal display device. Consequently, in the present embodiment, a suitably determined signal wave and an inverted signal wave thereof are given in a line driving period (hereinafter called in-line inversion) to bring the sum of the driving energy to zero in the line, thereby preventing the eventual change in the stable state of the display device.

The writing operation of the display device 100 is conducted by selecting the scanning electrodes (common lines) 114 in succession and giving signals simultaneously to the signal electrodes 124 at each selection. However, if a same signal wave is supplied to all the common lines, the display device will show same optical response which is displaced in time over the lines, so that the operator will feel the flickering of the display area 102. Consequently, in the present embodiment, the driving signal wave is inverted every horizontal scanning line or every several lines (hereinafter called MH inversion). This is based on a fact that the human recognizes the optical response by a plane so that the waving on the display can be prevented if the driving phase is inverted every line or every several lines.

Furthermore, in the refreshing drive mode in the present embodiment, the driving signal wave for each line is inverted after the display of a frame from the first line to the last line, or after the display of several frames (hereinafter called frame inversion). Let us consider a case in which a line receives a suitable signal wave (hereinafter called normal wave) Γ and an inverted wave I thereof in this order by the in-line conversion in a frame. In the next frame or after N frames, said line receives the inverted wave I and the normal wave Γ in this order. The effect of such frame inversion will be explained later.

(3.6) Clearing of Displayed Image

Because of the memory property, the ferroelectric liquid crystal display device of the present embodiment retains the first or second stable state even in the absence of electric field. Stated differently, the preceding displayed image remains unless a voltage is applied anew.

It is therefore desirable to clear the display area 102, or at least the effective display area 104 when the power supply is cut off, because, for instance, the termination of power supply can be identified from the state of the display area 102. Also the state of the display area may vary for some reason during the absence of power supply, thus eventually showing meaningless data. Thus it is desirable to clear the effective display area 104 at the start of power supply, in order to prevent the mixed presence of desired data and meaningless data.

In the present embodiment, therefore, the effective display area 104 is cleared and the frame 106 is formed at the start of power supply, and they are cleared at the termination of power supply. The clearing of the area 104 is conducted by effecting the block erasure explained in (3.5) over the entire blocks.

The clearing can be conducted without the image clearing data (for example all-white data) from the word processor 1, thereby alleviating the load thereof and achieving high-speed clearing enabled by the absence of data transfer.

(4) Structure of Units of Display Control Device

In the following there will be explained the units constituting the display control device 50 and utilized for achieving the functions explained in (3).

(4.1) Symbols

In the following there are summarized signals and data exchanged between the units.

| SIGNAL | NAME | FROM | TO | CONTENT |
|---|---|---|---|---|
| Tout | System clock | Controller 500 (PORT2) | Data output unit 600 | Basic clock for the function of data output unit 600. Used for synchronizing the time on control program with the time on display. Also supplied to the controller 500 for securing stable horizontal scanning period. |
| $\overline{IRQ1}$ | Line access interruption | Data output unit 600 | Controller 500 (PORT5) | Either signal supplied to the controller 500, in response to an interruption signal IRQ generated by the data output |
| $\overline{IRQ2}$ | Block access interruption | Data output unit 600 | Controller 500 (PORT5) | unit 600 according to the real address data from the word processor 1. |
| MR | Memory ready | MR generator | Controller 500 | For access timing to D/A converter |

-continued

| SIGNAL | NAME | FROM | TO | CONTENT |
|---|---|---|---|---|
| | | | (PORT5) | 900. |
| $\overline{INTR}$ | A/D conversion completion | A/D converter 950 | Controller 500 (PORT6) | Indicating completion of A/D conversion of detected temperature data. |
| IBUSY | Busy | Controller 500 (PORT6) | Data output unit 600 | To be supplied to the word processor 1. |
| Light | Light source control | Controller 500 (PORT6) | Word processor 1 | Requesting on/off of light source FL. |
| P ON/OFF | Power status | Controller 500 (PORT6) | Word processor 1 | Requesting process at power on/off. |
| DACT | Panel access identification | Controller 500 (PORT6), Data output unit 600 (Gate array 680) | Data output unit 600 (DACT generator) | For identifying access/non-access of the effective display area 104. |
| RD | Read | Controller 500 (PORT7) | A/D converter 950 Data output unit 600 | For reading data from input units. |
| WR | Write | Controller 500 (PORT7) | A/D converter 950 D/A converter 900 Data output unit 600 | For data writing of various units. |
| DD0–DD7 | Data on system data bus | Various unit | Various units | |
| A0–A15 | Address signal | Controller 500 (PORT1, PORT4) | Data output unit 600 | Causing data output unit 600 to select various units |
| $\overline{RES}$ | Reset signal | Controller 500 (Resetter 507) | Controller 500 (CPU 501) | For resetting CPU of controller 500. |
| $\overline{NMI}$ (PDOWN) | Non-maskable interruption (power-off interruption) | Word processor 1 | Controller 500 (CPU) | In response to PDOWN informing the power-off from the word processor 1, the processor 500 executes suitable process. |
| E | Clock | Controller 500 (CPU) | D/A converter 900 Data output unit 600 | Generated with variable pulse duration by the signal MR, for appropriate access to D/A converter 900 or data output unit 600. |
| D0–D3 | Image data | Data output unit 600 | Segment drive unit 200 | Generated from image data entered as signal D from the word processor 1. |
| D | | Word processor 1 | Data output unit 600 | Including data to be displayed, real address data and horizontal synchronization signal. |
| CLK | Transfer clock | Word processor 1 | Data output unit 600 | Transfer clock for signal D. |
| A/$\overline{D}$ | Address/data identification | Data output unit 600 | Data output unit 600 | For discriminating whether the signal D is image data or real address data. |
| RA/D | Real address data | Data output unit 600 (data input unit 601) | Data output unit 600 (Register 630) | For specifying data display position. Generated from data entered from the word processor 1 as signal D in superposition with horizontal synchronization signal and in correspondence with each line. |
| IRQ | Interruption | Data output unit 600 | Controller 500 | Sent to controller 500 in response to signal A/D. Given to controller 500 as IRQ1 or IRQ2 according to setting. |
| IRQ3 | Internal interruption | Controller 500 (timer) | Controller 500 (CPU) | Internal interruption for terminating non-active (sleep) state |
| $\overline{FEN}$ | Frame end | Data output unit 600 (FEN generator) | Data output unit 600 (gate array 680) | For forming horizontal frame |
| $\overline{DSO}$ | Chip select | Data output unit (device selector) | A/D converter 950 | Generated in response to signals A10–A15 from controller 500, as chip select signals for various units. |
| $\overline{DSI}$ | Chip select | Data output unit (device selector) | D/A converter 900 | Generated in response to signals A10–A15 from controller 500, as chip select signals for various units. |
| $\overline{DS2}$ | Chip select | Data output unit (device selector) | Data output unit 600 (register selector) | Generated in response to signals A10–A15 from controller 500, as chip select signals for various units. |
| $\overline{DS3}$ | Chip select | Data output unit (device selector) | Not used (register selector) | Generated in response to signals A10–A15 from controller 500, as chip select signals for various units. |
| $\overline{LATH}$ | Latch | Data output unit 600 | Segment drive unit 200 (segment drive element 210) | For latching image data, present in shift register of element 210, into line memory. |
| CA0–CA6 | Line select | Data output unit 600 | Common drive unit 300 (Common drive element 310) | Selection signal for horizontal scanning lines to be given to element 310. CA5 and CA6 are used for block selection, and CA0–CA4 are used for line selection. |
| $\overline{CCLR}$ | Clear | Data output unit 600 | Common drive unit 300 | |

-continued

| SIGNAL | NAME | FROM | TO | CONTENT |
|---|---|---|---|---|
| CEN | Enable | Data output unit 600 | Common drive unit 300 | |
| CM1, CM2 | Wave form define | Data output unit 600 | Common drive unit 300 | For defining output wave form of common drive element 310. |
| $\overline{SCLR}$ | Clear | Data output unit 600 | Segment drive unit 200 | |
| SEN | Enable | Data output unit 600 | Segment drive unit 200 | |
| SM1, SM2 | Wave form define | Data output unit 600 | Segment drive unit 200 | For defining output wave form of segment drive element 210. |
| $\overline{V1–V4}$ $\overline{CVc, SVc}$ | Frame drive switch | Data output unit 600 | Frame drive unit 700 | For defining output of frame drive unit 700. |
| V1, V2 | Voltage signal | Power supply controller 800 | Common drive unit 300 | For defining output voltages (+, −) of element 310. |
| V3, V4 | Voltage signal | Power supply controller 800 | Segment drive unit 200 | For defining output voltages (+, −) of element 210. |
| Vc | Voltage signal | Power supply controller 800 | Drive units 200, 300 | For defining the reference ("0") of output voltage. |

(4.2) Control unit

Figure 11A:
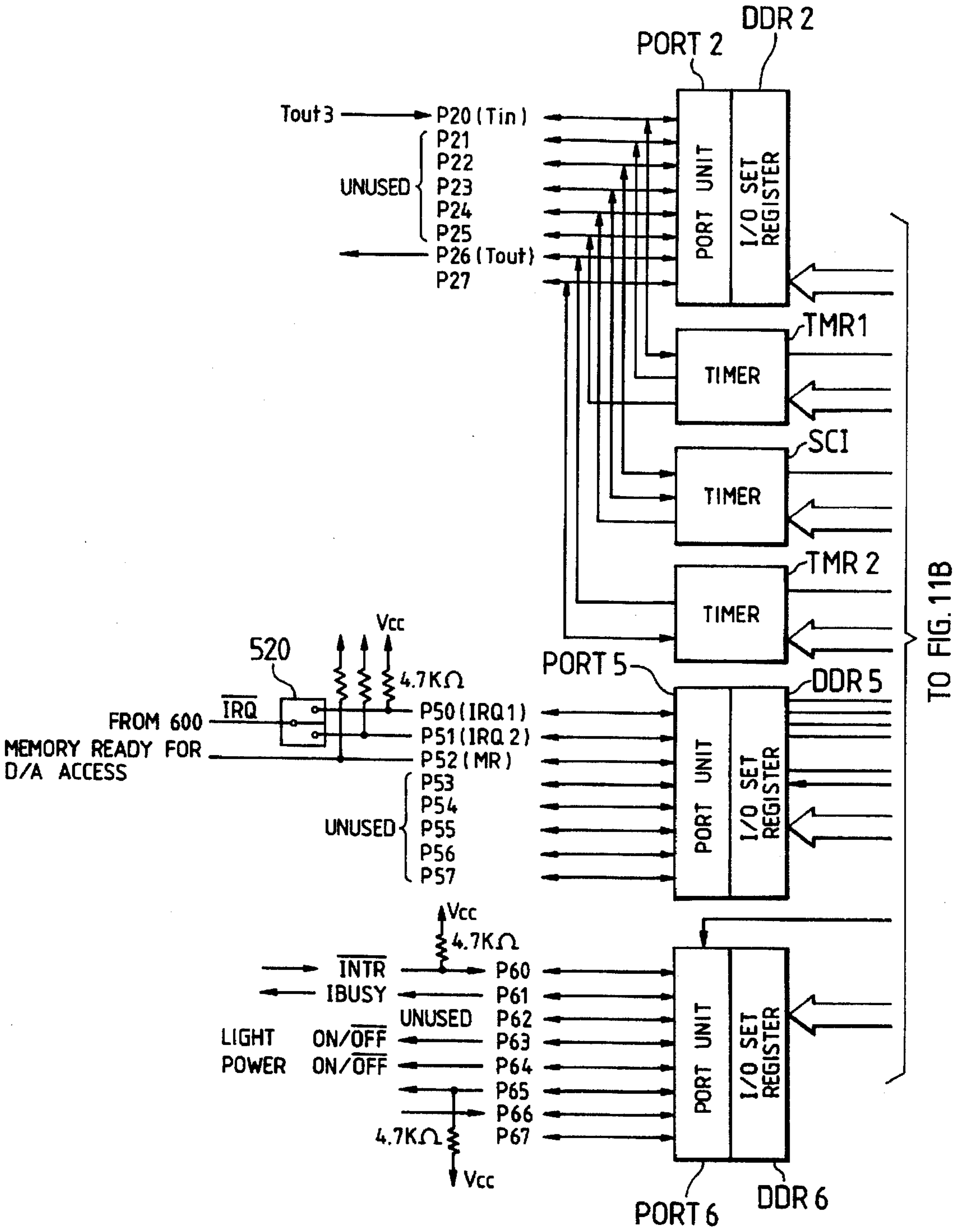
FIGS. 11A and 11B are respectively block diagrams showing an example of the control unit of the embodiment.
Figure 11B:
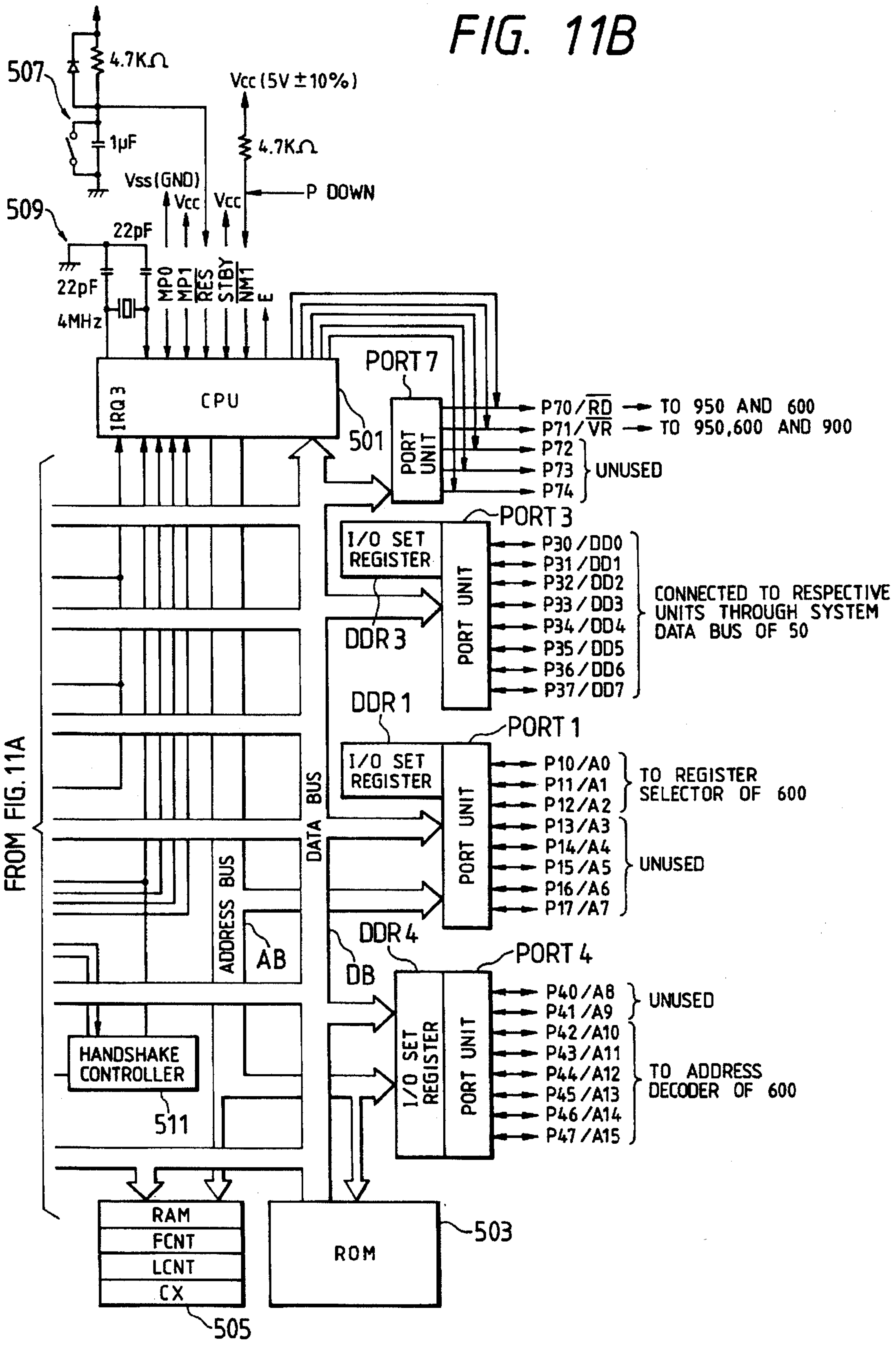
Figure 12:
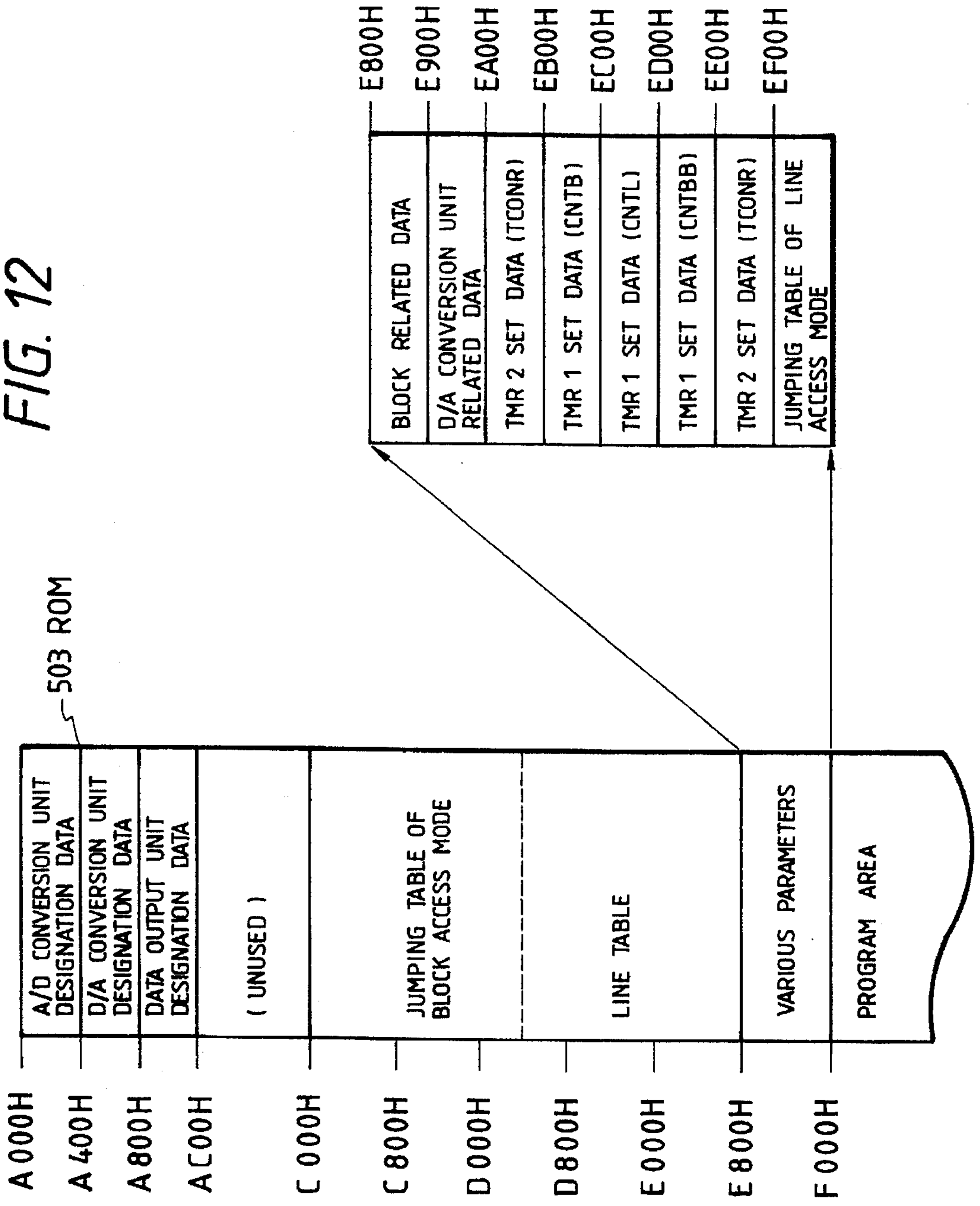
FIG. 12 is a chart showing an example of the memory space in the control unit shown in FIGS. 11A and 11B.
Figure 41:
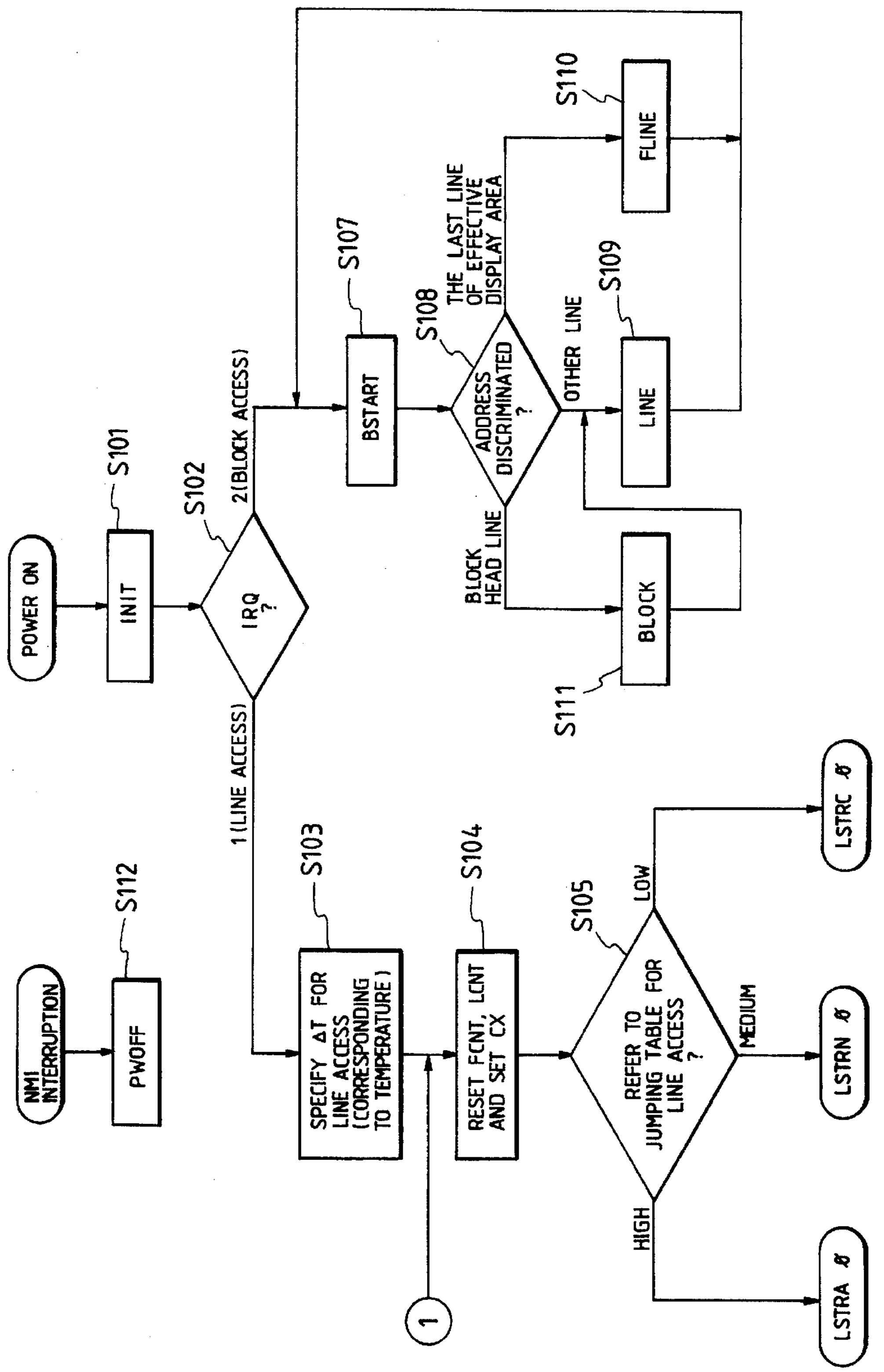
FIG. 41 is a flow chart showing the outline of display control sequence of the embodiment.

FIG. 11 shows an example of the structure of the controller 500, wherein provided are a CPU 501 such as a microprocessor for controlling various unit for example according to a control sequence shown in FIG. 41; a ROM 503 containing the programs corresponding for example to the control sequence of FIG. 41 to be executed by the CPU 501 and the tables shown in FIG. 12; and a RAM 505 to be utilized by the CPU 501 in the course of execution of the control sequence.

In the present embodiment, the RAM 505 is provided with a counter area FCNT for frame inversion, storing a number N of the frames after which the frame inversion is executed; a counter area LCNT for MH inversion, storing a number of lines after which the signal phase is inverted; and a register CX for recognizing the currently employed wave form at the signal wave setting in response to the temperature.

Port units PORT1–PORT6 can be utilized for input or output, and are respectively provided with ports P10–P17, P20–P27, P30–P37, P40–P47, P50–P57 and P60–P67. An output port unit PORT7 has ports P70–P74. Input/output setting registers (data direction registers) DDR1–DDR6 are used for setting the input or output direction of the port units PORT1–PORT6. In the present embodiment, the ports P13–P17 (corresponding to signals A3–A7) of the port unit PORT1, the ports P21–P25 of the port unit PORT2, the ports P40 and P41 (corresponding to the signals A8 and A9) of the port unit PORT4, the ports P53–P57 of the port unit PORT5, the ports P62 of the port unit PORT6, the ports P72–P74 of the port unit PORT7, and terminals MPO, MP1 and STBY of the CPU 501 are not used.

507 and 509 are respectively a resetter for resetting the CPU 501, and a clock generator for supplying the CPU 501 with a reference clock signal (4 MHZ).

TMR1, TMR2 and SCI are timers each provided with a reference clock generator and a register and capable for example of dividing the frequency of said clock signal in response to the setting in the register. At first, the timer TMR2 generates a system clock signal Tout for the data output unit 600 by dividing the frequency of the reference clock signal in response to the register setting. Based on the signal Tout, the data output unit 600 generates a clock signal defining the horizontal scanning period (1H) of the display unit 100. The timer TMR1 executes the regulation between the functioning time on the program and the horizontal scanning period of the display area 102, according to the register setting.

The timers TMR1, TMR2 generate an internal interruption signal IRQ3 for supply to the CPU 501 at the expiration of a predetermined time or at the start of next timer operation succeeding the expiration, and the CPU 501 accepts the signal if necessary.

The timer SCI is not used in the present embodiment.

In FIG. 11 there are further provided an address bus AB and a data bus DB for connecting the CPU 501 with various units, and a handshake controller 511 between the port units PORT5, PORT6 and the CPU 501.

(4.3) Memory Space of ROM (4.3.1) Structure of Memory Space

FIG. 12 shows an example of memory space assignment in the ROM 503. Spaces A000H - A3FFH and A400H - A7FFH respectively store data for specifying access to the A/D converter 950 and the D/A converter 900. An area A800H - ABFFH stores data for designating a display device driving register (FIG. 16) in access to the data output unit 600.

An area C000H - E7FFH is referred to at the release of the real address data RA/D from the word processor 1, and contains a jumping table for discriminating, in the block access mode, whether the released address data belong to the first line of a block, and a line table for specifying a common line to be activated in response to the released real address data RA/D.

An area E800H - EFFFH stores parameters employed in the controls to be explained later in relation to FIGS. 42 and 45A to 47, and is composed of a block-related data area (E800H -) for storing the number of blocks (20 in the present embodiment); a D/A converter-related data area (E900H -) storing data for regulating the D/A converter 900 for variably regulating the driving voltage of transparent electrodes in response to the temperature; a data area for setting the block access timer TMR2 (EA00H -) for storing data (TCONR) to be set in the register TCONR of the timer TMR2 for generating the clock signal Tout for defining the horizontal scanning period (1H) of the display device 100 in the block access mode; and timer TMR1 setting data areas (EB00H -, EC00h -, ED00h -) for storing register data (CNTB), (CNTL), (CNTBB) for the timer TMR1 which is used for regulation of the operating time on the display device 100 and the time on control sequence.

There are also provided a line access timer TMR2 setting data area (EE00H -) storing data (TCONRL) to be set in the register TCONR of the timer TMR2 for generating the clock signal Tout to be used in defining the horizontal scanning period of the display device 100 in the line access mode; and a line access jumping table area (EF00H -) for activating a program for drive with temperature-responsive signal wave in the line access mode.

A program area F000H—stores programs corresponding to the control sequences to be explained later in relation to FIGS. 41, 42 and 45A to 47.

(4.3.2) Jumping Table (C000H -) for Block Access Mode

In the block access mode, the process sequence varies according to whether the real address data RA/D released from the word processor 1 belong to the first line of a block or not. This is because, if the data correspond to the first line of a block, the data recording in the lines of the block is conducted after the display of said block is cleared.

For this reason it is necessary to discriminate whether the real address data RA/D from the word processor 1 correspond to the first line of a block. Such discrimination is possible by comparison of each entered real address data with the address data of the first line of the blocks.

However such successive comparison gives rise to a difference in the processing time as the number of objects to be compared increases, because the number of comparing steps fluctuates according to the position of the comparing step in the program.

In the present embodiment, therefore, there is employed a discrimination process utilizing a jumping table for achieving uniform discrimination time, as will be explained in the following.

Figure 13:
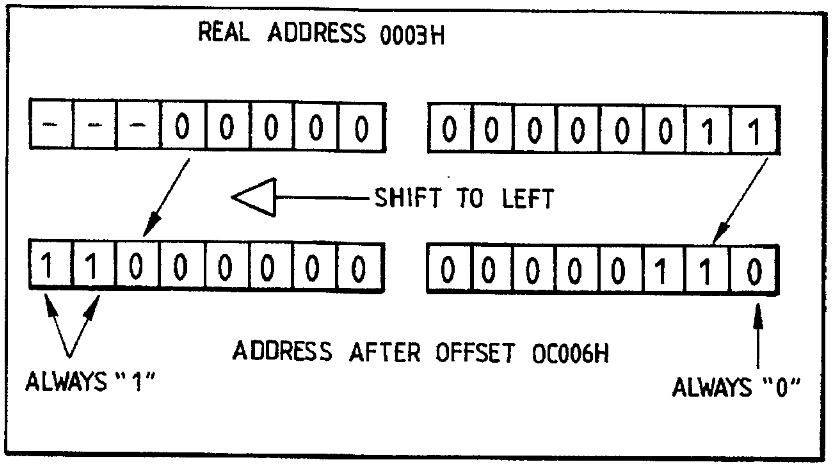
FIG. 13 is a schematic view showing the address conversion employed in the embodiment.

For example, when the read address data from the word processor 1 are "03"H (line number "3") as shown in FIG. 13, said data are shifted to left by a bit to change the upper two bits to "1" and the lowermost bit to "0", thereby obtaining offset data "C006H". The data are used as the address on the memory space, and a code indicating the first line of a block is stored at the address. In this manner the discrimination of the first line can be made with a same process time for all the real address data.

Furthermore, if the CPU 501 employed is capable of using an index register (IX) and using a command for jumping to an address indicated by the index register (for example "JUMP IX"), it is possible to immediately start a suitable process by executing the above-mentioned command, by means of storing the data after offsetting in the register IX and storing the destination address after jumping in the jumping table.

In the present embodiment, there is employed a CPU 501 capable of using the index register and said command. Also there is provided a jumping table (C000H - C31EH) corresponding to the line numbers (0–399) as shown in FIG. 14, and process to be activated (first address of said process in the program area) is stored in each address of the jumping table.

Figure 14:
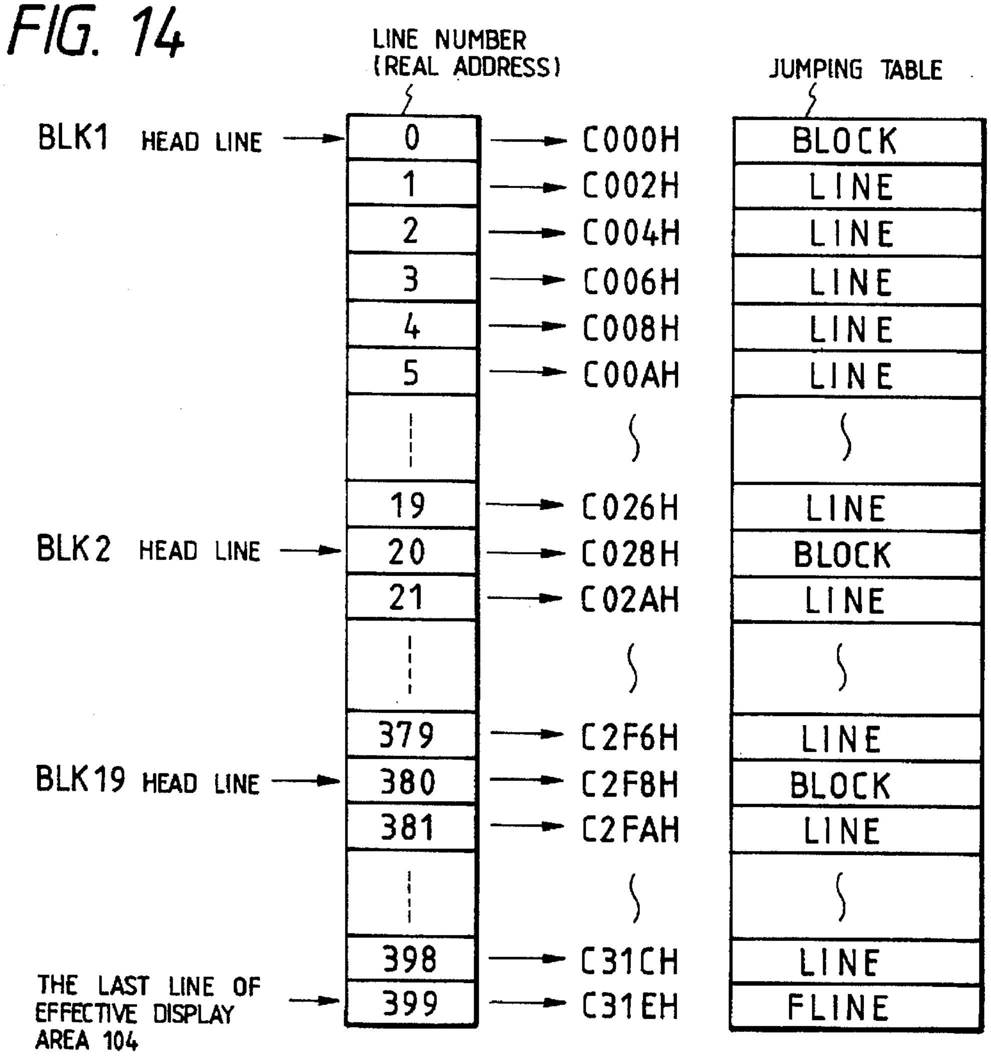
FIG. 14 is a schematic view showing an example of correlation between line numbers and a jumping table in the embodiment.

In FIG. 14, BLOCK, LINE and FLINE respectively indicate a block erasing procedure in the block access; a line writing procedure; and a procedure for temperature compensation data renewal at the final line writing in the effective display area 104, which will be explained later with reference to FIGS. 45A to 45D.

In the line access mode, only the last line need to be discriminated in order to identify whether the temperature compensation data are to be renewed. Consequently there exists only one object of comparison, so that discrimination utilizing the jumping addresses as explained above is not employed for the line number.

(4.3.3) Line Table

The real address data RA/D require conversion according to the structure of the common drive unit 300. In the present embodiment, the drive unit 300 is composed of five common drive elements 310, each having outputs of 80 bits and constituting 4 blocks of 20 bits each. In this manner there are provided 400 common scanning lines of which one is selected by:

(1) selecting one of five common drive elements 310;

(2) selecting one of four blocks of the element 310; and (3) selecting one of 20 lines of the block.

Figure 15:
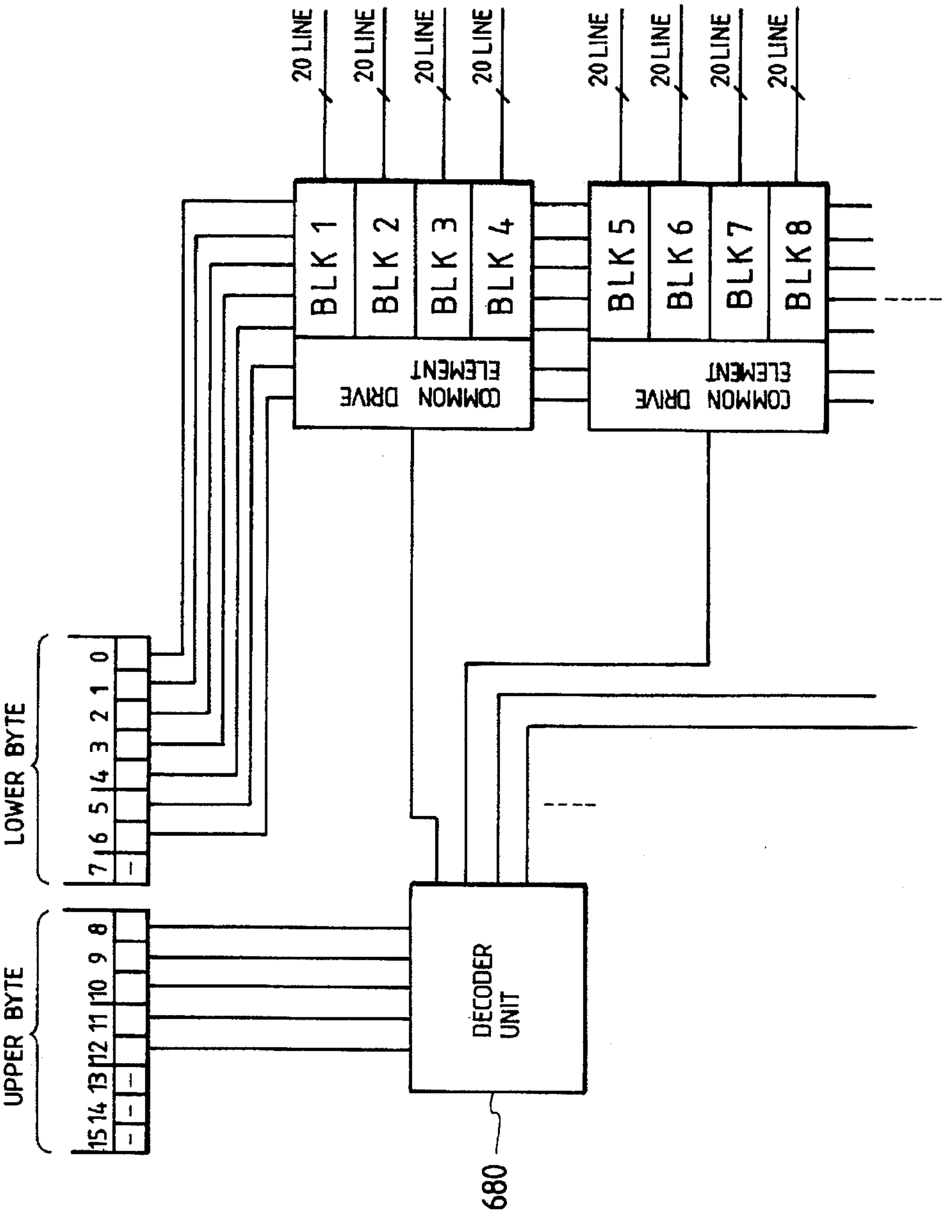
FIG. 15 is a block diagram showing the selecting method for the scanning lines in the above-mentioned embodiment.

In the present embodiment, as shown in FIG. 15, there are employed line selecting addresses of 2 bytes, of which 12th - 8th bits are used for selecting the elements 310; 6th and 5th bits for the block selection; and 4th - 0th bits for line selecton. The conversion from the read address data to the line selecting address data can be made in a similar manner as in the process of FIG. 13 utilizing the jumping table, by developing line selecting address data as a line table.

In FIG. 15, a decoder unit 680 for selecting the elements 310 has 5 bits (12th - 8th) for chip selection, so that the number of elements 310 can be increased to $2^5=32$. In such case there can be selected 2560 scanning lines at maximum.

(4.3.4) Parameter Storage Area

In the present embodiment, optimum drive control is realized by regulating, according to the temperature condition, various driving conditions of the display device 100, namely the driving voltage and the horizontal scanning period, and the signal wave form in case of the line access mode. It is therefore necessary to correct the driving conditions according to the data from the temperature sensor 400.

An area E900H - EEFFH stores the block rection data. The storage in the present embodiment is made in the following manner, in order to improve the efficiency of parameter reading in response to the temperature.

For example, if a temperature or a step in a temperature range is to be correlated with a D/A converter-related signal; (TCONR); (CTNB), (CNTL) or (CNTBB); and (TCONRL), these parameters corresponding to temperature are stored in areas of which two lower bytes have a same number. The temperature data obtained from the A/D converter 950 or the data obtained by suitable processing thereof are used as an address for the lower two bytes in a similar manner as already explained in relation to FIG. 13, and the data reading is conducted by changing the upper two bytes in succession. In this manner there can be obtained a group of temperature-related parameters.

As an example, in case the temperature data are "0080"H, at first "E900"H is added thereto and access is made to an address "E980"H to obtain data (driving voltage) of the D/A converter. Then "0100"H is added to "E980"H and access is made to an address "EA80"H to obtain data (TCONR) for setting the timer TMR2 (data for generating the basic clock signal for defining the horizontal scanning period on the display area). Thereafter the addition and access are conducted in a similar manner to obtain data CNTB, CNTL and CNTBB corresponding to the temperature.

Particularly in the line access mode, in which the signal wave form is modified according to the temperature, the data TCONR in the block access mode cannot be utilized because of the significant change in AT. Thus data TCONRL corresponding to the temperature and the signal wave form are read from an area EE00H in a similar manner as explained above.

A jumping table area EF00H to be employed in the line access mode stores the first addresses of the programs for the drive with the signal waves according to the temperature, and these programs are activated in a similar manner as in the jumping table for block access mode (cf. FIG. 14).

The present embodiment assumes a temperature range of 45° to 5° C. for use, and the control is conducted by dividing the temperature range into three ranges, and employing a signal wave (A) involving the in-line inversion to be explained later with reference to FIGS. 34A–34E, in a temperature range of 45° to 35° C.; a signal wave (N) lacking the in-line inversion to be explained later with reference to FIGS. 30A and 30B a temperature range of 35° to 15° C.; and a signal wave (C) involving the in-line inversion to be explained later with reference to FIGS. 35A–35E, in a temperature range of 15° to 5° C. In these temperature ranges there are activated respectively different programs, and the first addresses of routines LSTRAO, LSTRNO and LSTRCO relative to the signals waves A, N and C are formed as a table in the area EF00h—in relation to the temperature.

(4.4) Data Output Unit (4.4.1) Structure

FIG. 16 shows an example of the structure of the data output unit 600, wherein a data input unit 601 is connected with the word processor 1 and receives the signal D and the transfer clock CLK. The signal D, supplied from the word processor 1, includes the image signal and the horizontal synchronization signal, and, in the present embodiment, the real address data are superposed with the horizontal synchronization signal or in the horizontal blanking period. The data input unit 601 switches the data output path in response to the detection of the horizontal synchronization signal or the horizontal blanking period, and releases the superposed signal component as the read address data upon the detection, or releases the signal component as the 4-bit parallel image data DO–D3 during the absence of the detection.

Also in response to the identification of the read address data, the data input unit 601 activates the address/data identification signal $A/\overline{D}$, which is supplied to an $\overline{IRQ}$ generator 603 and a DACT generator 605. In response to the signal the $\overline{IRQ}$ generator 603 generates an interruption signal $\overline{IRQ}$, which is supplied to the controller 500 as an interruption command $\overline{IRQ1}$ or $\overline{IRQ2}$ according to the setting of a switch 520, thus effecting operations in the line access mode or in the block access mode. On the other hand, in response to said signal $A/\overline{D}$, the DACT generator 605 generates a DACT signal for discriminating the presence or absence of access to the display device 100, which is supplied to the controller 500, a $\overline{FEN}$ generator 611 and a gate array 680.

In response to a trigger signal from a $\overline{FEN}$ trigger generator 613 generated when the DACT signal is activated, the $\overline{FEN}$ generator 611 generates a signal $\overline{FEN}$ for activating the gate array 680. The $\overline{FEN}$ trigger generator generates the trigger signal by a write signal $\overline{ADWR}$ which is supplied from the controller 500 to the A/D converter 950 for instructing the fetching of temperature information from the temperature sensor 400. In this state, the $\overline{FEN}$ trigger generator 613 is selected by a chip select signal $\overline{DS0}$ generated by a device selector 621. More specifically, when the controller 500 selects the A/D converter 950 for reading the temperature data, the $\overline{FEN}$ trigger generator 613 is also selected, and the frame drive is also activated in response to the write signal $\overline{ADWR}$.

A busy gate 619 provides the word processor 1 with a signal BUSY indicating the busy state of the display control device 50, in response to a busy signal IBUSY from the controller 500.

A device selector 621 receives the signals A10–A15 from the controller 500, and accordingly generates signals $\overline{DS0}$–$\overline{DS2}$ for chip selection of the A/D converter 950, D/A converter 900 and data output unit 600. A register selector 623 is activated by the signal $\overline{DS2}$, and sets a latch pulse gate array 625 according to the signals A0–A4 from the controller 500. The gate array 625 is used for selecting the registers of a register unit 630, and has a number of bits corresponding to the number of the registers. In the present embodiment, the register unit 630 has 22 areas of one byte each, and the latch pulse gate array 625 has 22 bits, with each bit corresponding to each of the 22 areas. Thus, when the register selector 623 sets a bit in the latch pulse gate array 625, an area corresponding to the bit is selected, and the data reading or writing is conducted in thus selected register through the system data bus, according to the supply of the read signal $\overline{RD}$ or write signal $\overline{WR}$ from the controller 500 to the gate array 625.

The register unit 630 is further provided with read address data registers RA/D L and RA/D U for respectively storing the lower and upper bytes of the real address data RA/D, under the control of a real address storage controller 641.

Horizontal dot count data registers DC L and DC U respectively store the lower byte and upper byte of data corresponding to the number of display dots in the horizontal scanning direction (800 dots in the present embodiment). A horizontal dot counter 643, activated at the start of transfer of the image data D0–D3 for counting suitable clock pulses, causes a generator 645 to generate a latch signal $\overline{LATH}$ when the count thereof becomes equal to the values stored in the registers DC L and DC U.

A drive mode register DM stores mode data corresponding to the line access mode or the block access mode.

Registers DL L and DL U for the common line selecting address data respectively store the lower byte and the upper byte of 16-bit data shown in FIG. 15. The data stored in the register DL L are released as block specifying address data CA6, CA5 (corresponding to 6th and 5th bits in FIG. 15), and line specifying address data CA4 - CA0 (corresponding to 4th - 0th bits in FIG. 15). Also the data stored in the register DL U are released as chip select signals $\overline{CS0}$–$\overline{CS7}$ for selecting the common drive elements 310.

CL1 and CL2 are one-byte areas for storing drive data to be supplied to the common drive unit 300, in driving the common lines (line writing) in the block access mode, while SL1 and SL2 are one-byte areas for storing drive data to be supplied to the segment drive unit 200 in driving the segment lines.

CB1 and CB2 are one-byte areas for storing drive data to be supplied to the common drive unit 300, in driving the common lines at the block erasure in the block access mode, while SB1 and SB2 are one-byte areas for storing drive data to be supplied to the segment drive unit 20 in similar manner.

CC1 and CC2 are one-byte areas for storing data to be supplied to the common drive unit 300 in driving the common lines at the line writing in the line access mode, while SC1 and SC2 are one-byte areas for storing drive data to be supplied to the segment drive unit 200 in similar manner.

Succeeding three one-byte areas are used for storing data for switching of the frame drive unit 700, and are divided into 4-bit registers FV1, FCVc, FV2, FV3, FSVc and FV4.

A multiplier 661 multiplies the frequency of the Tout from the controller 50, for example by two. 663A, 663B, 663C and 663D constitute a ring counter for the phases 3, 4, 6 and 12 of the output of the multiplier 661, and are utilized for dividing the horizontal scanning period (1H) into 4, 3 or 2, or not dividing the same in the block access mode or in the N wave drive in the line access mode. The period thus divided will be hereinafter represented by ΔT, so that, for example, in case of division into three, 3ΔT becomes equal to 1H.

In the line access mode, when the signal wave A or C involving in-line inversion is selected, in which the normal wave I' is combined with the inverted wave I, the output duration of the wave I' or I (hereinafter called 1H* period; 1H is composed of plural 1H* periods; 1H=1H* if in-line inversion is not executed) is divided into 4, 3 or 2, or not divided, by said ring counter. For example, in case of division into three, the 1H* period is composed of 3ΔT, and ΔT in such case is generally selected smaller than ΔT for the case without in-line inversion.

A multiplexer 665 for selecting the outputs of the ring counters 663A–663D, is set according to the content of the drive mode register DM, indicating the number of division of 1H period. For example, in case of division into three, there is selected the output of the 4-phase ring counter 663B.

There are also provided a 4-phase ring counter 667 for the outputs of the ring counters 663A–663D, and a multiplexer 669 similar to 665.

Figure 17:
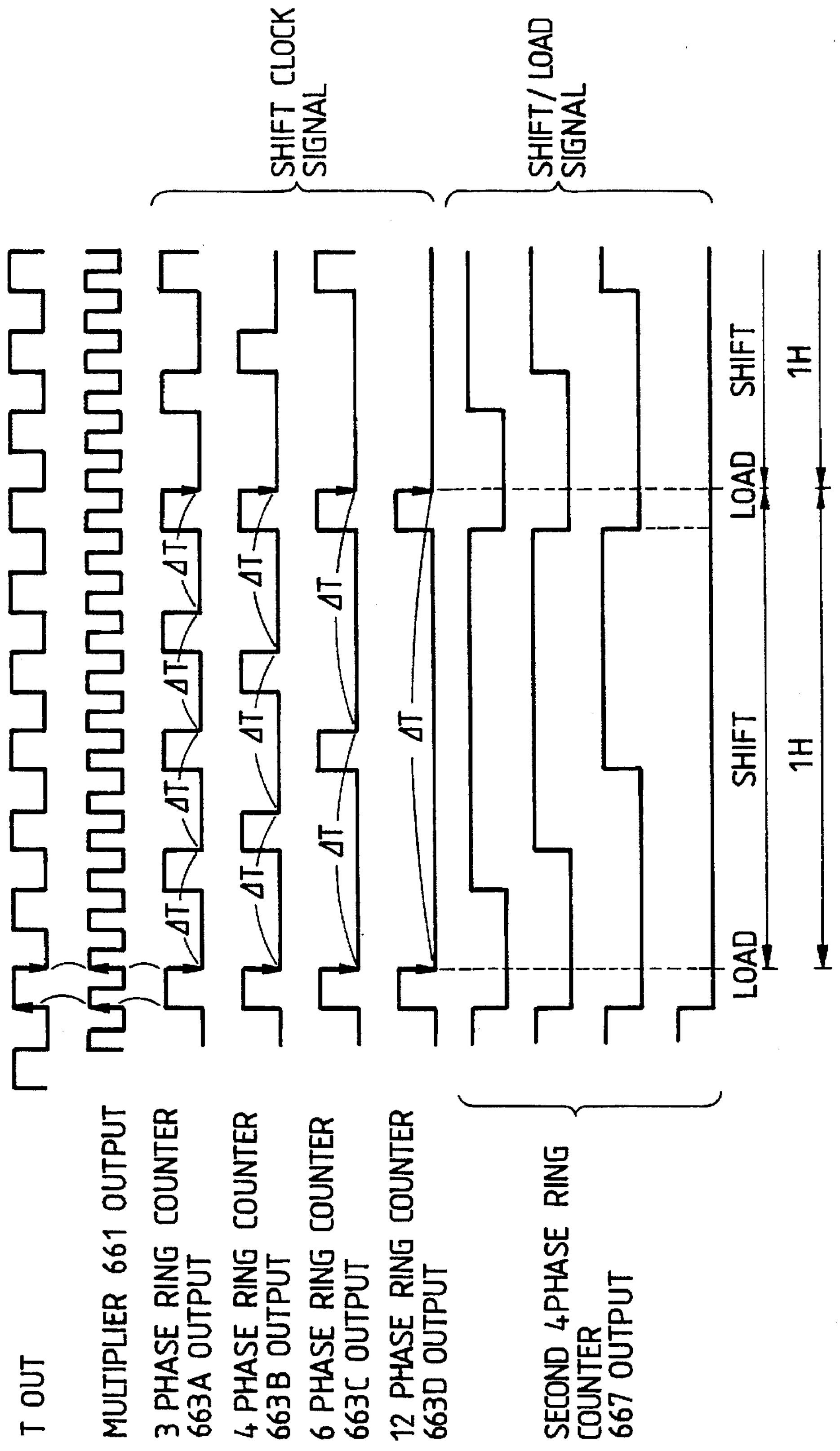
FIG. 17 is a wave form chart showing various signals for generating a driving signal wave in the data output unit shown in FIGS. 16A and 16B.

FIG. 17 shows the clock signal Tout, the output wave forms of the multiplier 661 and of the ring counters 663A–663D and 667. Thus, when the multiplexer 665 select one of the outputs of the ring counters 663A–663D, there is selected 4ΔT/1H, 3ΔT/1H, 2ΔT/1H or ΔT/1H (or 4ΔT/1H*, 3ΔT/1H*, 2ΔT/1H* or ΔT/1H*), and the output signal wave is supplied as the shift clock signal to a shift register 673 to be explained later, thereby releasing on/off data at every ΔT. Also the multiplexer 669 selects the outputs of the 4-phase ring counter 667, and the obtained output wave is supplied as a shift-load signal to the shift register 673 for setting the operation with thus selected number of divisions.

Again referring to FIGS. 16A and 16B, areas CL1, CB1 and CC1 of the register unit 630 stores the clear signal $\overline{\text{CCLR}}$ to be supplied to the common drive unit 300 and on/off data at every ΔT of the enable signal CEN; while areas CL2, CB2 and CC2 store on/off data at every ΔT of the driving wave defining signals CM1, CM2. Also areas SL1, SB1 and SC1 store the clear signal $\overline{\text{SCLR}}$ to be supplied to the segment drive unit 200 and on/off data at every ΔT of the enable signal SEN, while areas SL2, SB2 and SC2 likewise store on/off data at every AT of the wave form defining signals SM1 and SM2.

In the present embodiment, each area for storing signal data is composed of 4 bits, of which 1 bit is made to correspond to the on/off data of 1ΔT. Consequently the maximum number of division of 1H or 1H* in the present embodiment is four.

A multiplexer unit 671 is coupled with the areas CL1–SC2 for selecting the signal data for drive at the line writing in the block access mode, at the block erasure, or at the line writing in the line access mode. The multiplexer unit 671 is provided with a multiplexer MPX1 for selecting 4-bit data for the signal $\overline{\text{CCLR}}$ from the areas CL1, CB1 and CC1; a multiplexer MPX2 for selecting 4-bit data for the CEn signal; a multiplexer MPX3 for selecting 4-bit data for the CM1 signal from the areas CL2, CB2 and CC2; a multiplexer MPX4 for likewise selecting 4-bit data for the CM2 signal; a multiplexer MPX5 for selecting 4-bit data for the $\overline{\text{SCLR}}$ signal from the areas SL1, SB1 and SC1; a multiplexer MPS6 for likewise selecting 4-bit data for the SEN signal; a multiplexer MPX7 for selecting 4-bit data for the SM1 signal from the areas SL2, SB2 and SC2; and a multiplexer MPX8 for likewise selecting 4-bit data for the SM2 signal.

673 is a shift register unit provided with parallel/serial (P/S) converting shift registers P/S1–P/S8 respectively connected to the multiplexers MPX1–MPX8 of the multiplexer unit 671, and the output duration ΔT of on/off data of one bit is defined by the output of the multiplexer 665 given as a shift clock signal. Also the output of the multiplexer 669 is given as a preset signal for effecting the operation with the selected number of divisions.

675 is a multiplexer unit having multiplexers MPX11–MPX18 respectively connected to the shift registers P/S1–P/S8, and releases P/S converted on/off data according to the bid selection data (stored in the register DM) of 4-bit on/off data of the signals stored in the registers CL1–SC2.

There are also provided an output unit 677 for effecting a process similar to that effected by the shift register unit 673 and the multiplexer unit 675 in combination with the registers FV1, FCVc, FV2, FV3, FSVc and FV4; and a gate array 680 to be opened in response to the signals DACT and $\overline{\text{FEN}}$, thereby guiding the switch signals $\overline{\text{V1–V4}}$, $\overline{\text{CVc}}$ and $\overline{\text{SVc}}$ to the frame drive unit 700.

690 is an MR generator for sending a signal MR to the controller 500 thereby varying the pulse duration of the clock signal E generated by the CPU 501, in response to the activation of the chip select signal DS1 of the D/A converter 900, namely at the access of the D/A converter 900.

(4.5) A/D converter

Figure 18:
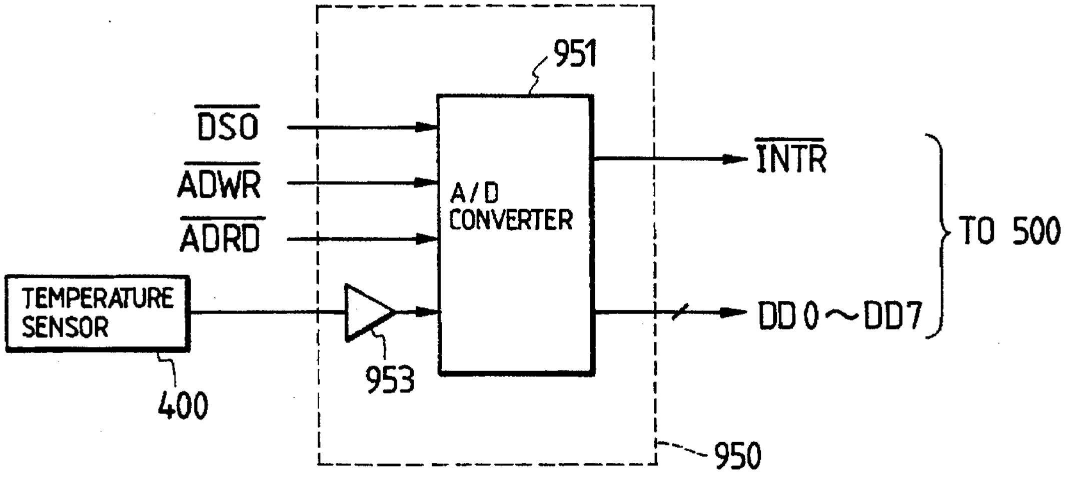
FIG. 18 is a block diagram showing an example of an A/D converter in the embodiment.

FIG. 18 shows an example of the structure of the A/D converter 950, wherein shown are an A/D converter 951; and an amplifier 953 for amplifying the detection signal of the temperature sensor 400 to a level matching the A/D converter 951.

At the temperature detection, the controller 50 releases a chip select signal $\overline{\text{DS0}}$ through the device selector 621 of the data output unit 600, and also releases the write signal $\overline{\text{WR}}$ (shown as $\overline{\text{ADWR}}$). In response the A/D converter 951 converts the analog temperature detection signal obtained from the temperature sensor 400 through the amplifier 953 into a digital signal, and, at the completion of the conversion, activates a signal $\overline{\text{INTR}}$ to inform the controller 500 of the completion of A/D conversion.

In response the controller 500 supplies the A/D converter 951 with a read signal $\overline{\text{RD}}$ (shown as $\overline{\text{ADRD}}$), whereby the A/D converter 951 sends digital temperature data, as the signal DD0–DD7, to the controller 500 through the system bus.

The temperature detection can be conducted, in the refreshing drive in which the display of the effective displav area 104 is constantly refreshed from the first line to the last line, during the vertical flyback period from the end of drive of the last line to the start of drive of the first line. Also it can be conducted periodically for example by timer interruption, in case of partial rewriting drive in which a line or a block alone is rewritten when the display data are altered.

(4.6) D/A Converter and Power Supply Controller

Figure 19:
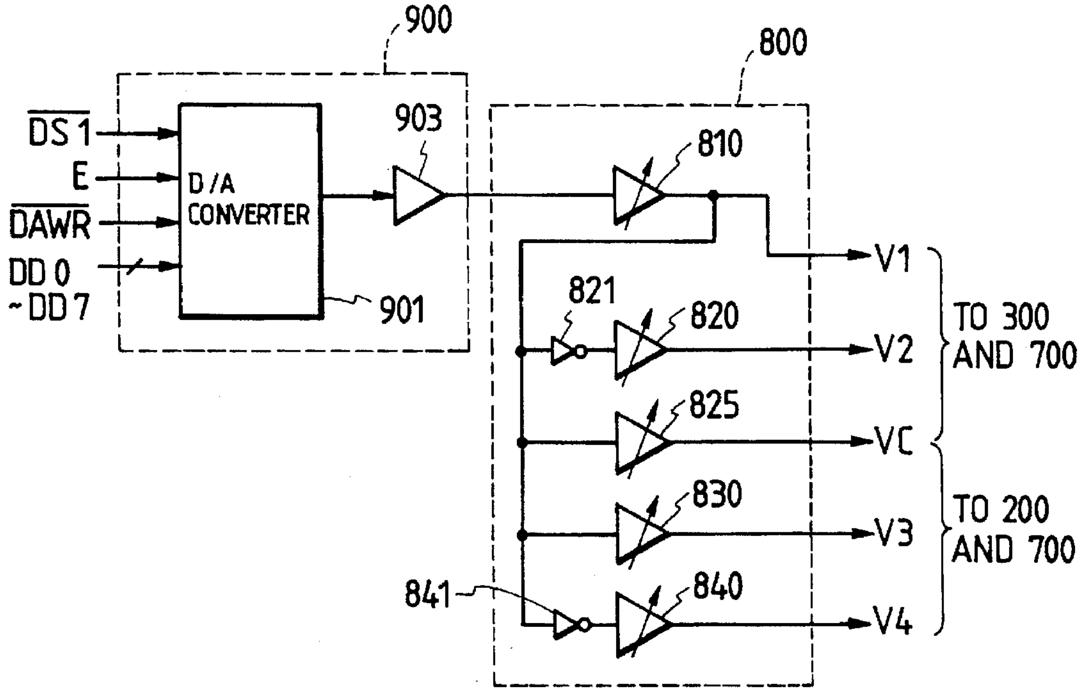
FIG. 19 is a block diagram of a D/A converter and a power supply controller in the embodiment.

FIG. 19 shows an example of the structure of the D/A converter unit 900 and the power supply controller 800.

The D/A converter unit 900 is equipped with a D/A converter 901 and an amplifier 903 for amplifying the output thereof to a level matching a next stage.

In the power supply controller 800, there are provided variable gain amplifiers 810,820, 825, 830 and 840 respectively generating voltage signals V1, V2, VC, V3 and V4. The voltage signal V1 is generated by giving the output of the amplifier 903 to the amplifier 810, and the voltage signals V2, VC, V3 and V4 are respectively generated by giving the output of the amplifier 810 to the amplifiers 820, 825, 830 and 840. There are also provided an inverter 821 placed between the amplifiers 810 and 820; and an inverter 841 placed between the amplifiers 810 and 840.

The voltages V1 and V2 are respectively positive and negative driving voltages to be supplied to the common drive unit 300. The voltages V3 and V4 are respectively positive and negative driving voltages to be supplied to the segment drive unit 200, and the voltage VC is the reference potential given to the drive units 200, 300. These voltage signals are also supplied to the frame drive unit 700.

In the present embodiment, the voltage VC is fixed, and the gains of the amplifiers 810,820, 825, 830 and 840 are so regulated that the ratio of the differences of V1, V2, VC, V3 and V4 from VC is 2:–2:0:1:–1.

In regulating the driving voltage according to the temperature, the controller 500 releases the chip select signal $\overline{DS1}$ through the device selector 621 of the data output unit 600, thereby selecting the D/A converter 901. If the basic clock signal of the D/A converter 901 is different from that of the controller 500, the signal $\overline{DS1}$ is supplied also to the MR generator 690 provided in the data output unit 600 to generate the MR signal, whereby the controller 500 provides the D/A converter 901 with a suitable clock signal E. Then the controller 500 activates the write signal $\overline{WR}$ (shown as $\overline{DAWR}$), and provides the D/A converter 901 with digital data DD0–DD7 for alteration, through the system bus. In response the D/A converter 901 converts the data into an analog signal, which is released through the amplifier 903.

In this manner the amplifier 810 generates the voltage signal V1, and the voltage signals V2, VC, V3 and V4 of the above-mentioned ratio are generated.

In the above-explained example, the voltages V2 etc. are generated from the voltage V1, but the output of the amplifier 903 may be guided individually to the variable gain amplifiers 810, 820, 825, 830 and 840. It is also possible to employ variable gain amplifiers with programmable gain. Also the structure of the power supply controller 800 is not limited to the foregoing but is subject to various modifications, as long as it can generate multi-level voltages according to the driving mode of the drive units 200, 300.

(4.7) Frame Drive Unit

Figure 20:
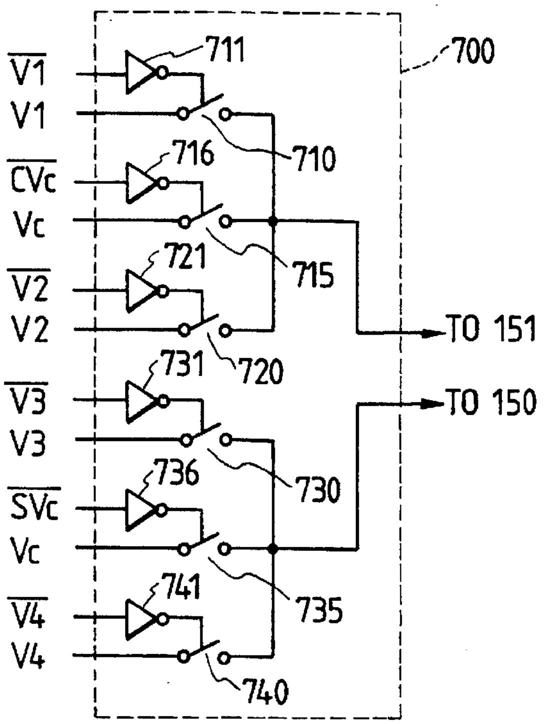
FIG. 20 is a block diagram showing an example of a frame driving unit in the embodiment.

FIG. 20 shows an example of the structure of the frame drive unit 700, wherein switches 710, 715, 720, 730, 735 and 740 for on/off control of the voltage signals V1, VC, V2, VC and V4 are controlled by switch signals $\overline{V1}$, $\overline{CVc}$, $\overline{V2}$, $\overline{V3}$, $\overline{SVc}$ and $\overline{V4}$ supplied from the gate array 680 of the data output unit 600 through inverters 711, 716, 721, 731, 726 and 741.

In the frame driving, the switches 710, 715 and 720 are shifted according to the contents of the registers FV1, FCVc and FV2 provided in the register unit 630 of the data output unit 600, namely according to the status of the signals $\overline{V1}$, $\overline{CVc}$ and $\overline{V2}$, whereby a signal wave assuming one of three levels V1, VC and V3 is applied to the frame transparent electrodes 151 parallel to the common lines. Also the switches 730, 735 and 740 are shifted according to the contents of the registers FV3, FSVc and FV4, namely according to the status of the signals $\overline{V3}$, $\overline{SVc}$ and $\overline{V4}$, whereby a signal wave assuming one of three levels V3, VC and V4 is applied to the frame transparent electrodes 150 parallel to the segment lines.

(4.8) Display Device Drive Unit (4.8.1) Segment Drive Unit

Figure 21:
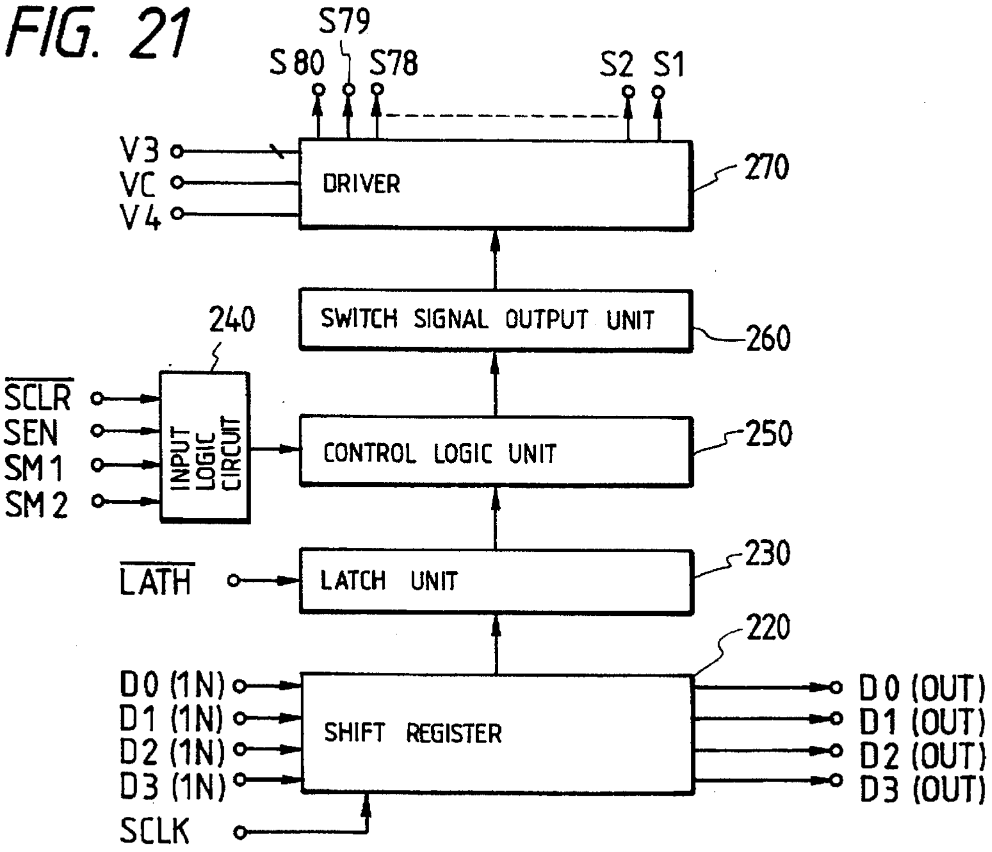
FIG. 21 is a block diagram showing a schematic example of segment driving elements in the embodiment.

FIG. 21 schematically shows an example of the structure of the segment drive element 210 constituting the segment drive unit 200, wherein a 4×20 bit shift register 220 receives 4-bit parallel image data D0–D3 in succession and aligns the data into 80-bit parallel data, in response to the shift clock signal SCLK. An 80 bit latch 230 latches 80-bit parallel data when 80-bit parallel data are filled in the shift registers 220 of 10 elements 210 as the image data D0–D3 are introduced into the shift registers 220 of the next segment drive elements 210, namely when a latch signal $\overline{LATH}$ is given from a $\overline{LATH}$ generator 645 of the data output unit 600.

There are also provided an input logic circuit 240 for receiving signals $\overline{SCLR}$, $\overline{SEN}$, SM1 and SM2 from the data output unit 600 and effecting predetermined logic calculations; a control logic unit 250 for generating data for defining the segment driving signal wave according to the bit data of the latch unit 230, based on the calculated data of the input logic circuit 240; a switch signal output unit 260 having a level shifter and a buffer for shifting the level of the data generated by the control logic unit 250; and a driver 270 for receiving the voltage signals V3, VC and V4 and guiding the signal V3, VC or V4 to the segment lines S80–S1 after switching according to the output of the switch signal output unit 260.

Figure 22:
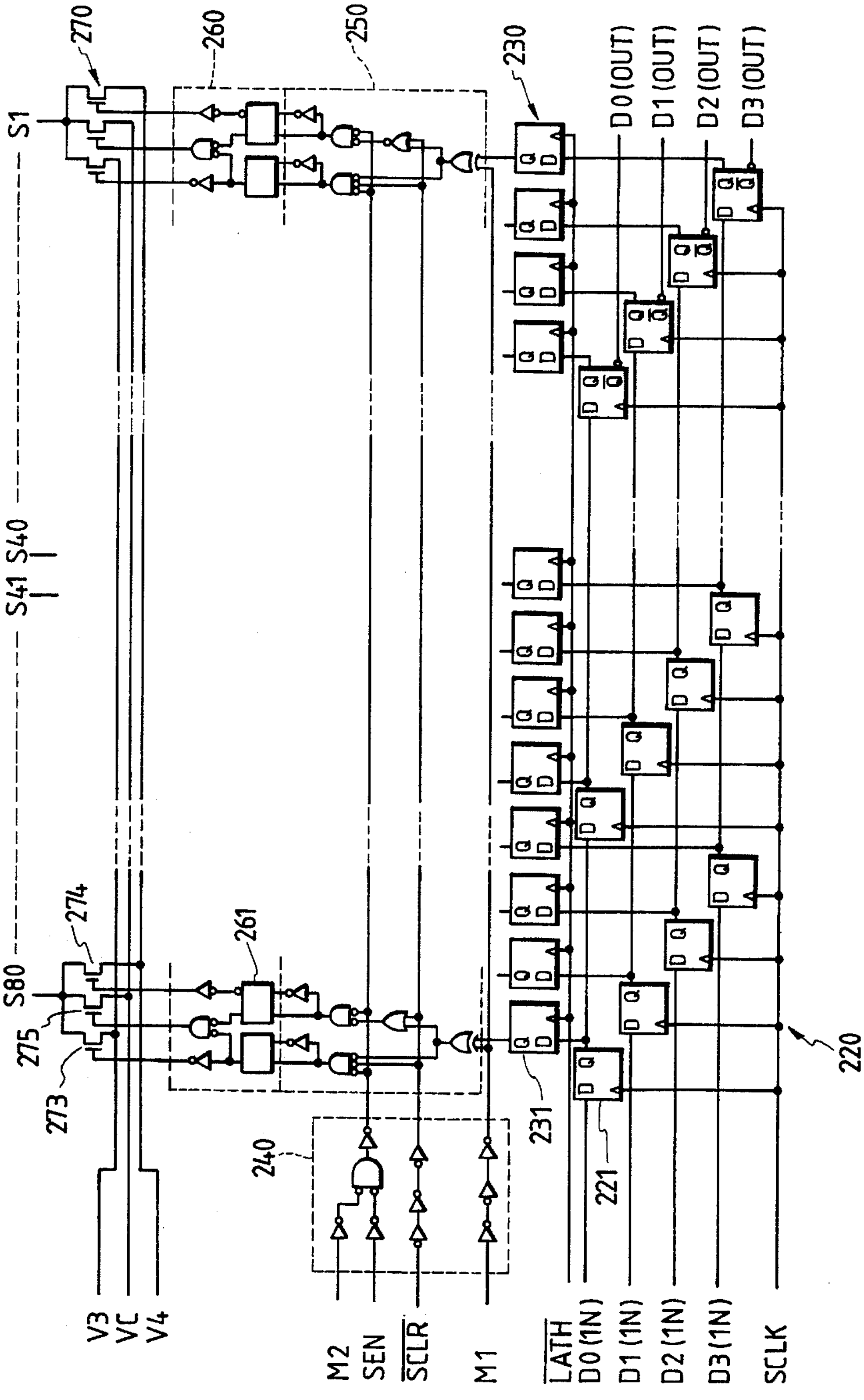
FIG. 22 is a circuit diagram showing a detailed example of the segment driving elements shown in FIG. 21.

FIG. 22 shows an example of the detailed structure of the segment drive element 210 shown in FIG. 21. In the shift register 220 there are provided D-flip-flop 221 each corresponding to a bit, or a segment line. In the latch unit 230 there are provided latch circuits 231. In the switch signal output unit 260 there are provided level shifters 261. In the driver 270 there are provided switches 275,273 and 274 for switching the supply paths of the voltages VC, V3 and V4 according to the switch signals from the switch signal output unit 260.

(4.8.2) Common Drive Unit

Figure 23:
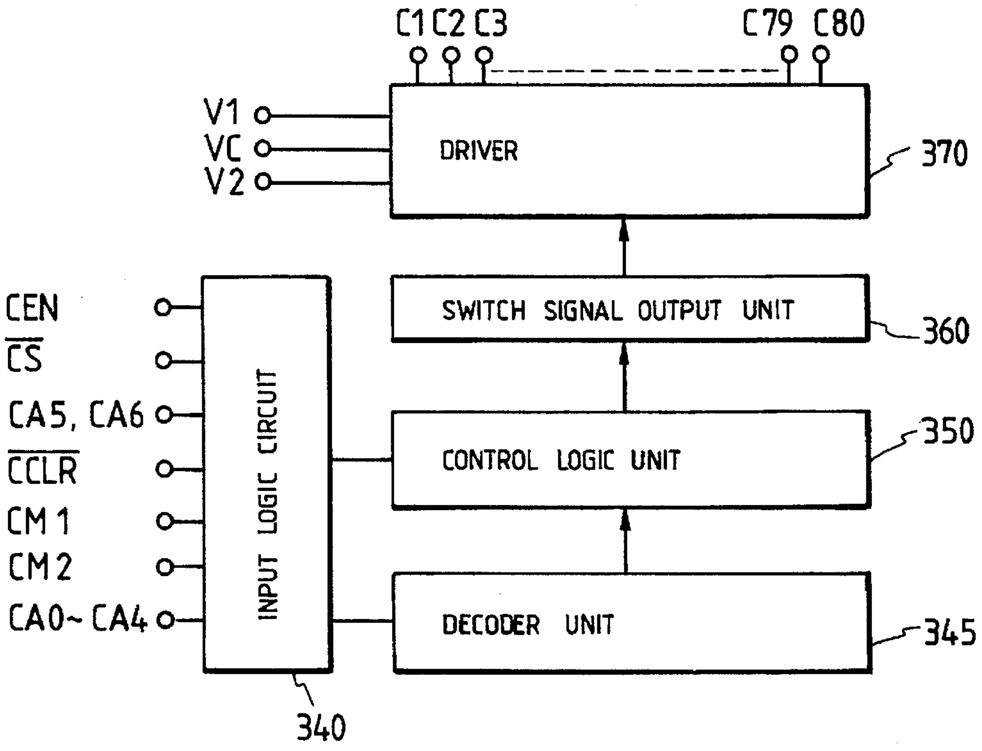
FIG. 23 is a block diagram showing a schematic example of scanning (common) electrode driving elements in the embodiment.
Figure 24:
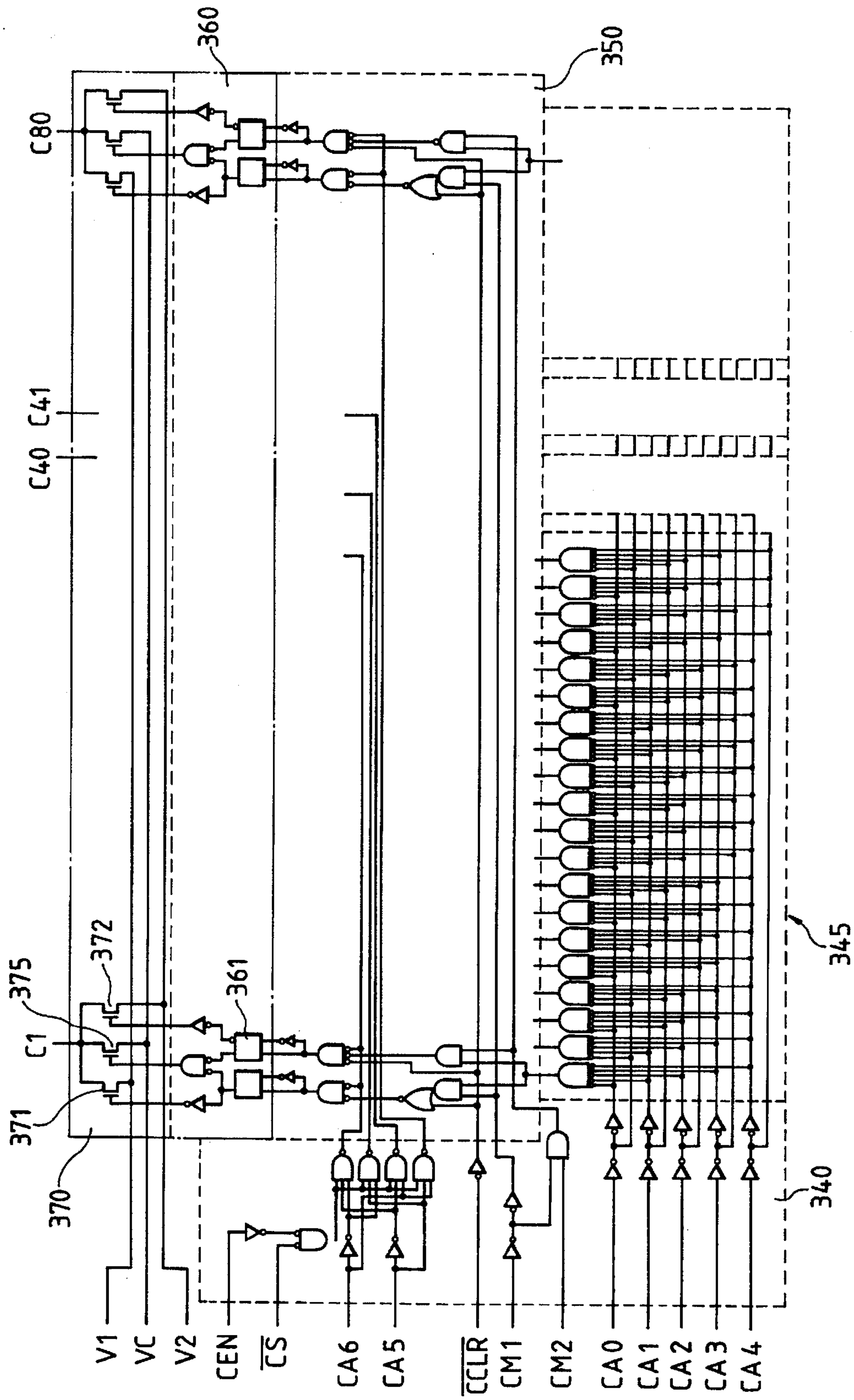
FIG. 24 is a circuit diagram showing a detailed example of the scanning (common) electrode driving elements shown in FIG. 23.

FIGS. 23 and 24 respectively show a schematic example and a detailed example of the common drive element 310 constituting the common drive unit 300. An input logic circuit 340 effects block selection by the signals CA5, CA6 and CEN in response to a chip select signal $\overline{CS}$ from the decoder unit 650 of the data output unit 600, and executes predetermined logic operations by receiving the line selecting signals CA0–CA4, and signals $\overline{CCLR}$, CM1 and CM2.

A decoder unit 345 for selecting a to be activated, based on the line data relating to the signals CA0–CA4 supplied from the input logic circuit 340, is capable of selecting 80 lines in an element 310. In the present embodiment each element 310 is assigned to four blocks of 20 lines each, and, in FIG. 24, a section of the decoder unit 345 for effecting the decoding of 20 lines is indicated by the frame of broken line.

A control logic unit 350 generates data for defining the driving signal wave for the block selected by the input logic circuit 340 or the line selected by the decoder unit 345, from the driving data represented by the signals CM1, CM2 and $\overline{CCLR}$ supplied by the input logic circuit 340.

360 is a switch signal output unit provided with a level converter for level conversion of the data generated by the control logic unit 250, and a buffer. 370 is a driver which receives the voltage signals V1, VC and V2, and selectively supplies V1, VC or V4 to the common lines C1–C80 under switching according to the output of the switch signal output unit 360.

In the present embodiment there are provided five common drive elements 310 of the above-explained structure, so that 400 common lines exist in the effective display area 104.

In FIG. 24 there are further shown a level converter 361; and switches 375, 371 and 372 for switching the supply paths of the voltages VC, V1 and V2 in response to the switch signals from the switch signal output unit 360.

(4.9) Driving Signal Waves (4.9.1) Outline of Display Device

Figure 25:
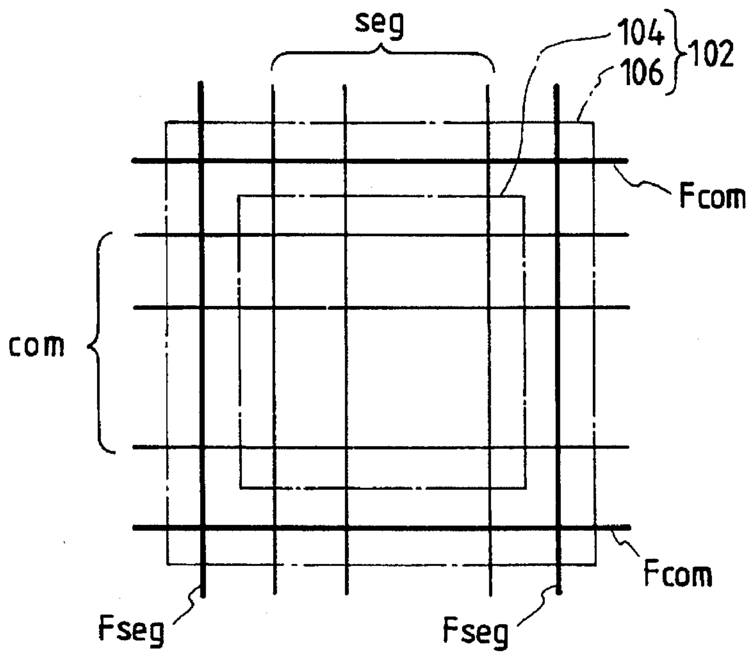
FIG. 25 is a schematic view of a display device for explaining the driving mode thereof.

FIG. 25 schematically illustrates the display device 100, wherein com and seg are respectively common lines corresponding to the common transparent electrodes 114 provided on the upper substrate 110, and segment lines corresponding to the segment transparent electrodes 124 provided on the lower substrate 120, and ferroelectric liquid crystal is positioned therebetween. Fcom and Fseg are respectively frame common lines positioned outside the area of the common lines com in parallel manner thereto, and frame segment lines positioned outside the area of the segment lines seg in parallel manner thereto. An area on the display area 102 corresponding to the group of crossing points of the common lines com and the segment lines seg constitutes the effective display area 104. Also the group of crossing portions of the frame common lines Fcom with the frame segment lines Fseg and the segment lines Seg, and of the frame segment lines Fseg with the common lines com constitute the frame 106 positioned outside the effective display area 104.

For the purpose of simplicity, FIG. 25 only shows four common lines com, four segment lines seg, and one frame common line Fcom and one frame segment line Fseg on each side, but, in the present embodiment there are provided 400 common lines com and 800 segment lines seg which are individually drivable, and 16 frame common lines Fcom and 16 frame segment lines Fseg on each side for collective drive as explained before.

(4.9.2) Drive Mode of Display Device

In the present embodiment, the display device 100 is driven in the following manner.

As already explained in (3.5), the effective display area 104 is subjected, in the block access mode, to a block erasure and then to writing line by line. In the line access mode, the writing line by line alone is conducted. In the present embodiment, different driving signal waves are employed in the block erasure in the block access mode, the line writing in the mode, and the line wiring in the line access mode.

In the line access mode, the writing is conducted with three different signal waves, namely A, N and C waves, respectively in the temperature ranges of 45°–35° C, 35°–15° C. and 15°–5° C.

Figure 26A:
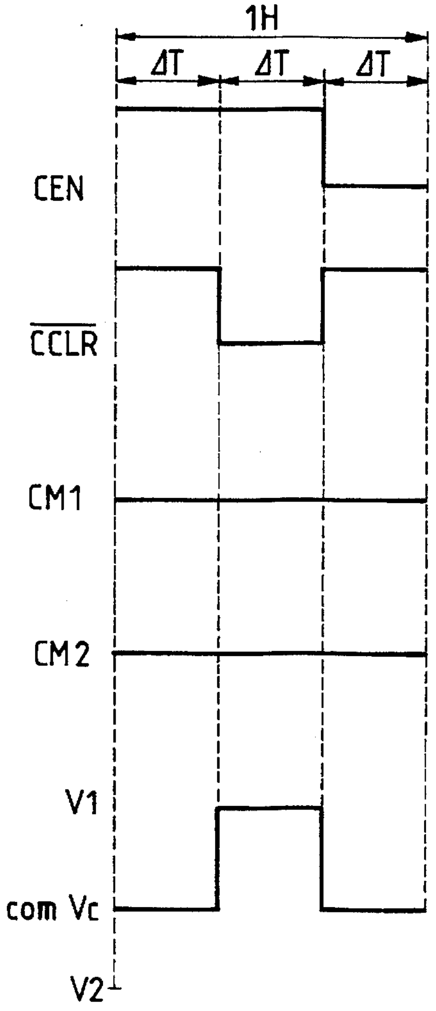
FIGS. 26A and 26B are wave form charts showing an example of the drive signal waves for the common lines and segment lines in block erasure.
Figure 26B:
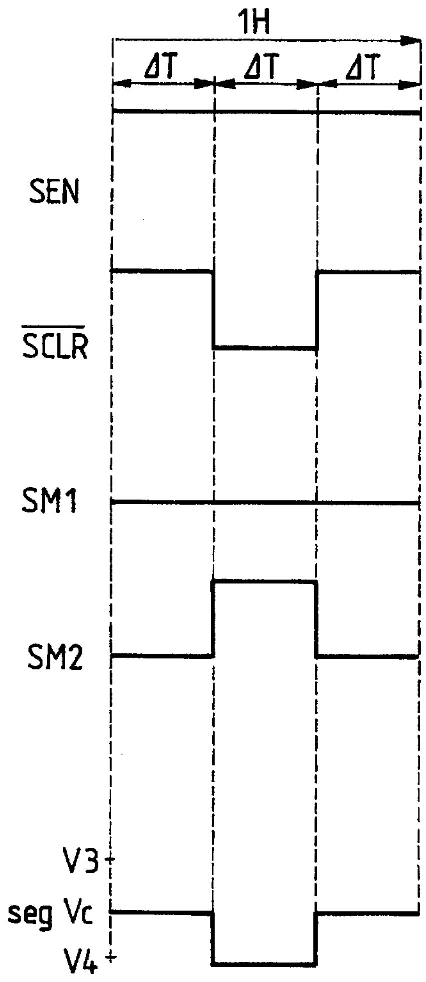
Figure 27:
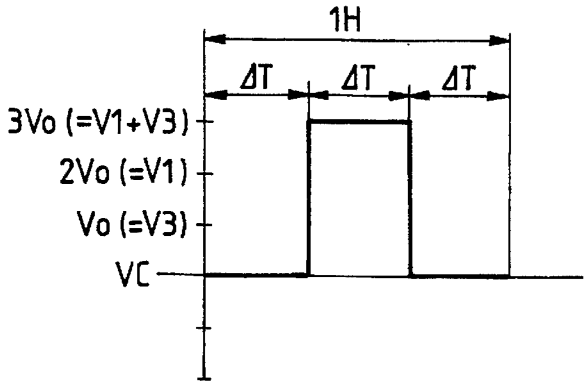
FIG. 27 is a wave form chart showing a synthesized driving signal wave for the common and segment lines shown in FIGS. 26A and 26B.
Figure 28A:
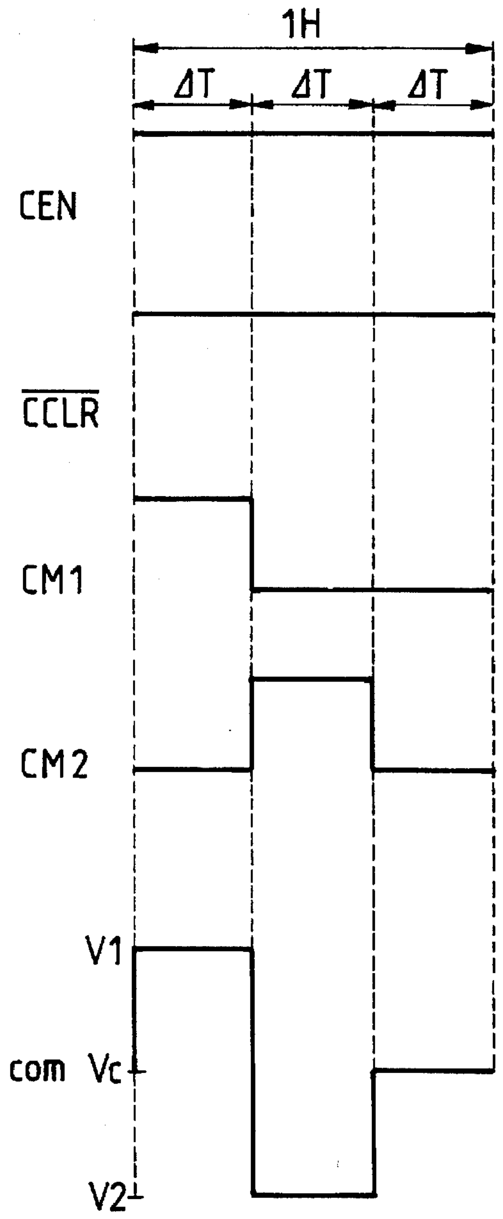
FIGS. 28A and 28B are wave form charts showing an example of driving signal waves for the common lines and the segment lines in a line writing in block access mode.
Figure 28B:
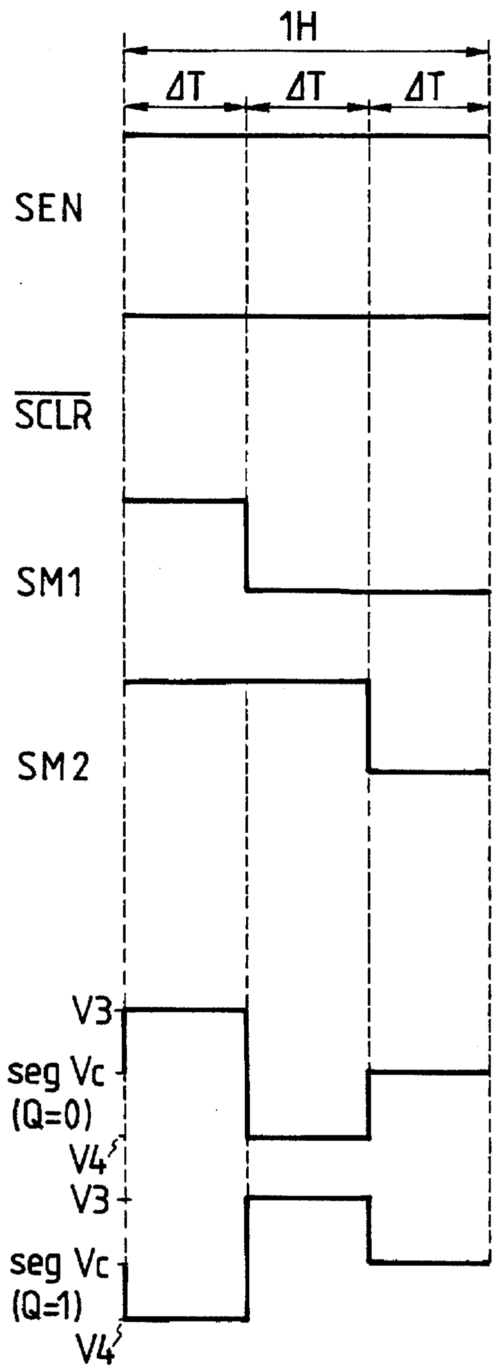

These modes correspond to the attached drawings in the following manner:

(1) Block erasure in block access mode : FIGS. 26A, 26B and 27;

(2) Line writing in block access mode : FIGS. 28A, 28B and 29;

(3) Temperature range of 45°–35° C. in line access mode: FIGS. 34A–34E;

(4) Temperature range of 35°–15° C. in line access mode: FIGS. 30A, 30B, 31A, 31B, 32, 33A and 33B:

(5) Temperature range of 15°–5° C. in line access mode: FIGS. 35A–35E.

With regard to the frame 106, the frame Portions along the frame common lines Fcom (hereinafter called horizontal frames) and the frame portions along the frame segment lines Fseg (hereinafter called vertical frames) are driven with different signal waves at different timings. More specifically, the horizontal frames are formed by driving the lines Fcom in combination with the lines Fseg and seg during the non-access period of the effective display area (for example in the vertical flyback period in the refreshing drive, or in the interruption period by the timer in case of partial rewriting drive). The vertical frames are formed by driving the frame segment lines Fseg with a signal wave same as that for the common lines com at the line writing in any mode.

(4.9.3) Driving Signal Wave for Effective Display Area in case of 1H=1H*

In the present embodiment, at the block erasure in the block access mode, at the line writing in said mode and at the N-wave selection (temperature range 35°–15° C.) in the line access mode, the horizontal scanning period (1H) is divided into three, and the common lines com are given a voltage V1, VC or V2 while the segment lines seg are given a voltage V3, VC or V4 in each period ΔT.

Tab. 1 shows an example of data set in the register areas CL1–SC2 in the register unit 630 of the data output unit 600. In the table, "X" indicates an unused bit. In the present embodiment, the data shown in Tab. 1 are developed in the 6th to 4th bits and 2nd to 0th bits of the register areas CL1–SB2 at the start of procedure shown in FIG. 42. Also in the course of execution of the procedure the mode register area DM is given data for discriminating the block erasure in the block access mode, the line writing in the mode or the line writing in the line access mode thereby causing the multiplexer unit 671 to select the registers CB1–SB2, CL1–SL2 or CC1–SC2, and data for switching the multiplexers 665 and 669, thereby selecting three bits 6 - 4 or 2 - 0 for releasing one bit in succession in the period ΔT.

TABLE 1

| | Register | Bit | 7 | 6 | 5 | 4 | | 3 | 2 | 1 | 0 |
|---|---|---|---|---|---|---|---|---|---|---|---|
| Data at line writing in block access mode | CL1 | $\overline{CCLR}$ | X | 1 | 1 | 1 | CEN | X | 1 | 1 | 1 |
| | CL2 | CM2 | X | 0 | 1 | 0 | CM1 | X | 1 | 0 | 0 |
| | SL1 | SM2 | X | 1 | 1 | 0 | SEM | X | 1 | 1 | 1 |
| | SL2 | SM1 | X | 1 | 0 | 0 | $\overline{SCLR}$ | X | 1 | 1 | 1 |
| Data at block erasure in block access mode | CB1 | $\overline{CCLR}$ | X | 1 | 0 | 1 | CEN | X | 1 | 1 | 0 |
| | CB2 | CM2 | X | 0 | 0 | 0 | CM1 | X | 0 | 0 | 0 |
| | SB1 | SM2 | X | 0 | 1 | 0 | SEN | X | 1 | 1 | 1 |
| | SB2 | SM1 | X | 0 | 0 | 0 | $\overline{SCLR}$ | X | 1 | 0 | 1 |
| Data at line writing in line access mode (35°–15° C.; normal N wave output) | CC1 | $\overline{CCLR}$ | X | 1 | 1 | 1 | CEN | X | 1 | 1 | 1 |
| | CC2 | CM2 | X | 1 | 1 | 1 | CM1 | X | 1 | 1 | 0 |
| | SC1 | SM2 | X | 0 | 1 | 1 | SEN | X | 1 | 1 | 1 |
| | SC2 | SM1 | X | 0 | 1 | 0 | $\overline{SCLR}$ | X | 1 | 1 | 1 |

TABLE 2

Truth value table for common drive element 310

| CEN | $\overline{CCLR}$ | CM1 | CM2 | $\overline{CS}$ | V |
|---|---|---|---|---|---|
| 0 | X | X | X | X | VC |
| 1 | 0 | X | X | 0 | V1 |
| 1 | 1 | 0 | 0 | 0 | VC |
| 1 | 1 | 0 | 1 | 0 | V2 |
| 1 | 1 | 1 | 0 | 0 | V1 |
| 1 | 1 | 1 | 1 | 0 | V1 |

TABLE 3

Truth value table for segment drive element 210

| SEN | $\overline{SCLR}$ | SM1 | SM2 | Q | V |
|---|---|---|---|---|---|
| 0 | X | X | X | X | VC |
| 1 | 1 | X | 0 | X | VC |
| 1 | 0 | X | 1 | X | V4 |
| 1 | 1 | 1 | 1 | 0 | V3 |
| 1 | 1 | 0 | 1 | 0 | V4 |
| 1 | 1 | 1 | 1 | 1 | V4 |
| 1 | 1 | 0 | 1 | 1 | V3 |

Tabs. 2 and 3 are respectively truth value tables of the common drive element 310 and the segment drive element 210, wherein "X" indicates a case in which the driving voltage V is not affected by the state "0" or "1" In Tab. 3, Q is image data of one bit, released from a latch 23*a* (FIG. 22) of the latch unit 230, and white or black data are released respectively when Q=0 or Q=1.

FIG. 26A shows the form of the signals CEN, $\overline{CCLR}$, CM1 and CM2 according to the contents of the registers CB1 and CB2 (see Tab. 1) and the form of the voltage signal V supplied to the common line com according to the logic of the common drive element (cf. Tab. 2). Also FIG. 26B shows the form of the signals SEN, $\overline{SCLR}$, SM1 and SM2 according to the contents of the registers SB1 and SB2 (cf.Tab. 1) and the form of the voltage signal V supplied to the segment line seg according to the logic of the segment drive element 210 (cf. Tab. 3).

Consequently, at the block erasure in the block access mode, in a block selected by the signals CA5, CA6 relating to the element 310 selected by the chip select signal $\overline{CS}$, the crossing point of the common line com and the segment line seg receives the difference of the voltages supplied to the lines. namely a synthesized voltage signal as shown in FIG. 27. The information in the block is all cleared to white by means of the voltage 3 V0 applied over the period ΔT.

In this state, the period ΔT or 1H and the voltages V1–V4, VC are corrected according to the temperature as explained before.

FIG. 28A shows the form of the signals CEN etc. according to the contents of the registers CL1 and CL2, and the form of the voltage signal V applied to the common line com according to the logic of the common drive element 310. Also FIG. 28B shows the form of the signals SEN etc. according to the contents of the registers SL1 and SL2, and the form of the signal applied to the segment line seg according to the logic of the segment drive element 210 and the content Q of image data.

Figure 29A:
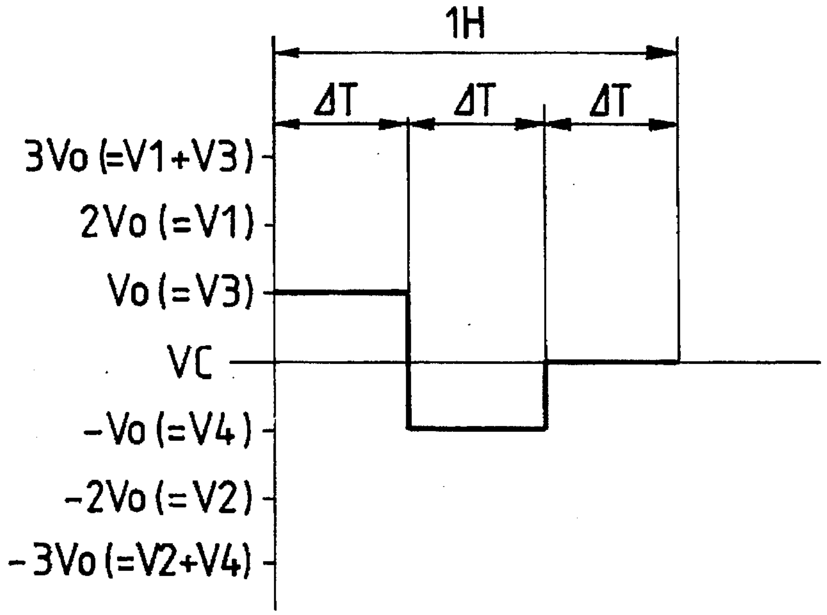
FIGS. 29A and 29B are wave form charts showing synthesized signal waves for the common and segment lines shown in FIGS. 28A and 28B.
Figure 29B:
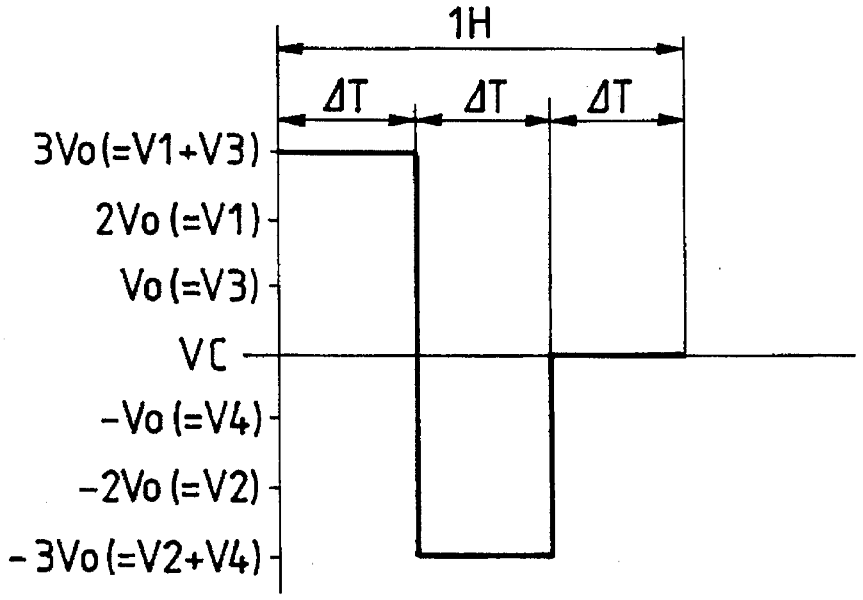

Consequently, at the line writing in the block access mode, in a block corresponding to the element 310 selected by the chip select signal $\overline{CS}$ and the signals CAS, CA6, the crossing point of the common line com and the segment line seg selected by the signals CA1–CA4 receives a synthesized voltage signal shown in FIG. 29A or 29B. The displayed data are not changed at a point receiving the wave shown in FIG. 29A. Such point retains the white data realized by the preceding block erasure. On the other hand, at a point receiving the wave shown in FIG. 29B, the display retains the white state by the voltage 3 V0 applied in the initial period ΔT, but is then inverted to the black state by the voltage −3 V0 applied in the succeeding period ΔT.

Figure 30A:
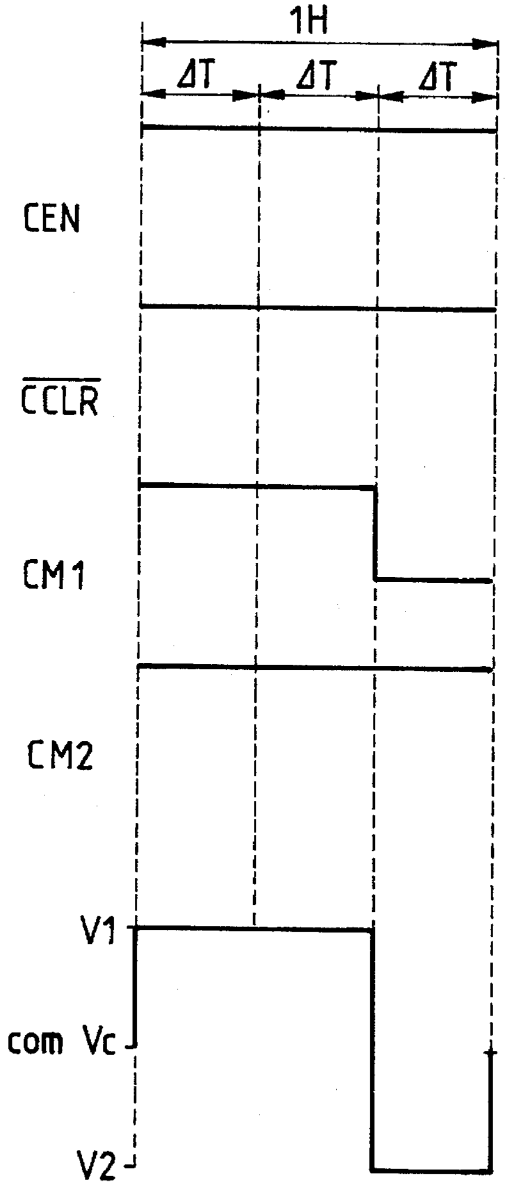
FIGS. 30A and 30B are wave form charts showing an example of driving signal wave (N wave) for the common lines and the segment lines in a line writing in line access mode.

FIG. 30A shows, for the temperature range of 35°–15° C. at the line writing in the line access mode, the form of the signals CEN etc. released according to the contents of the registers CC1, CC2, and the wave form N of the voltage signal V applied to the common line com according to the logic of the common drive element 310. Also FIG. 30B shows the form of the signals SEN etc. according to the contents of the registers SC1, SC2, and the wave form applied to the segment line seg according to the logic of the segment drive element 210 and the content Q of image data.

These figures illustrate a normal wave form in the temperature range. In the case of drive with inversion at every line or every several lines, the contents of the registers CC1 and CC2 are suitably selected to invert the wave form to the common line com shown in FIG. 30A, according for example to the signal CEN. In such case the signal wave form to the segment line seg can be same as shown in FIG. 29B.

Figure 31A:
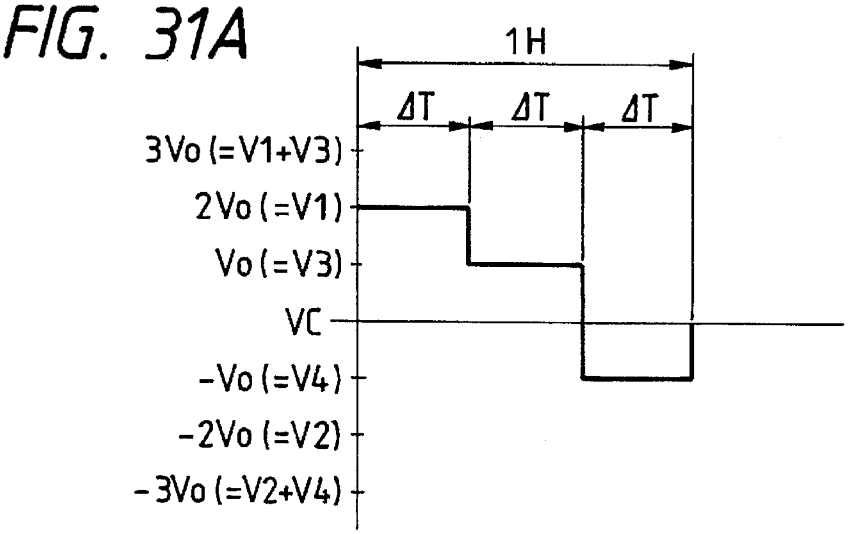
FIGS. 31A and 31B are wave form charts showing synthesized signal waves for the common and segment lines shown in FIGS. 30A and 30B.
Figure 31B:
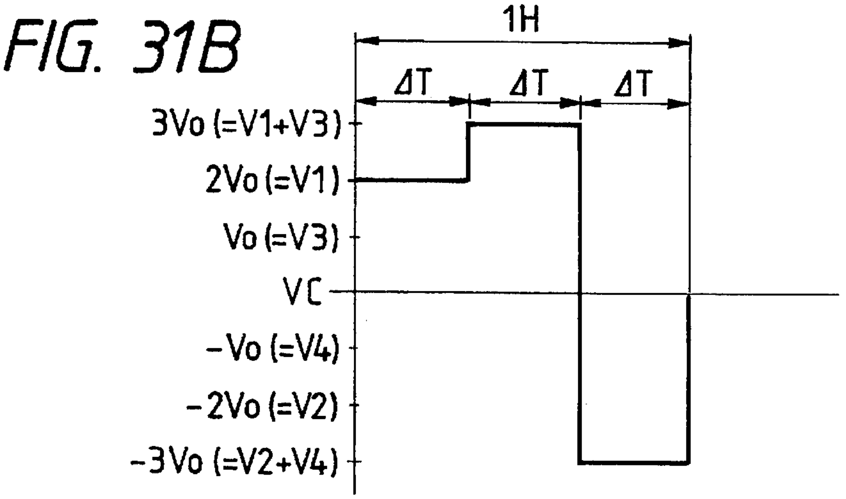

Consequently, at the line writing in the line access mode, a crossing point of the selected common line com and segment line seg receives a synthesized wave of the voltage signals shown in FIG. 31A or 31B. At a point receiving the voltage signal shown in FIG. 31A, the display becomes white, since the threshold value for obtaining white state is exceeded by the voltages 2V0 and V0 applied in the initial period ΔT and the succeeding period ΔT, while the voltage V4 applied in the last period does not exceed the threshold value for obtaining the black state. Also at a point receiving the voltage signal shown in FIG. 31B, the display assumes white state in the initial periods 24T, but is inverted to black by the voltage −3V0 applied in the last period ΔT.

Figure 32:
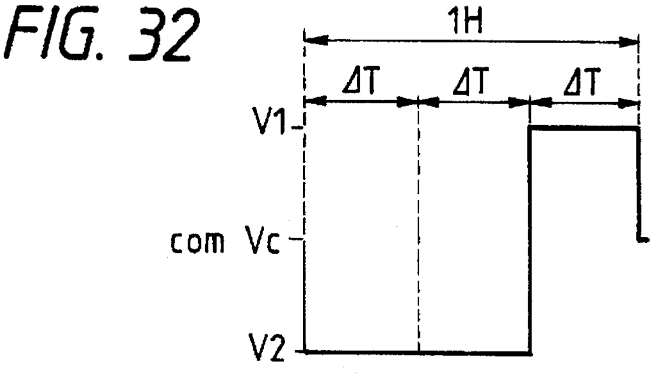
FIG. 32 is a wave form chart showing an inverted N wave.
Figure 33A:
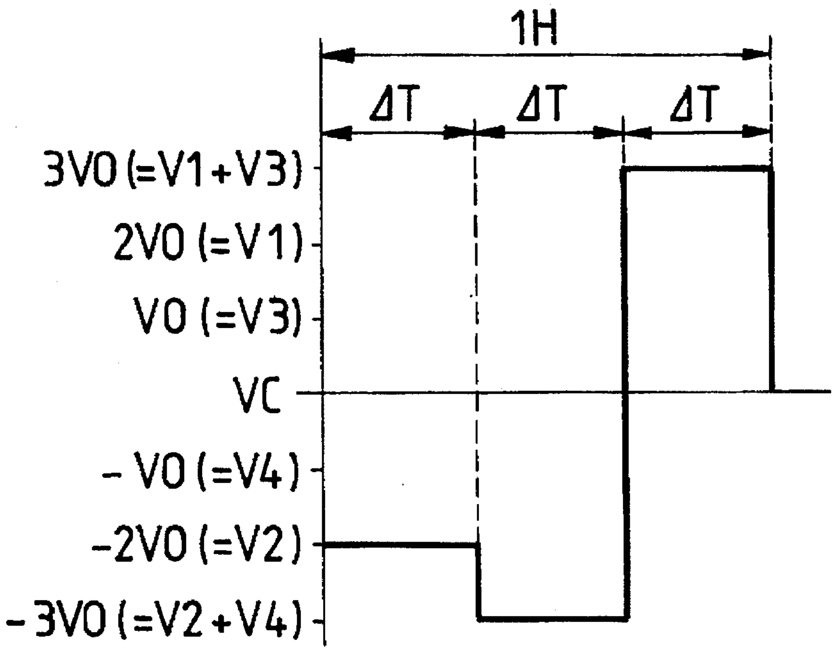
FIGS. 33A and 33B are wave form charts showing synthesized wave forms when the wave form shown in FIG. 32 is released.
Figure 33B:
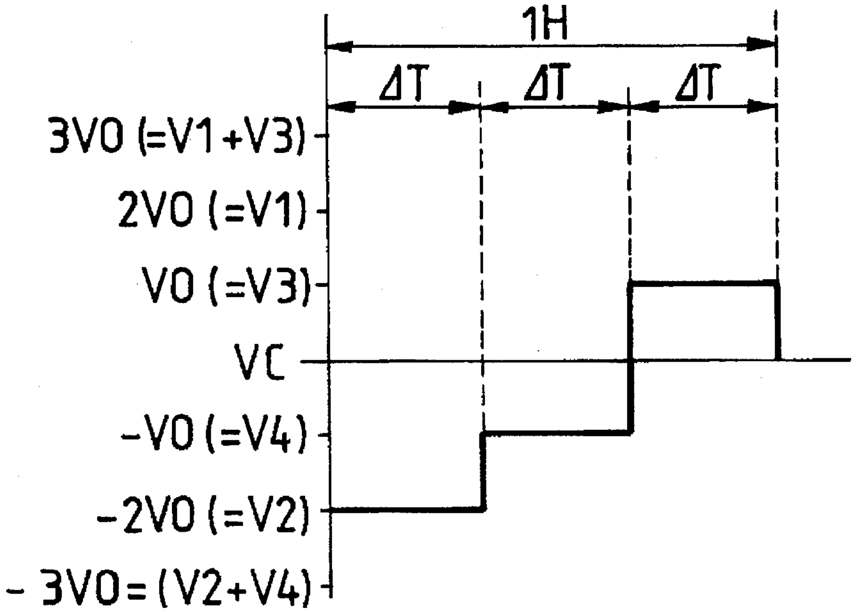

FIGS. 32, 33A and 33B respectively illustrate the inverted wave form, a synthesized wave form for Q=0 and that for Q=1. It will be understood that white and black data are obtained for the inverted wave form.

(4.9.4) Driving Signal Wave involving In-line Inversion

Figures 34A, 34B, 34C, 34D, 34E:
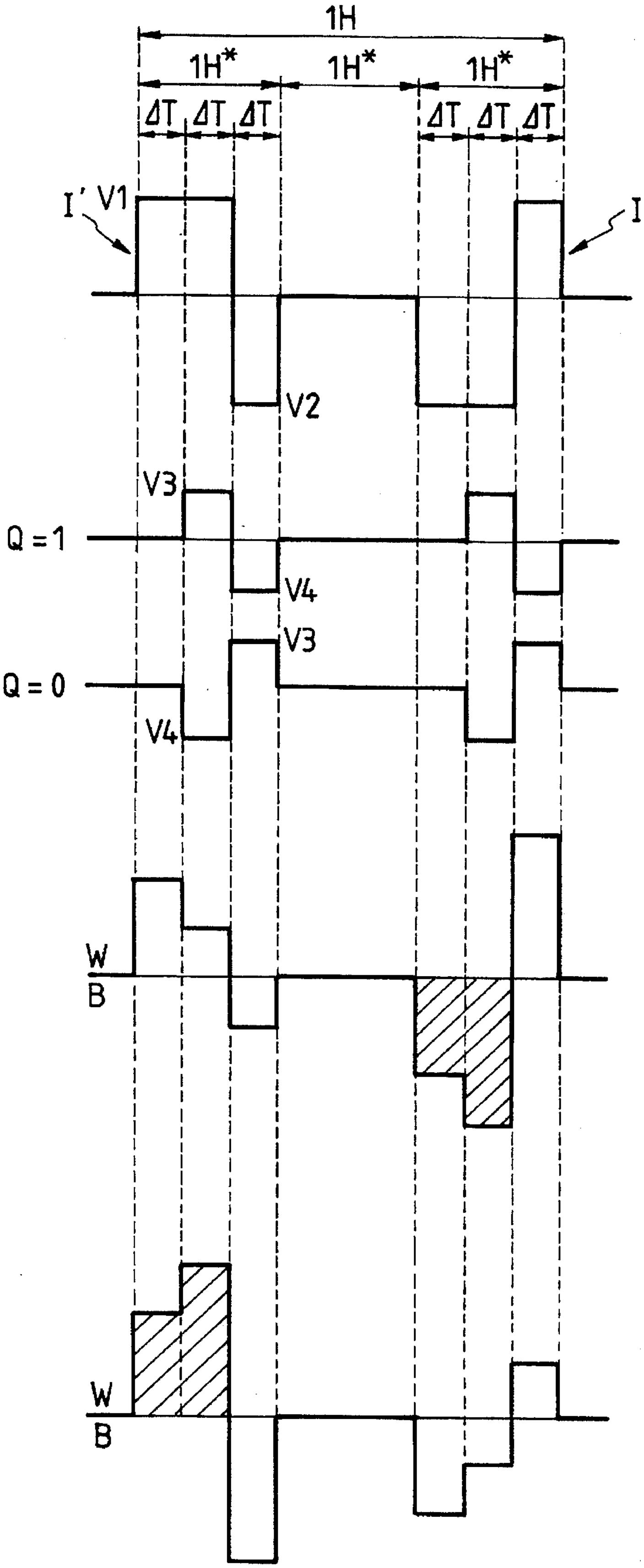
FIGS. 34A to 34E are wave form charts showing A wave to be employed in a high temperature region in line access mode.

FIGS. 34A to 34E show the driving signal waves in the temperature range of 45°–35° C., wherein FIG. 34A shows the A wave applied to the common line com, while FIGS. 34B and 34C show the signal waves applied to the segment line seg respectively in case of Q=1 and Q=0. The A wave is basically composed of the N wave shown in FIG. 30A and an inverted wave thereof, and the duration of the normal wave Γ and the inverted wave I is such that 1H* is composed of 3ΔT. A suitable interval, for example of 1H*, is provided between these waves, and the horizontal scanning period 1H is composed of 3H*. The value of ΔT is suitably selected by reading the set data (TCONRL) of the timer TMR2 from the ROM 503, according to the temperature condition.

FIGS. 34D and 34E indicate that black and white displays can be obtained by adding the A wave shown in FIG. 34A, to the waves of the segment line seg shown in FIGS. 34B and 34C, wherein hatched areas contribute to the data writing. In these drawings, the wave form of the segment line and the synthesized wave form contributing to the data writing are opposite, in polarity, to those shown in FIGS. 30A to 33B, because ΔT is shorter for the A wave than for the N wave. The wave form applied to the segment line can be altered by modifying the setting of the registers SC1, SC2.

Figure 35A:
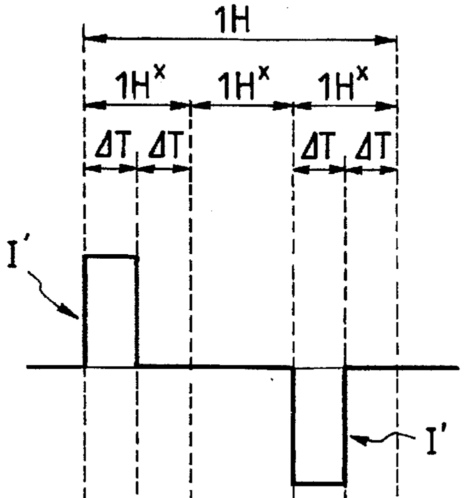
FIGS. 35A to 35E are wave form charts showing C wave to be employed in a low temperature region in line access mode.
Figure 35B:
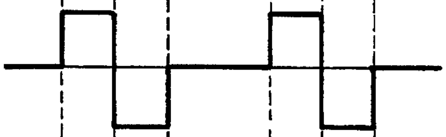
Figure 35C:
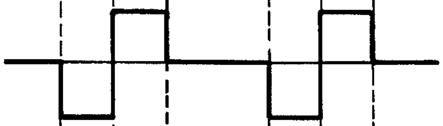
Figure 35D:
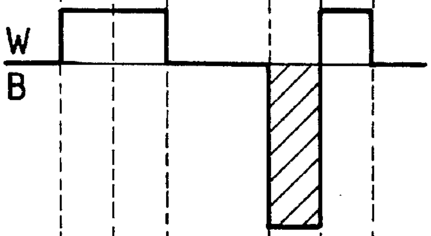
Figure 35E:
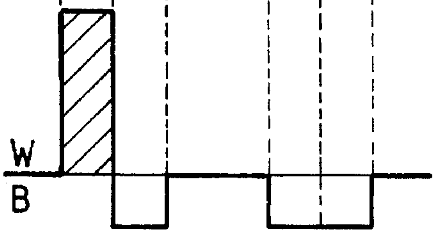

FIGS. 35A to 35E show the driving signal waves in the temperature range of 15°–5° C., wherein FIG. 35A shows the C wave applied to the common line com, while FIGS. 35B and 35C show the waves applied to the segment line seg respectively in case of Q=1 and Q=0, and FIGS. 35D and 35E show the synthesized waves respectively in case of Q=1 (black) and Q=0 (white). The hatched areas contribute to the data writing.

In the C wave, the normal wave Γ and the inverted wave I constitute 1H* by 2ΔT, and they are further combined with an interval, for example, of 1H*.

The A wave or C wave involves the inline inversion as shown in FIGS. 34A–34E and 35A–35E, but the MH inversion and the frame inversion are further added.

Figure 36:
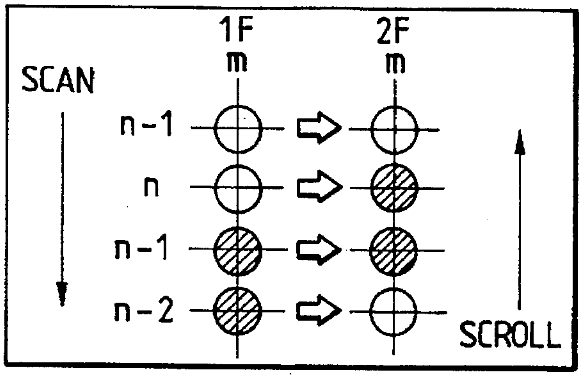
FIG. 36 is a schematic view showing display state in case of MH inversion and frame inversion.

Now, let us consider a case in which, as shown in FIG. 36, a field (iF) displays, at a certain timing, "white", "white", "black" and "black" respectively at the crossing points of an m-th segment line and (n-1)-th to (n+2)-th common lines in the scanning direction scan. If the display is scrolled in the next field (2F), and if the crossing point of the segment line and the (n)-th common line is "white" in the first field (1F), the crossing points of the segment line and the (n−1)-th to (n+2)th common lines will display "white", "black", "black" and "white" in the second field 2F.

Figure 37:
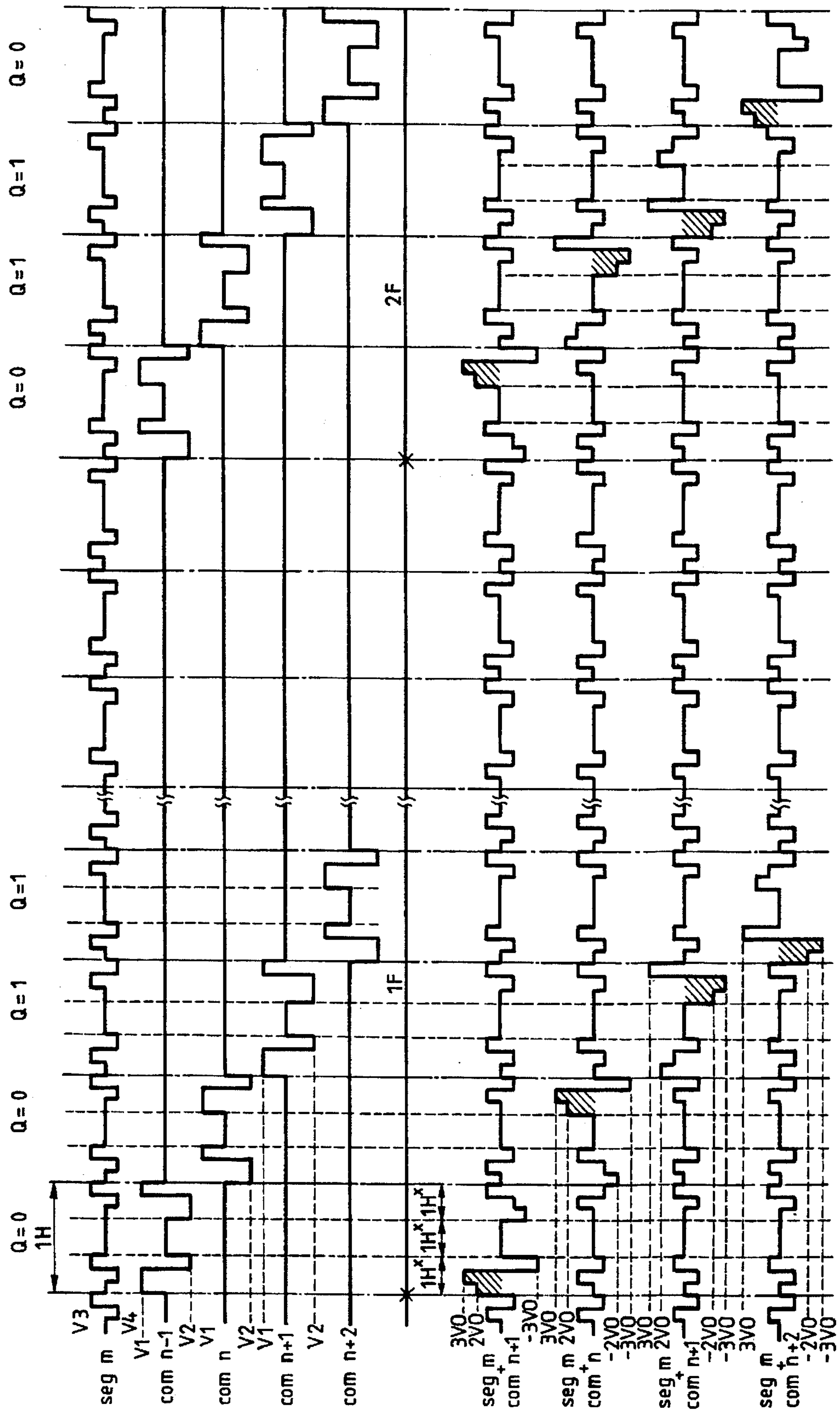
FIG. 37 is a wave form chart showing a mode of drive shown in FIG. 36 with the A wave.

FIG. 37 shows the driving mode for obtaining the display shown in FIG. 36, with the A wave shown in FIGS. 34A–34E and with the MH inversion and the frame inversion. For the purpose of simplicity there is illustrated a case in which the signal wave is inverted every line and every frame.

In the period 1F, as shown in the upper left portion of FIG. 37, the common lines com n−1, n, n+1, n+2 receive the A wave and the inverted wave in succession. At the same time the segment line segm receives signal waves (respectively corresponding to "white", "white", "black" and "black") in successive 1H periods to obtain synthesized wave forms enabling data writing as shown by the hatched portions in the lower left portion of FIG. 37.

Then, in the period 2F, as shown in the upper right portion of FIG. 37, the common lines com n−1, n, n+1, n+2 receive, in succession, signal waves which are inverted from those applied to the lines in the field 1F. At the same time the segment line segm receives signal waves (respectively corresponding to "white", "black", "black" and "white" as the data in 1F are scrolled in 2F) in successive 1H periods to obtain synthesized wave forms enabling data writing as shown by the hatched portions in the lower right portion of FIG. 37.

(4.9.5) Relation between Temperature in Line Access Mode and ΔT or V

Figure 38:
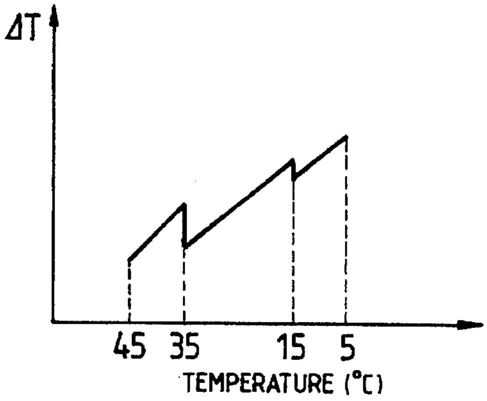
FIGS. 38 and 39 are charts showing the relation, respectively, between the temperature and the pulse duration or the voltage.
Figure 39:
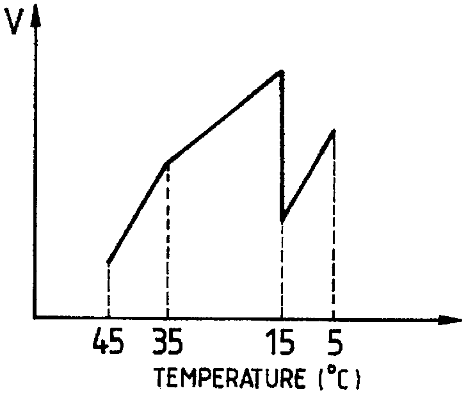

FIG. 38 shows an example of the relation between the temperature in the line access mode and ΔT accordingly selected, and FIG. 39 shows an example of the relation between said temperature and V accordingly selected. In either drawing, the drive is conducted with the A wave in a range of 45°–35° C., N wave in a range of 35°–15° C., and C wave in a range of 15°–5° C.

Figure 40:
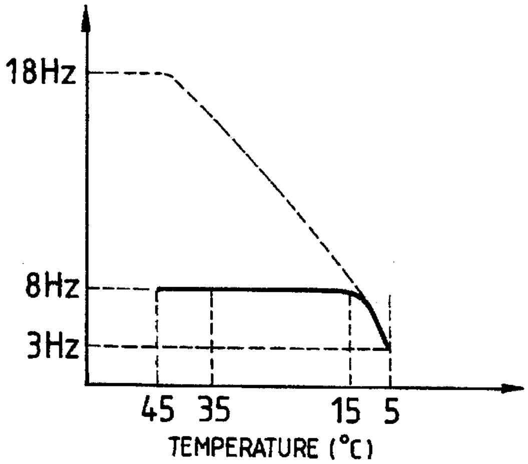
FIG. 40 is a chart showing the relation between the temperature and the display response.

In FIG. 40, a solid line indicates the relation between the temperature and the response of display in such drive. In a display device CS1017 (supplied by Chisso Co.) employed by the applicant, the response varied over a range of 18–3 Hz as indicated by a broken line when it was driven with the N wave alone in a range of 45°–5° C. with suitable variation of ΔT and V, but the response could be almost averaged to 8 Hz by the variations of the wave form, ΔT and V according to the temperature.

(4.9.6) Mode of Frame Drive

In the present embodiment, as explained before, the horizontal frames are formed in the vertical flyback period or periodically at the start of drive of the A/D converter 950, and the vertical frames are formed at the line writing of the effective display area 104. The frame is given is the same color as that of the background of the area 104, namely in white color if the information is displayed black.

Tab.4 shows data to be set in the registers FV1, FCVc, FV2, FV3, FSVc and FV4 for frame formation by the switching of the frame drive unit 700. Since the frame common lines Fcom are almost independent from the drive of the effective display area 104, the data $\overline{V1}$, $\overline{CVc}$ and $\overline{V2}$ are not changed. In the present embodiment, the drive data for the frame common lines Fcom in the formation of the horizontal frames are selected same as the drive signal waves for the common lines com shown in FIG. 26A.

On the other hand, since the driving signal wave for the frame common lines Fcom or the common lines com is different in the horizontal frame formation, in the vertical frame formation at the line writing in the block access mode, or at the line writing in the line access mode, the settings of the registers FV3, FV4 and FSVc for the frame segment lines Fseg are suitably varied in order to obtain white data in each of these cases.

Figure 30B:
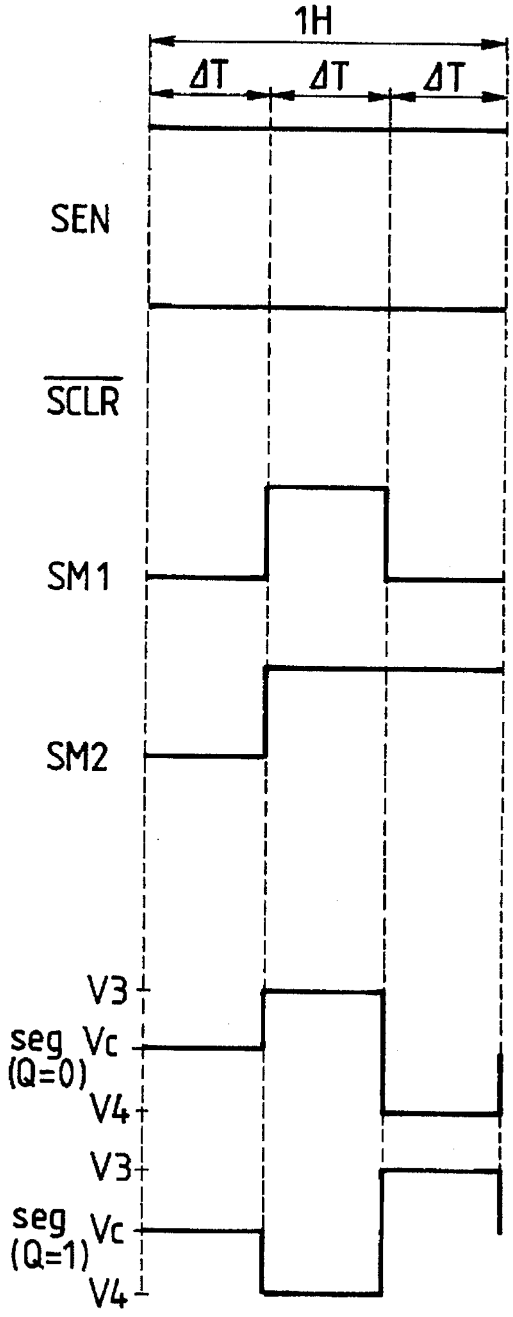

More specifically, the settings are varied in such a manner that the drive data for the frame segment lines Fseg become equal to the driving signal wave for the segment lines seg shown in FIG. 26B in case of the horizontal frame formation; or equal to the driving signal wave for the segment lines seg in case of Q=0 as shown in FIG. 28B in case of the line writing in the block access mode; or equal to the driving signal wave for the segment lines seg in case of Q=0 as shown in FIGS. 30B, 34C or 35C in the vertical frame formation at the line writing in the line access mode.

As the result, the horizontal frames are formed by the drive with the signal wave shown in FIG. 27, while the vertical frames are formed by the drive with the signal wave shown in FIG. 29A in the block access mode, or with the signal wave shown in FIGS. 31A, 33A, 34E or 35E in the line access mode.

TABLE 4

| | Register | Bit | 7 | 6 | 5 | 4 | | 3 | 2 | 1 | 0 |
|---|---|---|---|---|---|---|---|---|---|---|---|
| Data for frame common lines | FV1, FCVc | $\overline{CVc}$ | X | 1 | 0 | 1 | $\overline{V1}$ | X | 0 | 1 | 0 |
| Data for frame segment lines at | FV2, FV3 | $\overline{V2}$ | X | 0 | 0 | 0 | $\overline{V3}$ | X | 1 | 0 | 0 |
| line writing in block access mode | FSVc, FV4 | $\overline{SVc}$ | X | 0 | 0 | 1 | $\overline{V4}$ | X | 0 | 1 | 0 |
| Data for frame segment lines at | FV2, FV3 | $\overline{V2}$ | X | 0 | 0 | 0 | $\overline{V3}$ | X | 0 | 0 | 0 |
| horizontal frame formation | FSVc, FV4 | $\overline{SVc}$ | X | 1 | 0 | 1 | $\overline{V4}$ | X | 0 | 1 | 0 |
| Data for frame segment lines at | FV2, FV3 | $\overline{V2}$ | X | 0 | 0 | 0 | $\overline{V3}$ | X | 0 | 1 | 0 |
| line writing in line access mode (35°–15° C.; normal N wave) | FSVc, FV4 | $\overline{SVc}$ | X | 1 | 0 | 0 | $\overline{V4}$ | X | 0 | 0 | 1 |

(5) Display Control (5.1) Outline of Control Sequence

The display control of the present embodiment has two major features. The first is to synchronize the data exchange with the function of the display area 102, by sending the Busy signal from the display control device 50 to the word processor 1. This is basically derived from a fact that the display device utilizing ferroelectric liquid crystal is given a variable horizontal scanning period according to the temperature, in order to achieve effective operation.

The second lies in a fact that the word processor 1 sends, prior to the sending of the image data, the address data for specifying the pixels to be driven by the image data, in contrast to the ordinary word processor which sends only the image data in periodical and continuous manner (in so-called refreshing mode). This fact enables the drive to send the image data only to a portion specified by the address data, instead of the refreshing mode, and this is derived from the memory property of the display device employing ferroelectric liquid crystal that enables access only to the pixels to be altered.

In order to enable the display control explained above, the word processor 1 of the present embodiment has functions, in addition to those of the ordinary word processor, of suspending the transfer of address data upon receipt of the Busy signal, and transferring the address data in superposition for example with the horizontal synchronization signal.

Following two display control modes can be realized by effective utilization of the above-mentioned features in the display control, particularly the second one.

More specifically there can be realized block access and line access. In the block access, the display of a block, composed for example of 20 scanning electrodes in the effective display area 104 is simultaneously erased for example to "white", and then the characters or the like are written by successive information access for each scanning line in the block. On the other hand, in the line access, the information is written by successive information access for each scanning line without the erasure to all "white" state in advance.

FIG. 41 shows the program flow of such display control modes. In the following the display control modes in the present embodiment will be outlined with reference to FIG. 41.

When the power supply to the word processor 1 is turned "on" in FIG. 41, an INIT routine is automatically started (steps (S101)). At first the Busy signal is turned on to effect the drive of the frame 106, erasure of the effective display area 104 and temperature compensation therefor at the start of power supply. Then the Busy signal is turned off to await an interruption request command $\overline{IRQ1}$ or $\overline{IRQ2}$, which is generated by the transfer of the address data from the word processor 1. If the address data are not transferred, the program is not executed, and the display area 102 does not change.

When the internal interruption request is generated in response to the transfer of the address data, a step S102 discriminates whether the request is $\overline{IRQ1}$ or $\overline{IRQ2}$, and the sequence respectively proceeds to a LSTR routine for the line access or a BSTART routine for the block access.

In the present embodiment, the $\overline{IRQ1}$ or $\overline{IRQ}$ is manually selected in advance, by selector means 520 provided at a suitable position of the display control device 50.

When the selector means 520 is set at the line access mode and generates $\overline{IRQ1}$:

Following program is executed for proceeding to the LSTR routine. At first, prior to entering the LSTR routine, a step S103 sets system clock data for the line access in the register TCONR of the timer TMR2, by referring to the line access mode data in the look-up table shown in FIG. 12, based on the temperature compensation data obtained in the INIT routine.

Then a step S104 sets a frame counter FCNT, a line counter LCNT and a wave form identifying register CX. The frame counter FCNT and the line counter LCNT are provided for inverting the driving signal wave every N frames and every M lines, while the wave form identifying register CX is provided for varying the signal wave according to the temperature of the ferroelectric liquid crystal. In this manner this step determines the interval of signal wave inversion in terms of the number of frames and lines, then selects one of three signal waves to be explained later according to the temperature compensation data in the INITI routine and sets the corresponding data in the register CX. The data setting in the register CX may also be made with reference to a table of temperature data. Then a step S105 selects a routine LSTRA0, LSTRN0 or LSTRC0 respectively corresponding to three signal waves A, N or C, by referring to the line access jumping table shown in FIG. 12 and according to the temperature data.

Thereafter the line writing operation is conducted by executing one of the above-mentioned three routines and subsequent routines. The line writing is realized by inverting the polarity of the driving signal wave in every frame and in every line, and, in the wave A or C, in a horizontal scanning period.

When the program execution proceeds to a routine for access to the last line in a frame, there are executed the writing of the last line, frame drive and renewal of the temperature conpensation data, and the Busy signal is turned off to await the interruption request $\overline{IRQ1}$. Upon receipt of the request, there is discriminated whether the driving signal wave is to be changed, and a LSTR routine corresponding to the signal wave is again started.

On the other hand, when the selector means 520 selects the block access mode and a request $\overline{IRQ2}$ is generated by the transfer of address data:

The BSTART routine is activated. At first the Busy signal is turned onto read the transferred address data, and to discriminate whether said data indicates the first line of a block, or the last line of the effective display area 104, or any other line (steps S107 and S108). If the address data do not indicate the first line nor the last line:

The sequence branches to a LINE routine, for effecting the writing of a line in response to the transferred image data. Then the Busy signal is turned off to await the interruption request (step S109). If an interruption request $\overline{IRQ2}$ is generated, the BSTART routine is again activated.

If the step S108 discriminates that the address data indicate the last line of the effective display area 104:

The sequence branches to a FLINE routine which executes the writing of a line, and then renews the data for frame drive and temperature compensation. Then the Busy signal is turned off to await the interruption request (S110). If an interruption request $\overline{IRQ2}$ is generated, the BSTART routine is again activated.

If the step S108 discriminates that the address data indicate the first line of a block:

The sequence branches to a BLOCK routine for erasing the entire block, containing the line specified by the address, to "white" state (step S111). Then the sequence proceeds to the LINE routine (step S109) to execute a sequence as explained before. The display control and information writing in the block access mode is executed in the above-explained manner.

When the word processor 1 sends a power-down signal $\overline{PDOWN}$ to the controller 500, a non-maskable interruption request NMI is generated to activate a PWOFF routine, in which the Busy signal is turned on, and the effective display area 104 is entirely erased to "white" state. Then the power status signal and the Busy signal are turned off, whereby the power supply to the word processor 1 is cut off (step S112).

As will be apparent from the foregoing explanation, in any of the two display control modes, namely the block access mode and the line access mode, a refreshing drive is realized if the address data are cyclically and continuously transferred over the entire effective display area, while a partial rewriting drive is adopted if the address data of a certain portion are transferred intermittently.

In the following explanation of the details of the control sequence, it is assumed that the word processor 1 transfers the address data and the image data in the refreshing mode.

(5.2) Details of Control Sequence (5.2.1) Power Supply On (Initialization)

Figure 42:
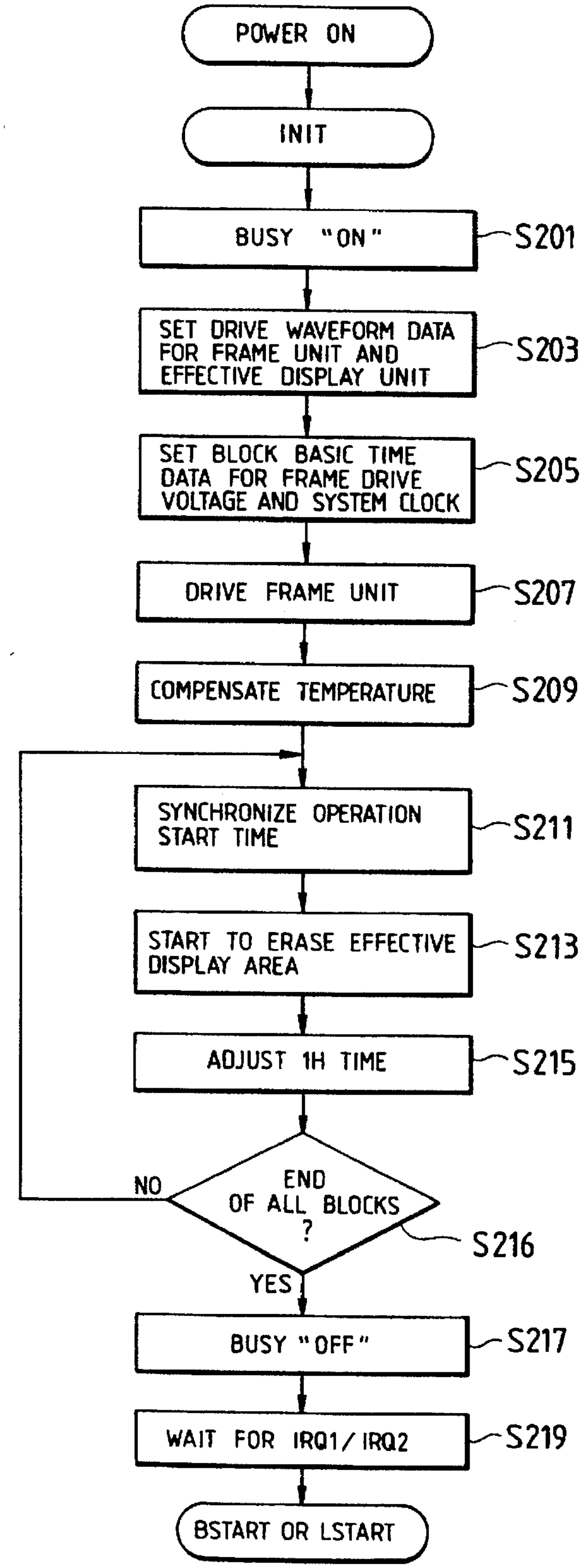
FIG. 42 is a flow chart of an example of the initializing sequence in the display control sequence of the embodiment.
Figure 43:
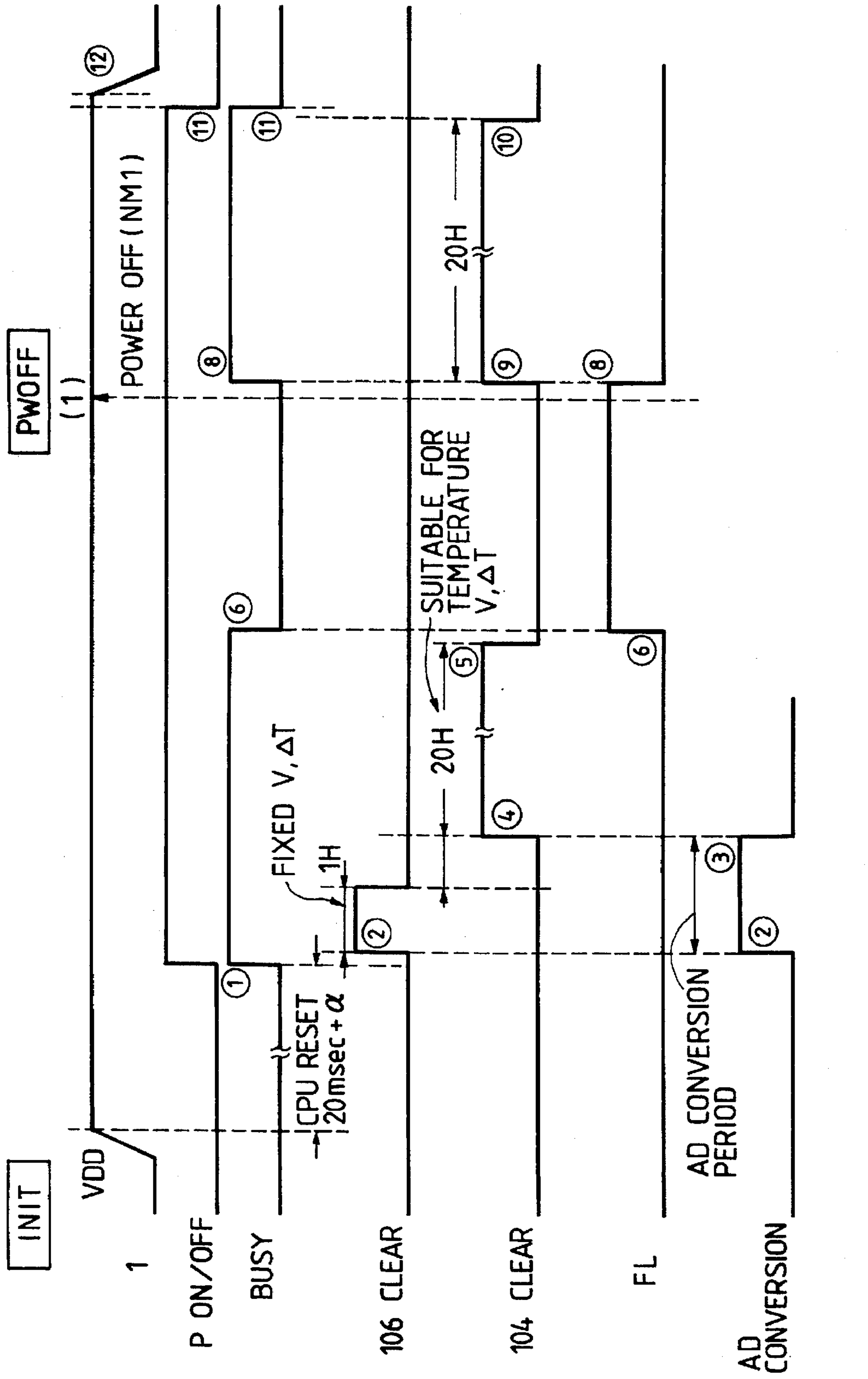
FIG. 43 is a timing chart showing the function of the embodiment in the initialization shown in FIG. 41 and at the turning-off of the power supply.

Now reference is made to FIGS. 42 and 43 for explaining the process automatically activated when the power supply to the word processor 1 is turned on.

FIG. 42 is a flow chart of the INIT routine shown in FIG. 41, and FIG. 43 is a timing chart of the INIT routine and a PWOFF routine to be explained later. In the following there will be explained steps to be executed by the controller 500:

S201: This step turns on the power status P ON/OFF signal, turns off a Light signal, and simultaneously turns on the Busy signal through the data output unit for supply to the word processor 1. The address data are not transferred from the word processor 1 during the release of the Busy signal, and this is required from a fact that the horizontal scanning period is rendered variable according to the temperature, in order to effectively drive the display device utilizing ferroelectric liquid crystal. More specifically, since the driving period of the display device in the effective display area cannot be completely synchronized with the data transfer period from the word processor 1, or the VRAM operating period therein, such synchronization is achieved by the release of the Busy signal from the display control device 50 (FIG. 43, time (1)).

S203: It sets the data for controlling the generation of driving signal waves for initial frame drive and for drive in the effective display area, in predetermined areas of the register unit 630 of the data output unit 600. The setting is achieved by setting the wave generation control data, stored in the ROM 503 of the controller 500, in the register unit 630 as shown in Tabs.1 and 4.

S205: It sets the data of the driving voltage for the initial frame drive and of the basic system clock signal defining the horizontal scanning period, in the D/A converter 900 and in the register TCONR of the timer TMR2 of the controller 500. It also sets the basic time data in the block access, in the line access and at the power on/off in the block access.

S207: The controller 500 transfers the frame drive control data from the data output unit 600 to the frame drive unit 700, which in response executes the frame drive. This drive operation improves the image quality of the frame 106, thereby maintaining the satisfactory image quality of the display area 102. This operation prevents the turbidity in a part of the frame 106, resulting from a change in the transmittance, caused by the voltage application in the frame 106 during the drive of the effective display area 104.

In the present embodiment the frame 106 and the effective display area 104 are maintained in the "white" state (transmitting light from the light source FL), while the character information is displayed "black". However the selection of "black" and "white" is not limited to the foregoing, and it is also possible, with the display device of the present embodiment, to invert "black" and "white" or to distinguish the frame 106 from the effective display area 104.

The frame drive in this step S207 is conducted, for a horizontal scanning period, by applying a voltage signal between the frame transparent electrodes 150 and the segment electrodes 124 provided on the lower glass substrate 120, and, the frame transparent electrodes 151 provided on the upper glass substrate 110 in parallel manner to the common electrodes 114. Consequently the entire frame is not activated during the period. The remaining portions of the frame (vertical frames) are activated through the use of common electrodes, at the erasure of the effective display area 104 in a step S213 to be explained later.

Simultaneously with the frame drive, this steps also effects an A/D conversion for converting the ambient temperature information of the display area 102, or the temperature information of liquid crystal, detected by the temperature sensor 400 into digital data by means of the A/D converter 950 (timings (2) and (3)).

S209: It executes temperature compensation, by reading the A/D converted data obtained above, and obtaining the temperature-compensated driving voltage, system clock signal and delay data according to the look-up table (FIG. 12) stored in the ROM 503 of the controller 500.

Figure 44:
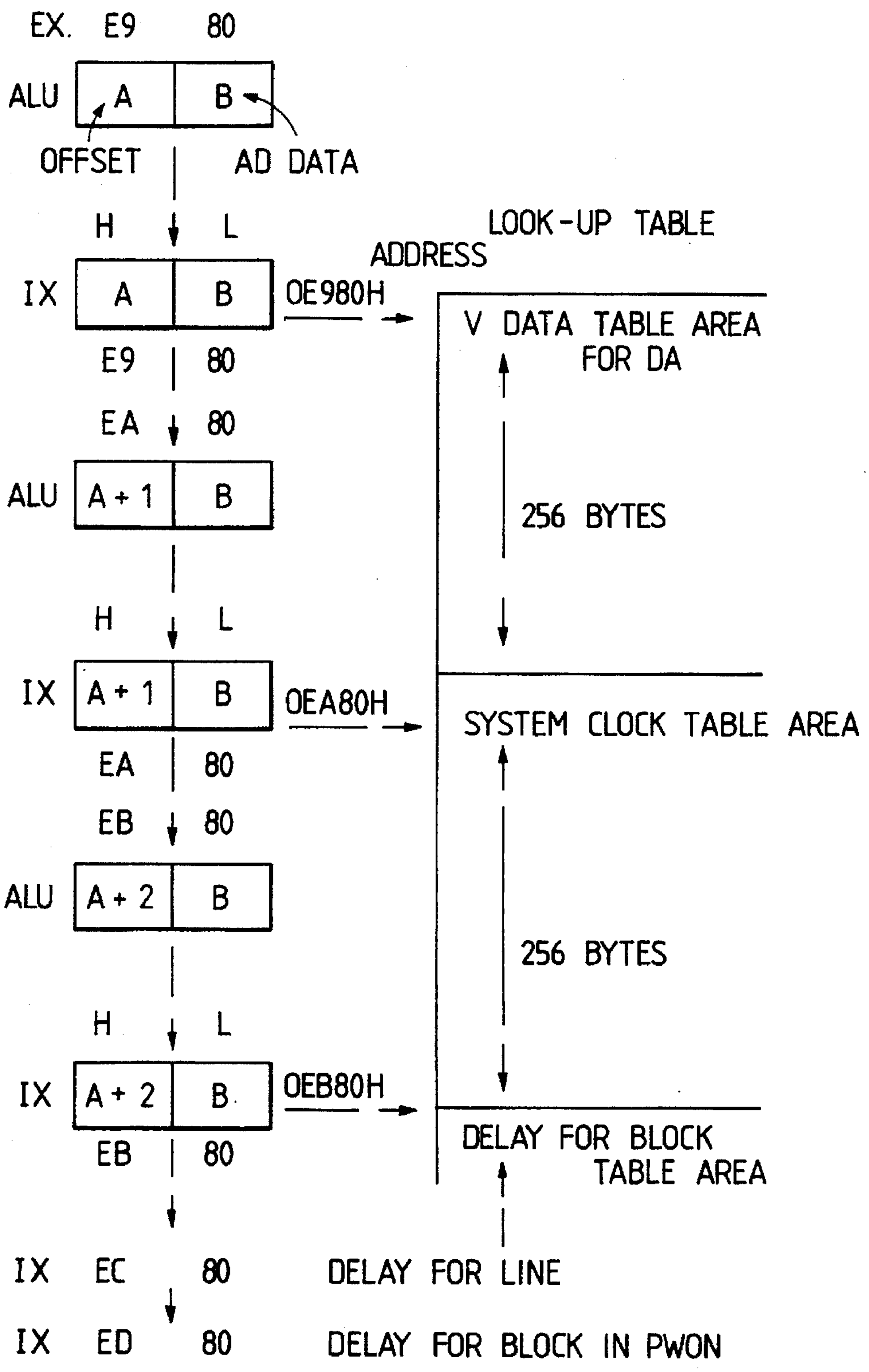
FIG. 44 is a schematic view showing the principle of algorithm for converting temperature data into driving voltage data and time data in the embodiment.

The above-mentioned process will be explained in detail in the following, with reference to FIG. 44, which shows the algorithm and look-up table for converting the A/D converted data into the driving voltage V, system clock signal defining the horizontal scanning period and delay time. As an example there is shown a case in which temperature data 80H are obtained. The data 80H indicate the lower bits of the address in the table, and are obtained, in the preceding A/D conversion, by converting the analog temperature data into the digital temperature data corresponding to such lower bits of the address.

The arithmetic logic unit ALU of the controller 500 adds, to the data 0080H, data E900H corresponding to the upper bits of the address of the driving voltage data area of the table. In this manner the content of the index register is changed to E980H, and there are obtained data corresponding to this address. The temperature-compensated driving voltage thus obtained is supplied, through the D/A converter 900, to the power supply controller 800. Then the ALU increases the upper bit data of the index register IX by one, without varying the lower bit data thereof, thereby obtaining a content EA80H. This corresponds to the address of the system clock area in the table, and the temperature-compensated data can therefore be obtained. The system clock data, defining the horizontal scanning period, are set in the time constant register TCONR of the timer TMR2.

Thereafter, the delay time data for the block access, line access, and power on/off state in the block access are respectively set, in a similar manner, in the registers CNTB, CNTL and CNTBB of the timer TMR1.

S211: It effects the synchronization of the drive start time of the effective display area 104. More specifically, in order to completely synchronize the start of access on the program with the start of drive for the effective display area, an internal interruption request IRQ3 for the CPU of the controller 500 is generated in response, for example, to the start edge of a clock pulse Tout of the timer TMR2 of the controller 500. This defines the actual start of the drive for the effective display area (timing (4)).

S213: It erases the entire effective display area 104, for example to the "white" state in the present embodiment.

This operation provides a satisfactory display area 102 at the start of power supply, in combination with the frame drive explained before.

This erasure of the area 104 is conducted for each block, composed for example of 20 scanning lines, so that one block is erased in a horizontal scanning period.

It is to be noted that this operation is not conducted by the "white" image data received from the word processor 1, but by an automatic setting of a predetermined block erasing signal wave on the program. This enables the erasure of the effective display area at the start or end of the power supply.

S215: It regulates the horizontal scanning period, by setting the delay data of the register CNTBB into a counter, and causing the timer TMR1 to count the clock pulses thereof based on the data. In this manner the horizontal scanning time is regulated between the effective display area 104 and the program execution, and an internal interruption request IRQ3 is generated upon expiration of a predetermined time.

More specifically, the timer TMR1 sets a certain time from the basic time data determined in the step S205 and the temperature-compensated obtained in the step S209, and generates an internal interruption request after the counting of the time from a suitable point of time.

S216: The above-mentioned steps S211, S213 and S215 are conducted for every block, namely for every horizontal scanning. The present step discriminates whether all the blocks in the effective display area 104 have been completed, and, if not, the sequence returns to the step S211 to repeat the above-mentioned procedure until all the blocks are covered (timing (5)).

S217: When the step S216 discriminates the completion of all the blocks in the effective display area, the present step turns off the Busy signal, thereby enabling the transfer of the signals D from the word processor 1. At the same time the Light signal is turned on, whereby the operator of the word processor 1 confirms the start of power supply by the display of the area 102 after switching on the word processor. However, at this point, the above-mentioned steps S201–S215, particularly the driving operations of the frame 106 and the effective display area 104, have been conducted as the initial display control (timing (6)).

S219: This step awaits an interruption request $\overline{\text{IRQ1}}$ or $\overline{\text{IRQ2}}$, which is generated in response to the transfer of the address data from the word processor 1, and which initiates the execution of various programs to be explained later. Thus, until the transfer of the address data, there is executed a stand-by program whereby the common lines and segment lines are maintained at a same potential or at a ground potential. The display 102 remains unchanged. As an alternative, it is also possible to terminate the power supply to the display device 100, for example by terminating the power supply to the power supply controller 800 thereby turning off the voltage signal.

As already explained, the selection of the request $\overline{\text{IRQ1}}$ or $\overline{\text{IRQ2}}$ is made in advance arbitrarily by the operator, for example according to the mode of use or the data processed by the word processor.

(5.2.2) Block Access

Now reference is made to FIGS. 45A–45D, 48A and 48B for explaining the block access display control, to be activated by the interruption request $\overline{\text{IRQ2}}$ after the initial control (INIT routine) explained above.

FIGS. 45A to 45D are flow charts of the display control programs stored, in the form shown in FIG. 12, in the ROM 503 of the controller 500, and activated in various stages of the block access display control.

Figure 48A:
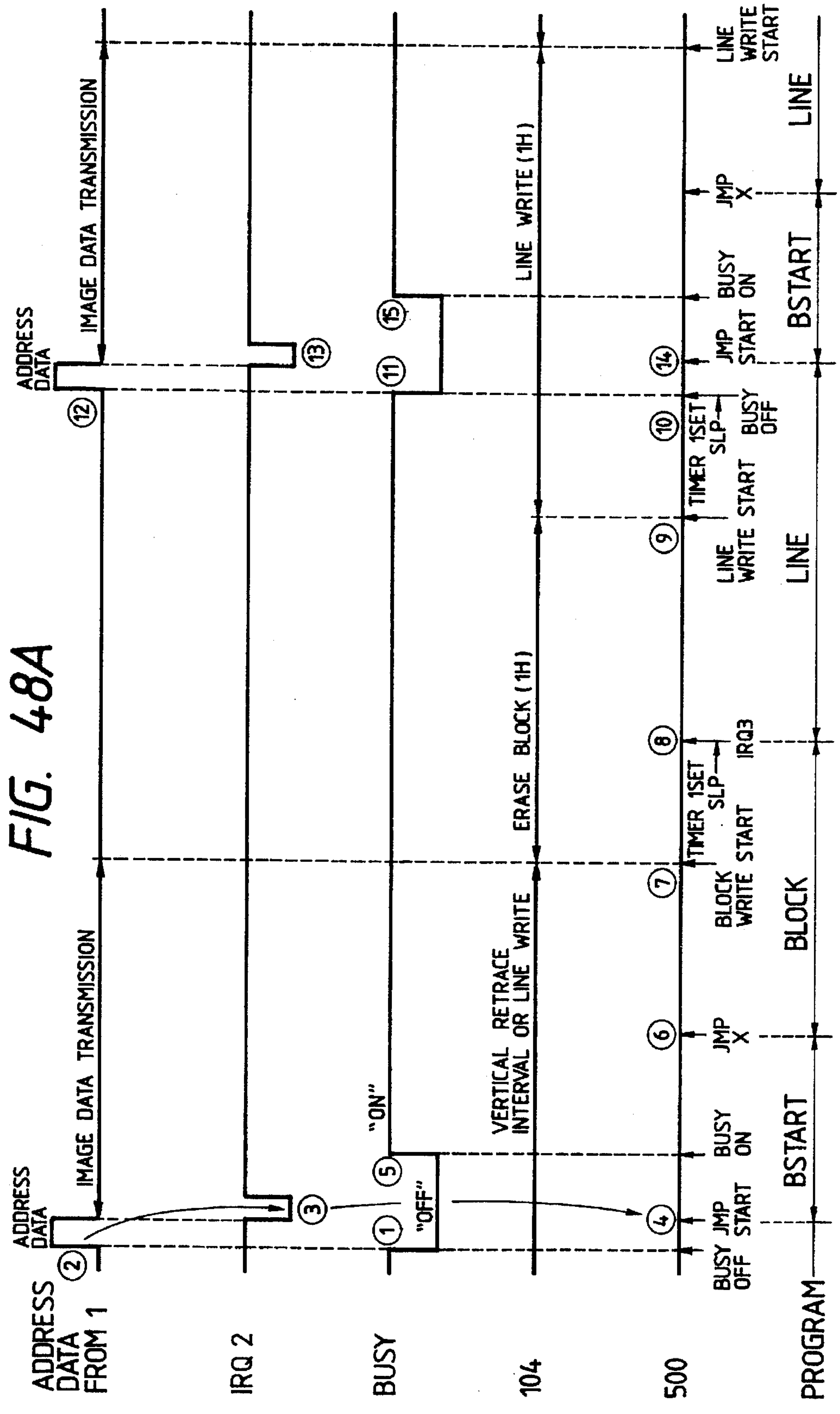
FIGS. 48A, 48B and 49A to 49D are timing charts showing the function of the embodiment respectively in the display control sequences shown in FIGS. 45A to 45D and FIGS. 48A to 48L.
Figure 48B:
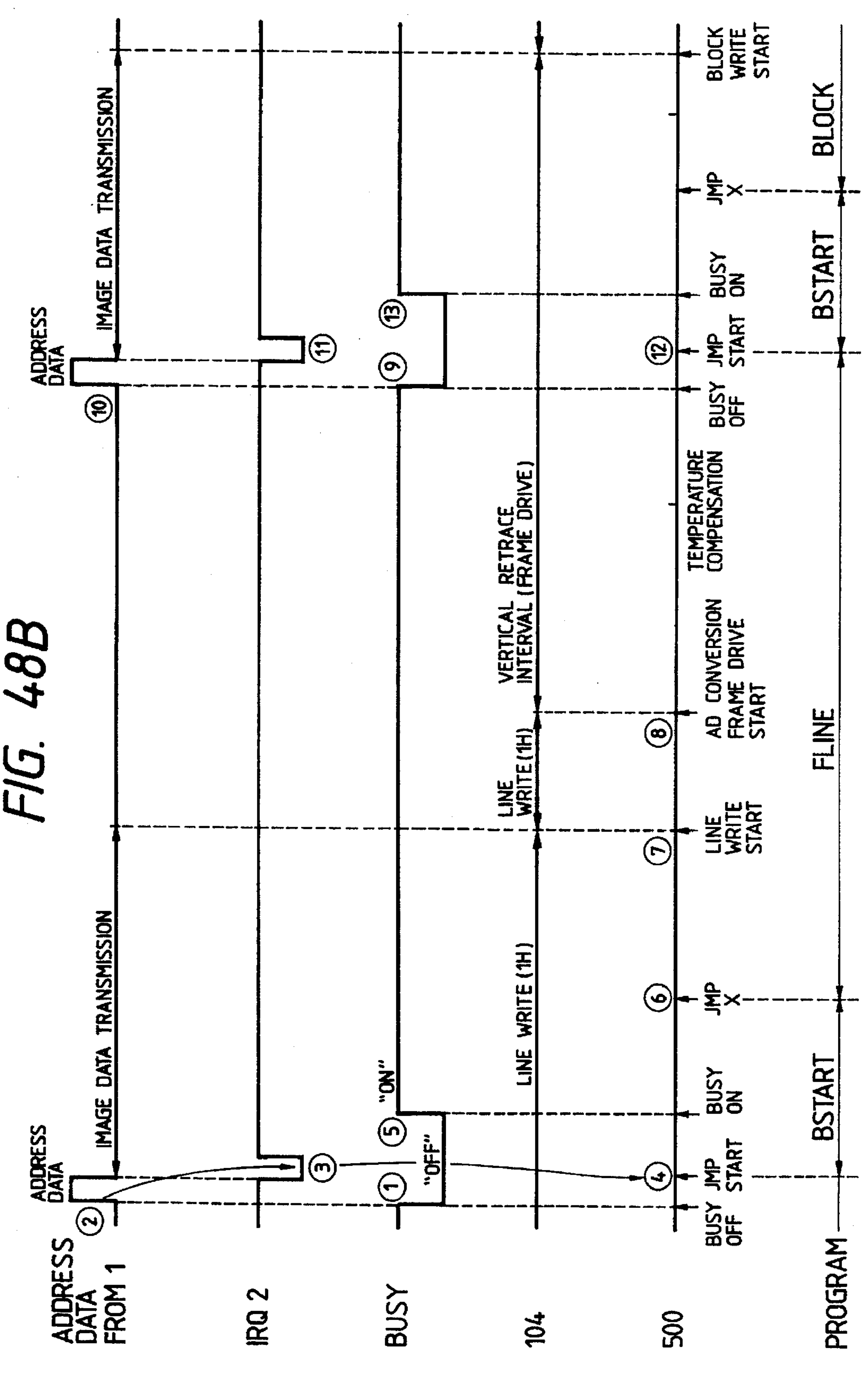

FIGS. 48A and 48B are timing charts of such display control.

The controller 500 is in the stand-by state by turning off the Busy signal (FIG. 48; timing (1)). Then in response to the transfer of the address data (timing (2)), and to the entry of the generated interruption request $\overline{\text{IRQ2}}$ (timing (3)), the controller 500 activates a BSTART routine shown in FIG. 45A (timing (4)). In the following there will be explained the display control in said BSTART routine, with reference to FIG. 45A:

S301: It read the address data. The address data RA/D transferred to the data output unit 600 are fetched in the controller 500.

S303: It executes an address conversion as explained in (4.3.2) based on said address data, and sets the address of the program to be executed, by referring to the jumping table shown in FIG. 12.

S305: It turns on the Busy signal (timing (5)) thereby disabling the transfer of succeeding address data.

S307: The sequence branches to a program of the address determined in the step S303 (timing (6)). The sequence proceeds to a BLOCK routine if the address data RA/D indicate the first line of a block, or to a FLINE routine if the address data indicate the last line of the effective display area, or to a LINE routine if the address data indicate any other address.

Figure 45B:
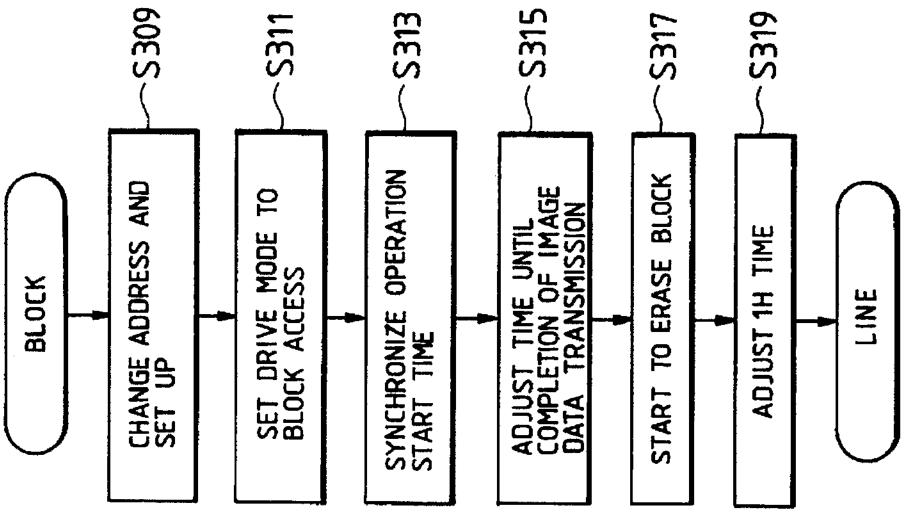
FIGS. 45A to 45D and 46A to 46L are flow charts showing an example of detailed display control sequence in block access mode and in line access mode in the embodiment.
Figure 45A:
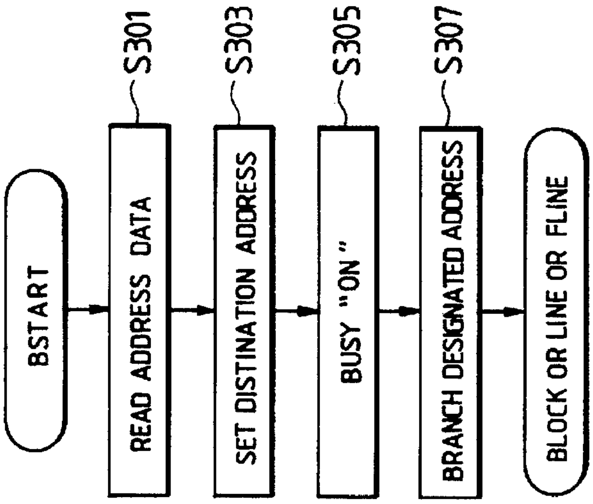

Following sequence is executed when the BLOCK routine shown in FIG. 45B is activated.

S309: It effects conversion and setting of the address. It reads the address data RA/D transferred to the registers RA/D L, RA/D U in the register unit 630 of the data output unit 600, and executes the address conversion for selecting the line to be activated, as explained in (4.3.3), based on such address data. Thus converted address is used for referring to the line table, shown in FIG. 12, to obtain address data, which are set in the registers DL L and DL U in the register unit 630 of the data output unit 600.

S311: It sets the block access mode, by setting data indicating the block erasure of the block access mode, in the register DM of the register unit 630 of the data output unit 600.

S313: It executes synchronization of the operation start time, by generating the internal interruption request IRQ3 in response, for example as explained before, to the start edge of the clock pulse Tout of the timer TMR2 of the controller 500, thereby completely synchronizing the timing of the effective display area 104 with that of the program execution. In this manner there is achieved synchronization between the output pulses Tout and the program execution, or, between the function of the effective display area 104 and the program execution, since the output pulses Tout defines the horizontal scanning period and the operation timing in the effective display area 104.

S315: It regulates the time until the termination of the image data transfer. As shown in FIG. 48A, the image data transfer is conducted immediately after the address data transfer, and the access to the effective display area 104 is started upon completion of the transfer (timing (7)).

The image data transfer time is the sum of time required for the transfer of image data from the word processor 1, for example 40 μsec in case of transferring the image data of 800 bits of one scanning line in 4-bit parallel form with a rate of 5 MHz, and time required for storing the image data in the segment drive unit 200.

The present BLOCK routine principally aims at the block erasure which does not require the image data. However, the present routine contains the transfer of image data, in preparation for the next line access. It is also possible, however, to dispense with the transfer of image data in this routine, and to provide an interval of equivalent time in the program execution.

S317: It starts the block erasure (timing (7)), by making access to a block, for example 20 scanning lines, in a horizontal scanning period (1H), thereby bringing the entire block to "white" state. As already explained before, these drive operations are not conducted by the received "white" data but by a certain block erasing signal wave.

Also as will be apparent from FIG. 48A, the block erasure in the effective display area 104 is started (timing (7)) either after the completion of last line writing of a preceding block or after the vertical flyback period.

S319: It regulates the horizontal scanning period on the program. Since the access time to the effective display area 104 is rendered variable according to the temperature of the ferroelectric liquid crystal display device, the program execution time is regulated according to the horizontal scanning period of the display area 104.

More specifically, the timer TMR1 in the controller 500 counts the clock pulses thereof for example from the activation of the program in response to the address data transfer (timing (4)), and, upon expiration of a predetermined period, generates an internal interruption request IRQ3 for supply to the CPU 501 of the controller 500, thereby causing branching to a next routine.

The period is determined by the count data indicating the sum of the program execution time and the delay time and stored in the table area CNTB shown in FIG. 12 as the result of temperature compensation explained in the step S209 in (5.2.1), and the timer TMR1 compares the clock count thereof with the content of the area CNTB and generates the internal interruption request IRQ3 upon reaching a predetermined number.

The sequence branches to the LINE routine by the IRQ3 after the expiration of the period (timing (8)).

Figure 45C:
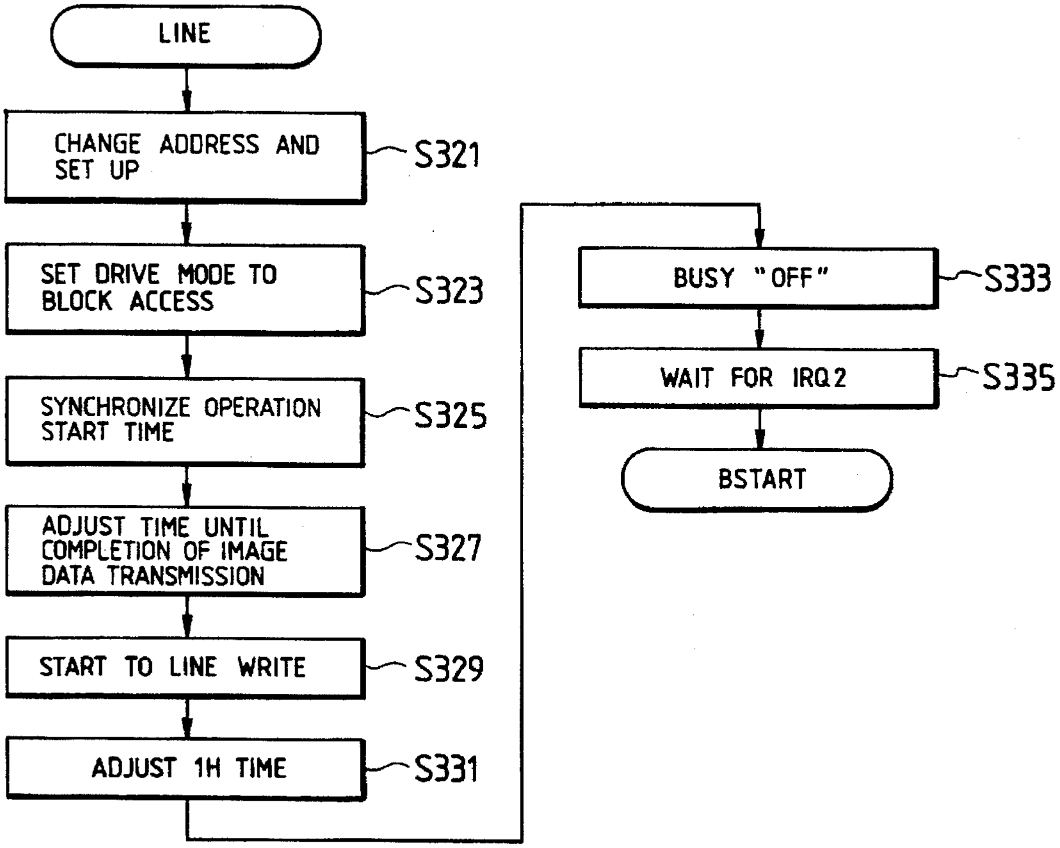

FIG. 45C is the flow chart of the LINE routine, which is activated after the BLOCK routine or immediately after the BSTART routine. In the following explanation it is assumed to be activated after the BLOCK routine, and steps similar to those already explained will be omitted from the explanation:

S321: It executes the conversion and setting of address, when the LINE routine is activated by the IRQ3 (timing (8)).

S323: It sets the line writing in the block access mode, by setting corresponding data in the register DM of the register unit 630 of the data output unit 600.

S325: It executes synchronization of the operation start time.

S327: It regulates the time until the termination of the image data transfer. If the image data have been transferred in the preceding BLOCK routine, the transfer of image data is no longer necessary, and the program can wait for an equivalent time without actual execution.

S329: It start the line access (timing (9)). At this point the block erasure is terminated. The writing, or display, of information of the first line in a block is executed according the transferred image data of a scanning line.

S331: It regulates the horizontal scanning time (timing (10)).

S333, S335: These steps turn off the Busy signal (timing (11)), and await an interruption request $\overline{IRQ2}$ without program execution.

In response to the address data transfer (timing (12)), there is generated an interruption request $\overline{IRQ2}$ (timing (13)), whereby the BSTART routine is activated (timing (14)). Thereafter the LINE routine is executed after the BSTART routine, thereby writing a second scanning line of the block. The writing of all the scanning lines of the block is completed by alternate execution of the BSTART routine and the LINE routine, and the sequence then proceeds to the erasure and line writing in a next block.

Figure 45D:
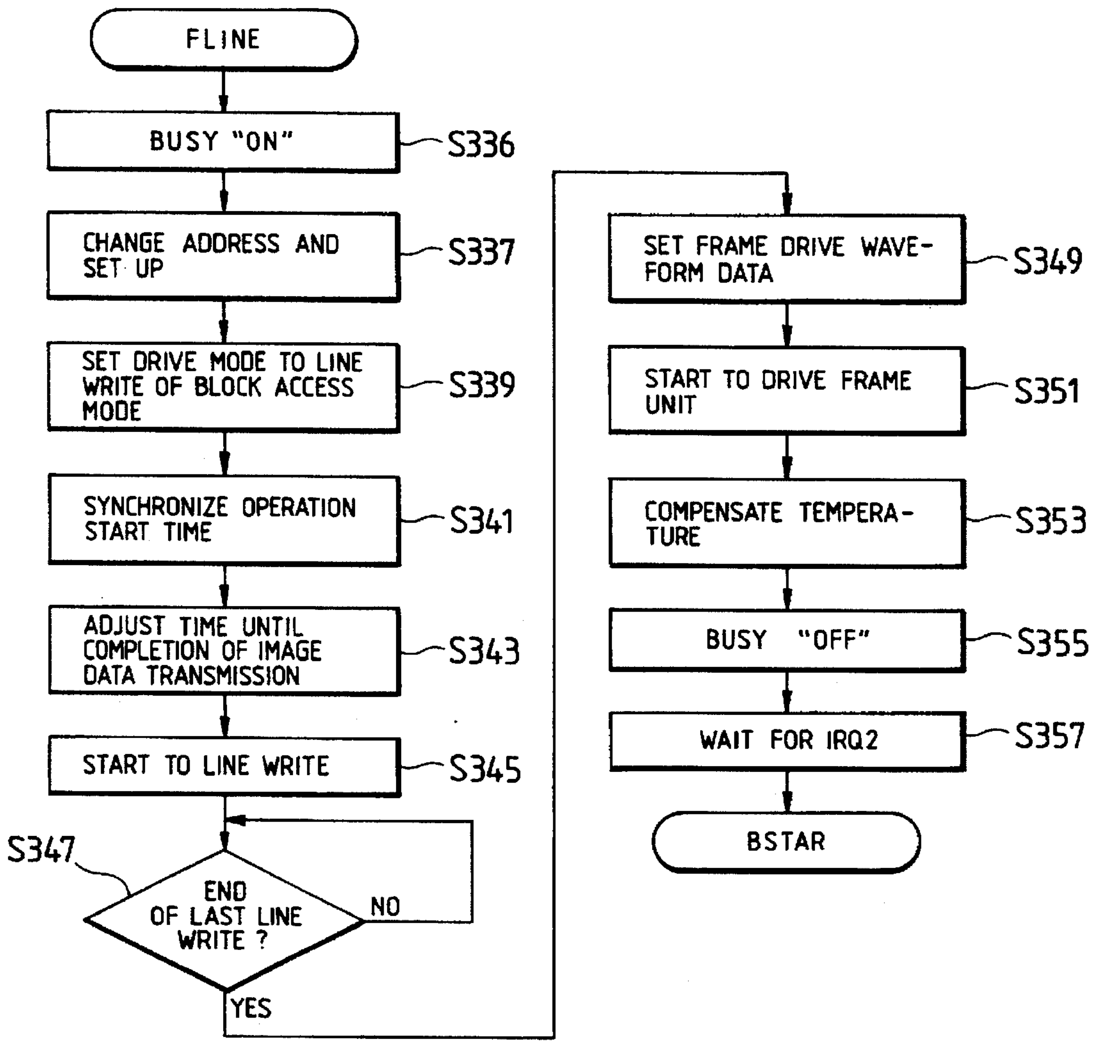

Thereafter, when address data indicating the last line of the effective display area 104 are transferred, there is activated a process indicated by a flow chart in FIG. 45D and a timing chart in FIG. 48B.

Thus, in response to the transfer of address data indicating the last line of the effective display area 104 (FIG. 48B; timing (2)), there is generated an interruption request $\overline{IRQ2}$ (timing (3)), whereby the aforementioned BSTART routine is activated (timing (4)). Since the address data indicate the last line of the display area 104, the FLINE routine shown in FIG. 45D is activated (timing (6)) after the BSTART routine.

In the following there will be explained steps of the FLINE routine, with reference to FIGS. 45D and 48B, but steps similar to those already explained will not be explained in detail:

S336, S337, S339, S341, S343: These steps turns on the Busy signal, executes the conversion and setting of the address, selects the line writing in the block access mode, and executes the synchronization of the operation start time. They also regulate the time until the completion of image data transfer.

S345: It starts the writing of the last line (timing (7)). At this point the writing of the second line from the last in the effective display area 104 is completed.

S347: It discriminates whether the writing of the last line in the effective display area 104 is completed, and, if completed, the sequence proceeds to a next step S349. This discrimination is executed only at the access to the last line of the area 104. In other accesses, only the timing of start of access is inspected.

S349: It renews the frame drive data, by setting the wave control data for the frame drive in the next step in the register unit 630 of the data output unit 600. However, it is also possible to conduct the frame drive without data renewal, if a frame driving system is independently provided.

In the INIT routine shown in FIG. 42 and explained before, the frame driving voltage is set together with the setting of the signal wave data. However, the frame drive conducted during the vertical flyback period utilizes, as reference, the temperature-compensated driving voltage obtained in the INIT routine.

S351, S353: These steps start the drive of the frame 106 and the A/D conversion (timing (8)).

The vertical flyback period starts from this timing. Also the driving voltage, system clock signal, and delay time data are renewed, based on the A/D converted temperature data, simultaneously with the completion of the A/D conversion.

The frame drive in the step S351 brings only portions of the frame 106 (horizontal frames) to the "white" state, and the remaining portions (vertical frames) are driven together with the drive of the effective display area 104, as already explained in relation to the INIT routine. It is however possible to drive the entire frame 106 at the same time, if the driving system for the frame 106 is made independent from that for the effective display area 104.

In the foregoing explanation, the frame 106 is electrically formed in order to improve the image quality outside the effective display area 104. However, it is naturally possible to mechanically cover the frame 106, for example by coating, thereby avoiding the problem of image quality outside said display area 104.

S355, S357: These steps turn off the Busy signal and await the interruption request $\overline{IRQ2}$ (timing (9)).

In this manner the frame drive and the temperature compensation are conducted at the writing of the last line of the effective display area 104 and in the vertical flyback period succeeding thereto.

Thereafter, when the address data of the uppermost scanning line of the effective display area 104 are transferred (timing (10)), there is generated an interruption request $\overline{\text{IRQ2}}$ (timing (11)), whereby the BSTART routine is activated (timing (12)). Thereafter the erasure and the line writing are conducted for each block.

(5.2.3) Line Access

In the following there will be explained the line access display control to be activated by the interruption request $\overline{\text{IRQ1}}$ after the aforementioned INIT routine, with reference to FIGS. 46A to 46L and 49A to 49D.

FIGS. 46A to 46L are flow charts of the display control programs, which are stored, in the form shown in FIG. 12, in the ROM 503 of the controller 500 and are activated in different stages of the line access display control.

FIGS. 49A to 49D are timing charts of such display control.

The line access of the present embodiment is different from the aforementioned block access in the absence of the block erasure. Thus the renewal or display of information is conducted for each scanning line without erasure thereof in advance. The line writing in the line access mode is conducted with the inversion of polarity of the driving signal wave in every line, in every frame and within a horizontal scanning period. In the following explanation, steps similar to those in the block access display control will not be explained in detail.

Figure 49A:
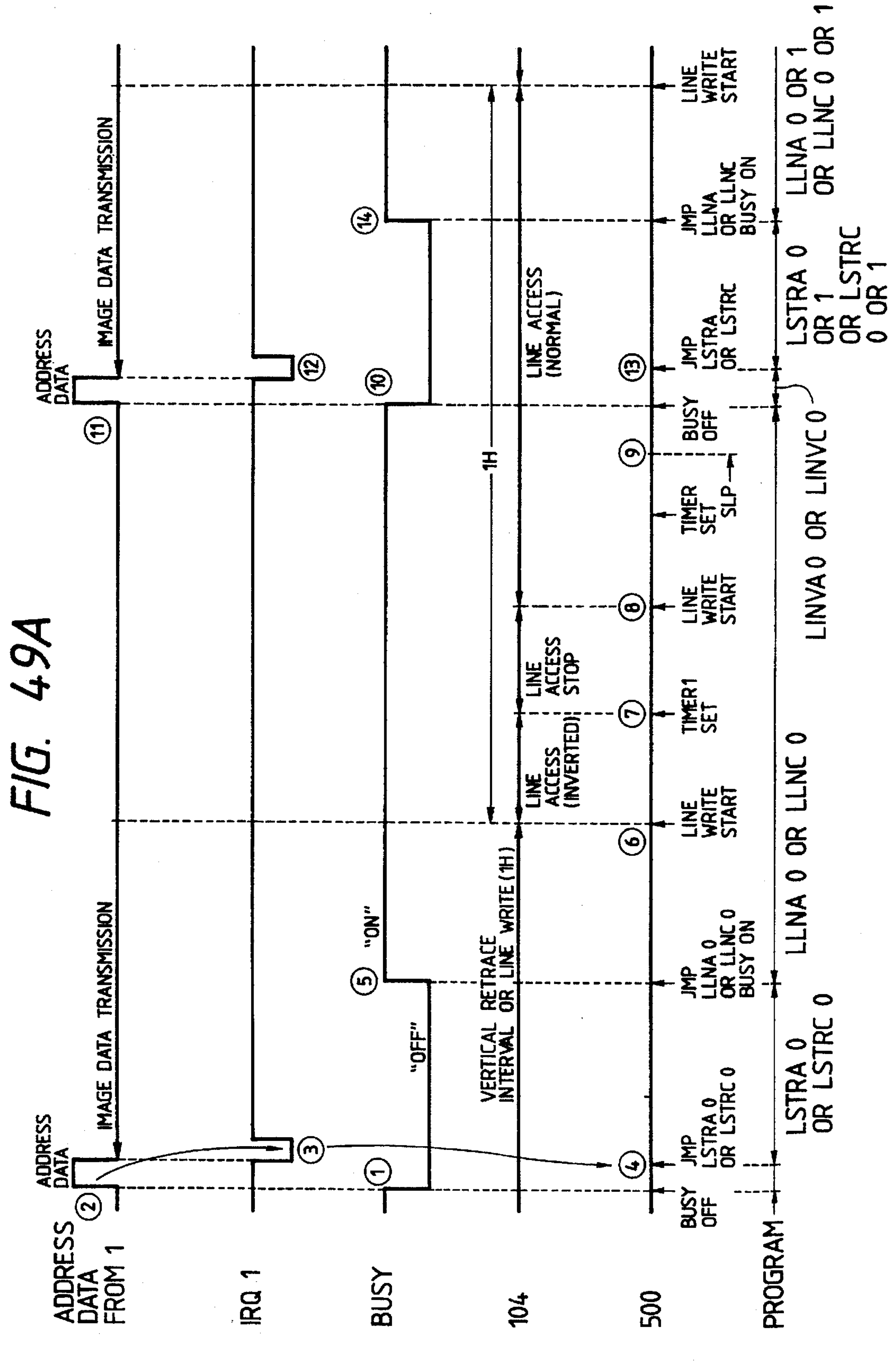
Figure 49B:
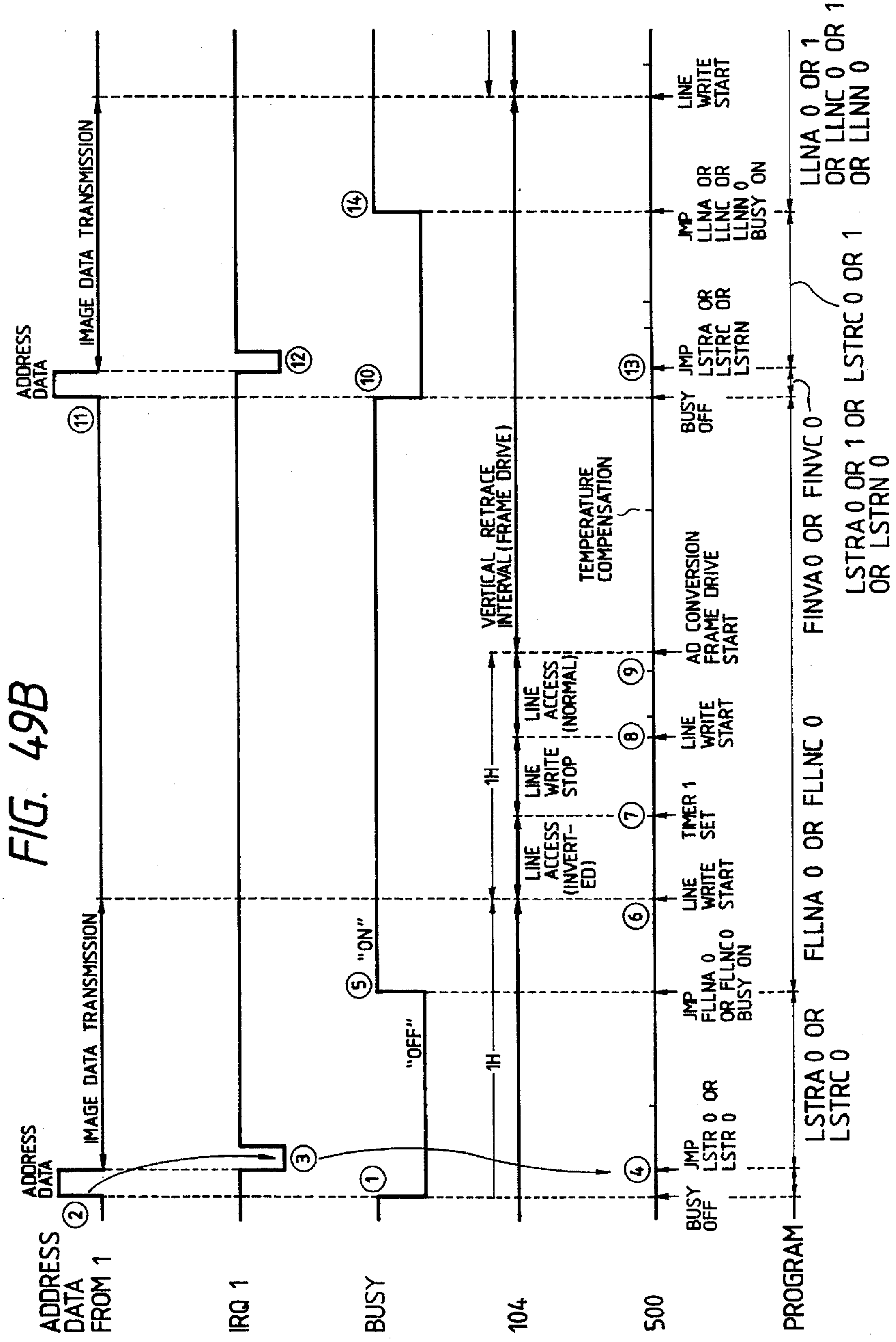
Figure 49C:
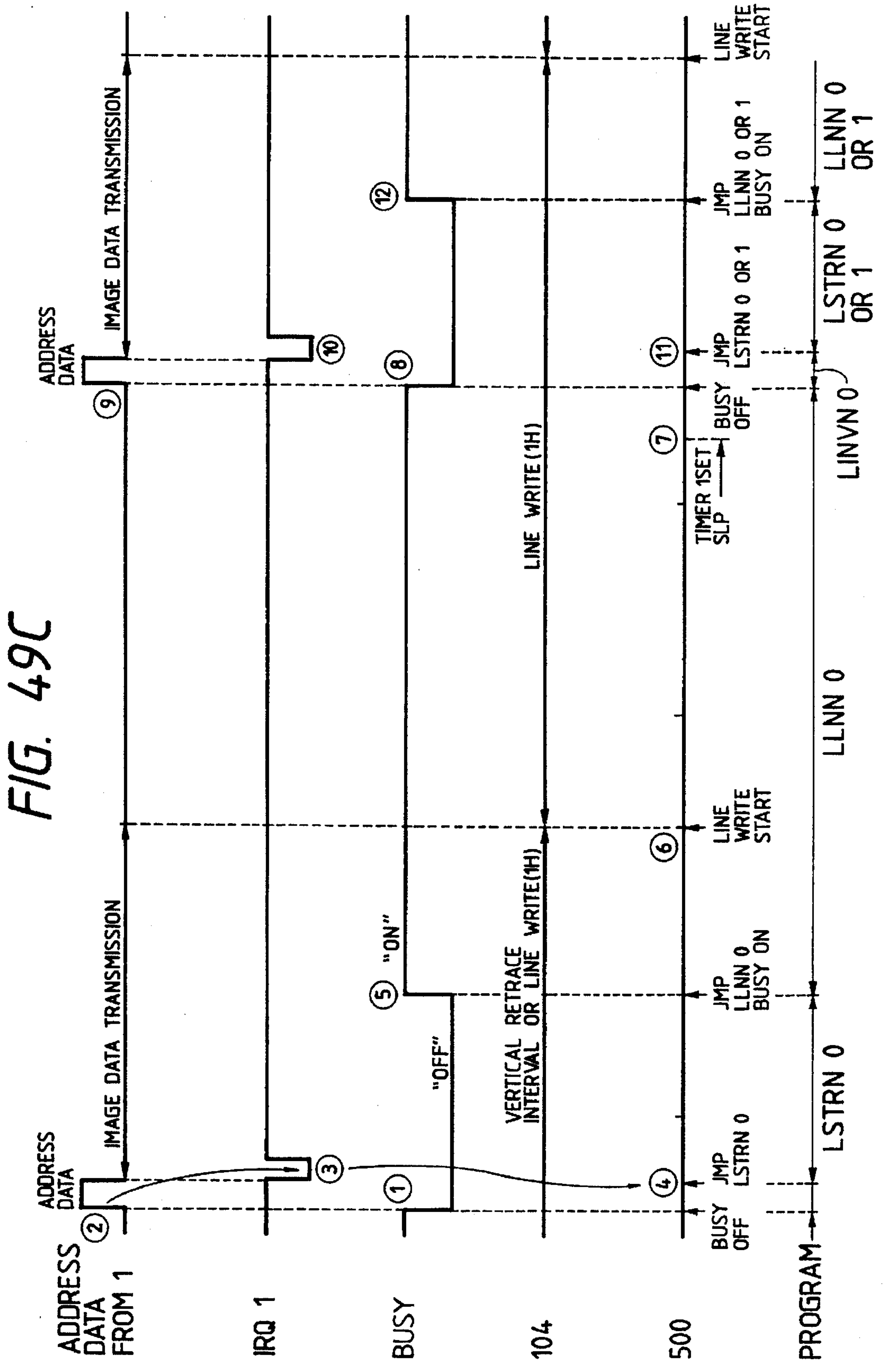

The controller 50 has been in the standby state by turning off the Busy signal (FIGS. 49A or 49C; timing (1)). Then, when the address data are transferred (timing (2)), there is generated an interruption request $\overline{\text{IRQ1}}$ (timing (3)), whereby the LSTR0 routine shown in FIG. 46A is activated (timing (4)). The LSTR0 routine is either the LSTRA0 routine corresponding to the A wave, or LSTRN0 routine corresponding to the N wave, or LSTRC0 routine corresponding to the C wave, selected according to the temperature of the ferroelectric liquid crystal. In the drive executed by said LSTRA0 or LSTRC0 routine, the driving signal wave is inverted in polarity within a horizontal scanning period, and the A wave or C wave is formed by the inverted wave and the normal wave with an interval therebetween.

In the following explanation, the characters A, N or C indicating the wave form may be sometimes omitted.

In the following there will be explained the display control in the LSTR0 routine with reference to FIG. 46A:

S401: It reads the address data.

S402: It discriminates whether the read address data indicate the last scanning line in the effective display area 104, and, if so, the sequence proceeds to a FLLN0 routine in a step S404, or, if otherwise, the sequence proceeds to a LLN0 routine.

In the following there will be explained the display control of the LLN0 routine, with reference to FIGS. 46C and 49A for LLNA0 or LLNC0 routine.

S410, S411, S413: These steps turn on the Busy signal (timing (5)), execute conversion and setting of the address, and selects the line access mode.

S414, S415: These steps execute synchronization of the operation start time, and regulate the time until the termination of the image data transfer.

S416: It sets the inverted signal wave in the former half, by setting the inverted signal wave data of the A or C wave in the common line drive, in a register.

S417: It start the line access in the former half of the horizontal scanning period with the inverted wave, by supplying the signal wave data of the register REG2 to the registers CC1, CC2, SC1 and SC2 of the data output unit 600 (timing (6))

S418: It regulates the horizontal scanning period (timing (7)). In this drive, there is formed an interval between the line access with the inverted wave in the former half of the horizontal scanning period and the line access with the normal wave in the latter half, by means of the delay time data in the registers CNTB and CNTL of the timer TMR1. In the present embodiment, the interval is formed by one CNTB delay time data and four CNTL delay time data.

S419, S421, S422 and S423: These steps execute processes similar to those in the steps S411, S413, S414 and S415, but the time regulation in the step S423 consists of no execution for period equal to that of the step S415, since the data transfer is already completed.

S424: It sets the normal wave in the latter half as in the step S416, by setting the data of the normal A or C wave in a register REG2.

S425: It initiates the line access with the normal wave in the latter half of the horizontal scanning period as in the step S417 (timing (8)).

The information writing with the synthesized wave is conducted either in the former half or the latter half of the horizontal scanning period, with an interval therebetween, by means of the processes of the step S417 and the present step.

S426: It waits for a predetermined period for regulating the horizontal scanning time. Then in response to the generation of an internal interruption request $\overline{\text{IRQ3}}$ (timing (9)), the program is again activated, whereupon the sequence proceeds to LINVA0 or LINVC0 routine.

In the following the LINVA0 and LINVC0 routines will be explained, with reference to FIGS. 46I and 49A:

S430, S431: These steps turn off the Busy signal (timing (10)), thereby awaiting an interruption request $\overline{\text{IRQ1}}$.

S432, S433, S434: When the address data are transferred (timing (11)) to generate an interruption request $\overline{\text{IRQ1}}$ (timing (12)), there is discriminated whether the line counter LCNT is "0", and, if affirmative, the sequence proceeds to a step S433 to reset the line counter LCNT, and then to a routine LSTRA1 or LSTRC1.

If the discrimination turns out negative, the sequence proceeds to a step S434 to reduce the content of the line counter LCNT by one, and then returns to the routine LSTRA0 or LSTRC0.

If the step S402 of the LSTR0 routine discriminates that the transferred address data indicate the last scanning line of the effective display area 104, the sequence branches to a FLLN0 routine.

In the following there will be explained the display control of the FLLN0 routine, with reference to FIGS. 46E and 49B.

S440, S441, S443: These steps turn on the Busy signal (FIG. 49B; timing (5)), executes the conversion and setting of the address, and selects the line access mode.

S444, S445: These steps execute the synchronization of the operation start time, and regulate the time until the completion of the image data transfer.

S446: It sets the inverted wave in the former half, in a similar manner as in the step S416 explained before.

S447: It initiates the line access with the inverted wave in the former half of the horizontal scanning period, as in the step S417 explained above (timing (6)).

S448: It regulates the horizontal scanning period (timing (7)), and forms an interval in a similar manner as in the step S418.

S449, S451, S452, S453: These steps execute processes similar to those in the aforementioned steps S441, S443, S444 and S445, but the time regulation in the step S453 is replaced by absence of execution for a period equal to that of the process of the step S445, since the data transfer is already completed.

S454: It sets the normal wave in the latter half in a similar manner as in the step S446.

S455: It initiates the line access with the normal wave in the latter half of the horizontal scanning period, in a similar manner as in the step 447 (timing (8)).

S456: It discriminates whether the writing of the last line of the effective display area 104 has been completed, and, if completed, the sequence proceeds to a next step S457.

S457: It sets the wave control data for the frame drive to be executed in the next step.

S458, S459: These steps start the drive of the frame 106 and the A/D conversion (timing (9)). At this point, the writing of the last scanning line of the effective display area 104 has been completed. The temperature compensation data are renewed simultaneously with the completion of A/D conversion.

Upon completion of the step S459, the sequence proceeds to a routine FINVA0 or FINVC0.

The routine FINVA0 or FINVC0 will be explained in the following, with reference to FIGS. 46K and 49B.

S460, S461: These steps turn off the Busy signal, thereby awaiting the interruption request $\overline{IRQ1}$ (timing (10)).

S462: When the address data are transferred (timing (11)), there is generated an interruption request $\overline{IRQ1}$ (timing (12)), and there is discriminated whether or not to change the control routine, by determining the content of the wave identifying register CX from the temperature compensation data obtained after the access to the last scanning line, and comparing the content with preceding content of the register CX. If the contents are different in said comparison, the sequence returns to the step S104 shown in FIG. 41 for varying the control routine, and the step S105 selects a routine corresponding to the new signal wave. If the contents are same, the sequence proceeds to a step S463.

In the display control in the line access mode, if the detected temperature of the ferroelectric liquid crystal is different from the preceding temperature range, the driving signal wave is altered to achieve more appropriate display control.

S463, S464, S465: These steps discriminate whether the frame counter FCNT is "0", and, if so, the sequence proceeds to a step S464 for resetting the frame counter and the line counter, and proceeds further to the LSTR1 routine.

Figure 46B:
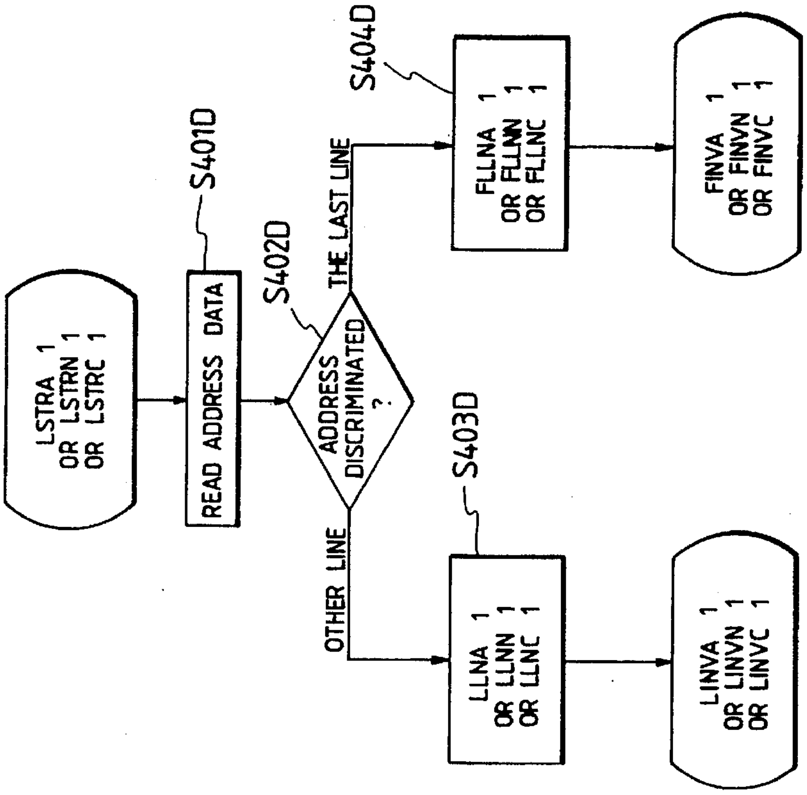
Figure 46A:
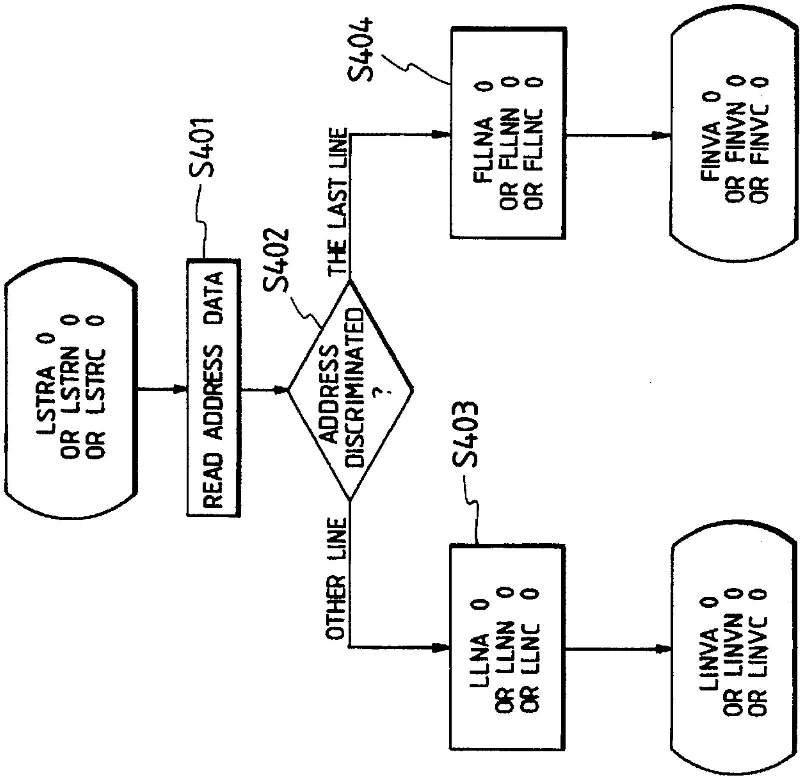
Figure 46C:
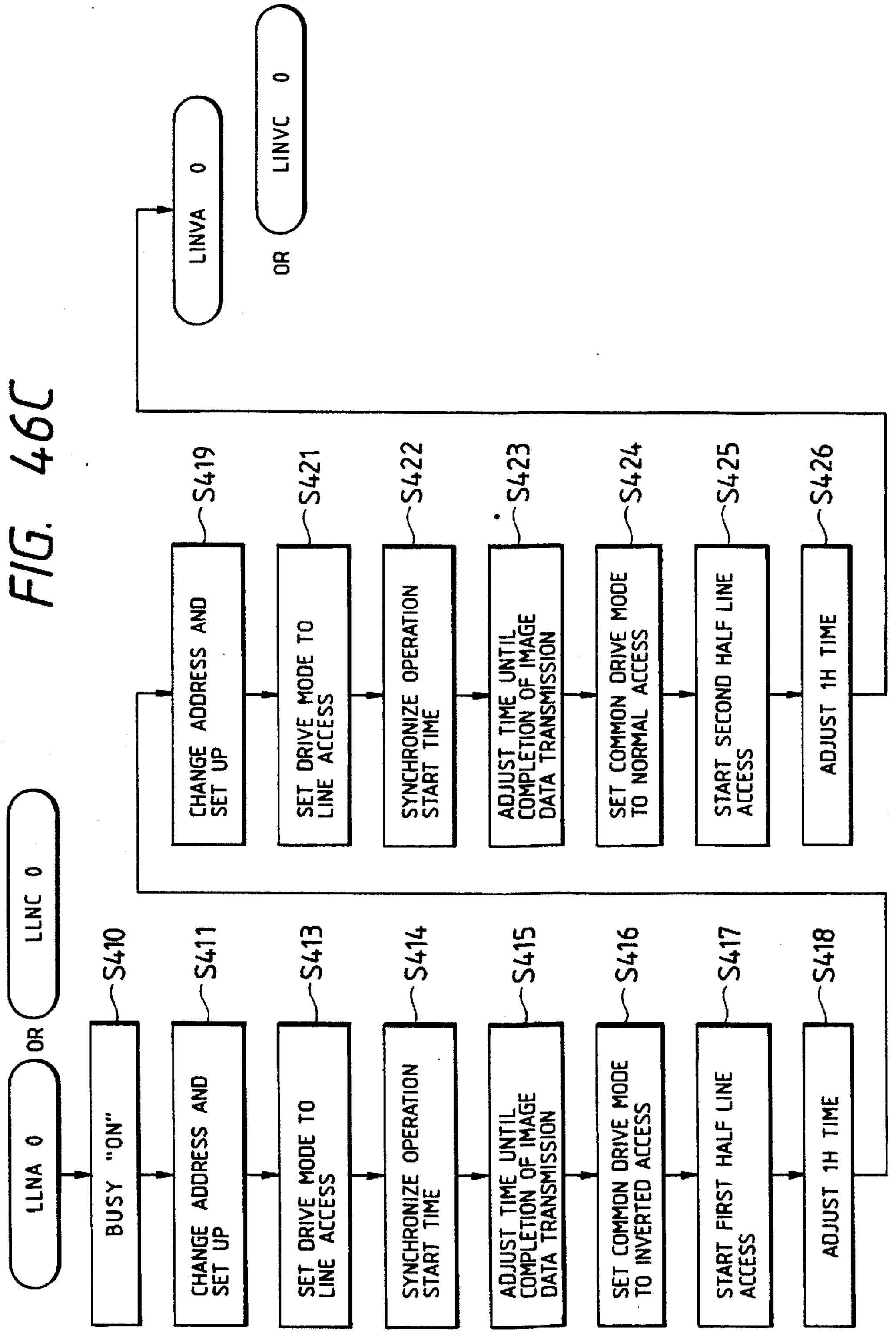
Figure 46D:
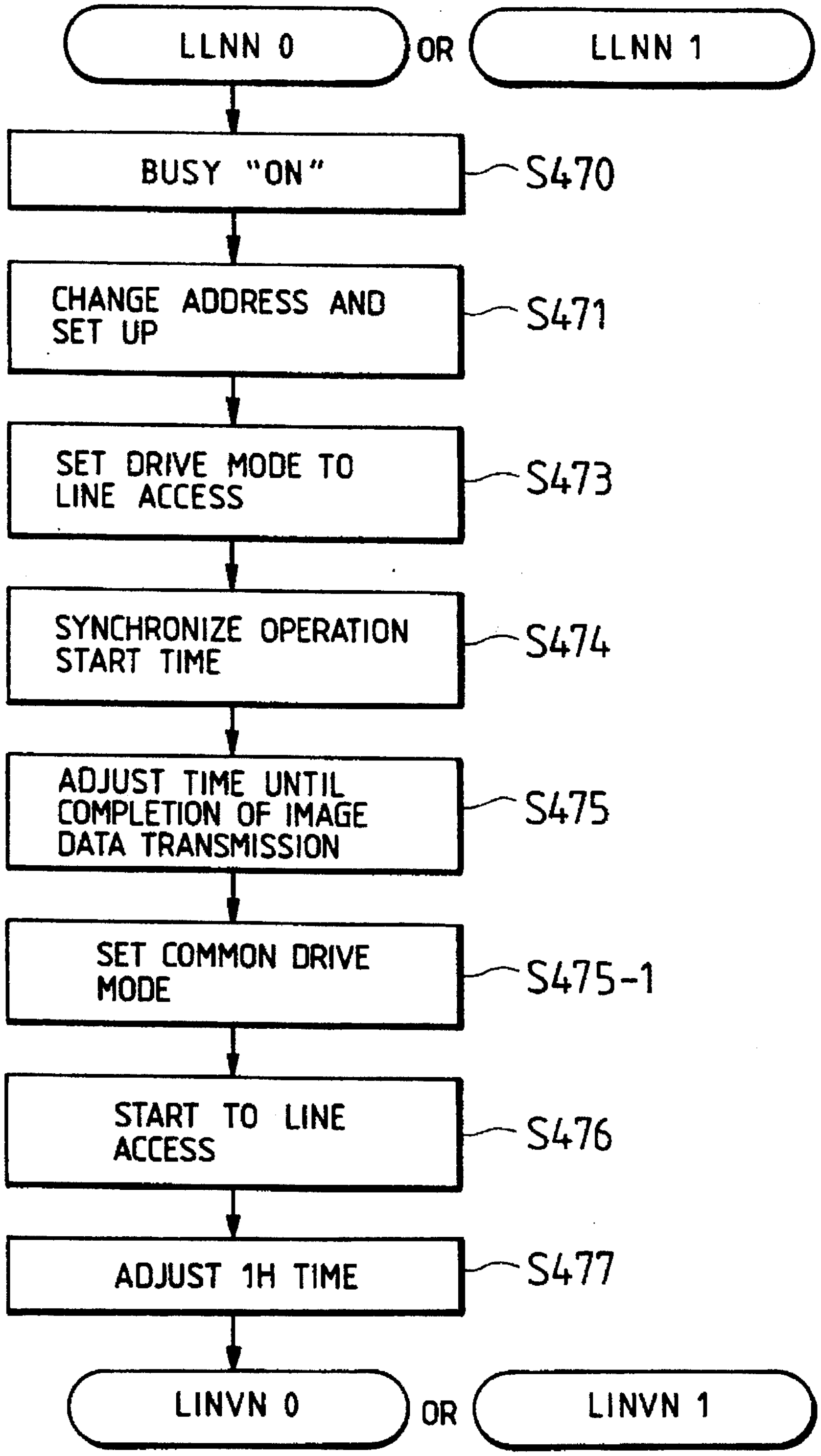
Figure 46E:
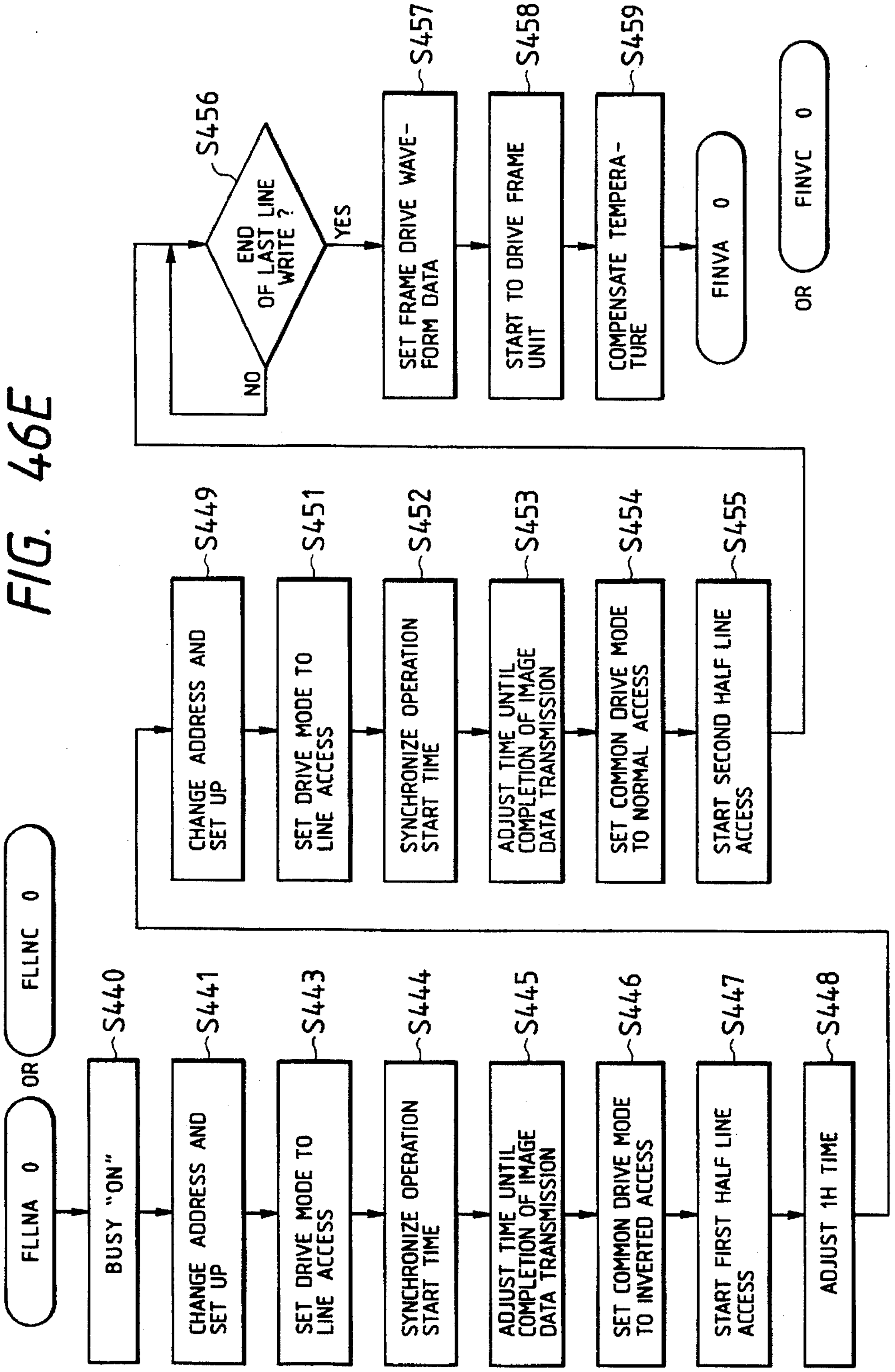

The LSTR1 routine and the succeeding routine are, as shown in FIG. 46B, similar to the LSTR0 routine and the succeeding routine shown in FIG. 46A, except that the line access in the former is made with the normal wave in the former half and the inverted wave in the latter half, whereas, in the LSTR0 routine, the line access is made with the inverted wave in the former half and the normal wave in the latter half. Routines LLN1, FLLN1, LINV1 and FINV1 succeeding to the LSTR1 routine are respectively shown in FIGS. 46G, 46H, 46J and 46L, but the explanation thereof will be omitted.

According to the preceding explanation, if the writing operation is conducted in the former half of a horizontal scanning period in the scanning line of first access when the frame counter FCNT and the line counter LCNT are set at "1", the writing operation in the next scanning line is conducted in the latter half. Thereafter the writing is alternately conducted in the former or latter half up to the last scanning line. In the next cycle, the writing operation is conducted in the latter half on a scanning line on which the writing operation in the preceding cycle has been conducted in the former half, and vice versa.

In the line access mode with the N wave, there is conducted no wave inversion of the polarity within the horizontal scanning period. However the wave is inverted in polarity at every frame and every line, by suitable setting of the frame counter FCNT and the line counter LCNT as explained above.

In the following there will be explained the display control with the N wave, with reference to FIGS. 46D, 46F, 49C and 49D. The routines different from those already explained are LLNN0, LLNN1, FLLNN0 and FLLNN1. The routines LLNN0 and LLNN1 include:

S470, S471, S474, S475: These steps are similar to those already explained, and turns on the Busy signal (timing (5)), then executes conversion and setting of the address, selects the line access mode, executes regulation of the operation start time, and regulates the time until the completion of the image data transfer.

S475-1: It sets the signal wave, by setting the N wave data in the register. The wave data set in the LLNN0 routine is the normal wave data, and, in the LLNN1 routine, is the inverted wave data.

S476: It initiates the line access with the normal wave or the inverted wave (timing (6)), by giving the wave data of the register to the registers CC1, CC2, SC1 and SC2 of the data output unit 600.

S477: It regulates the horizontal scanning period.

Thereafter the sequence proceeds to a routine LINVN0 or LINVN1, which is same as the routine LINVA0 or LINVA1 explained before and will not, therefore, be explained.

The access to a line with the N wave is repeated with the above-explained routine until the last line, where a routine FLLNN0 or FLLNN1 is activated.

Figure 46F:
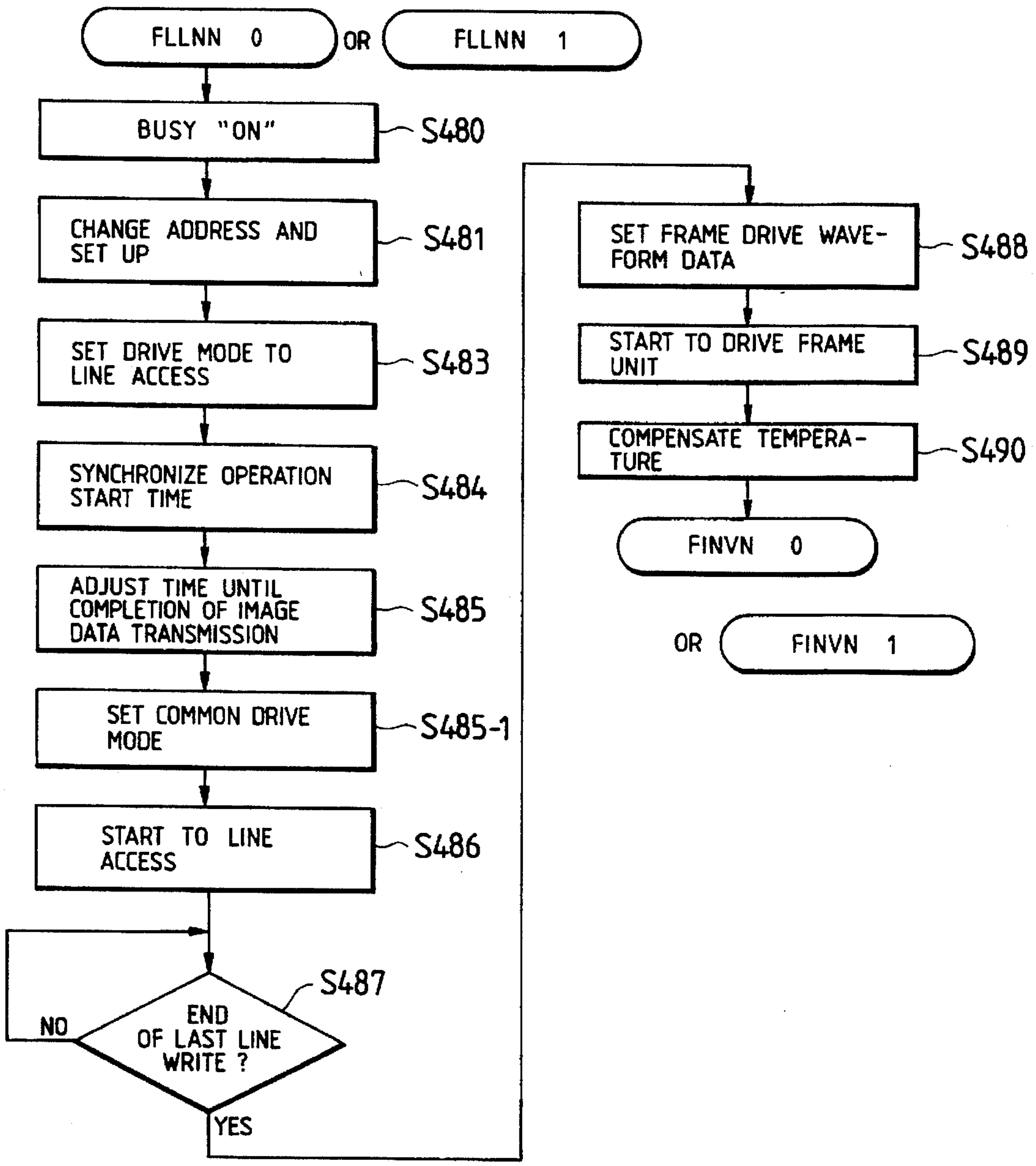
Figure 46G:
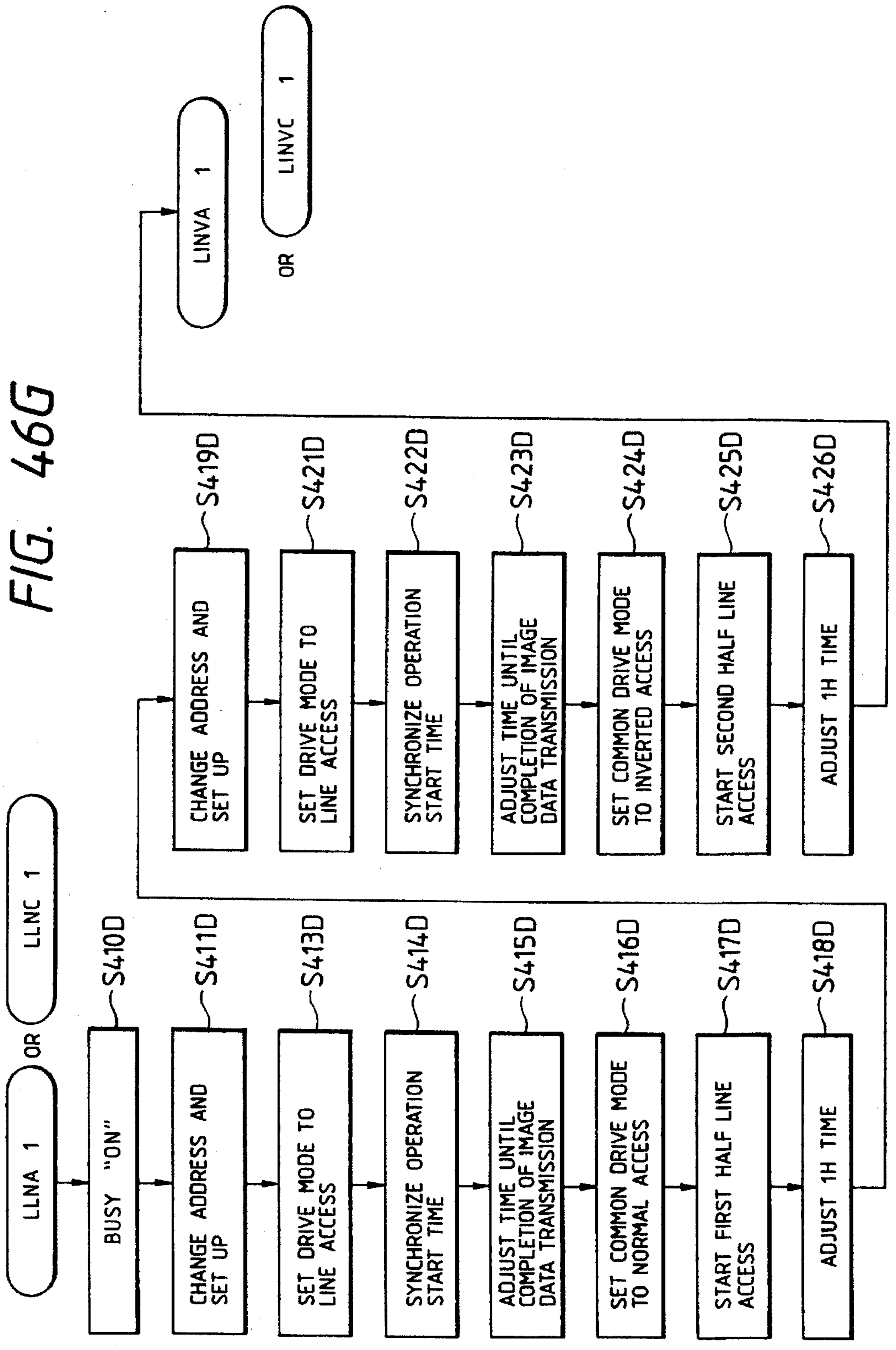
Figure 46H:
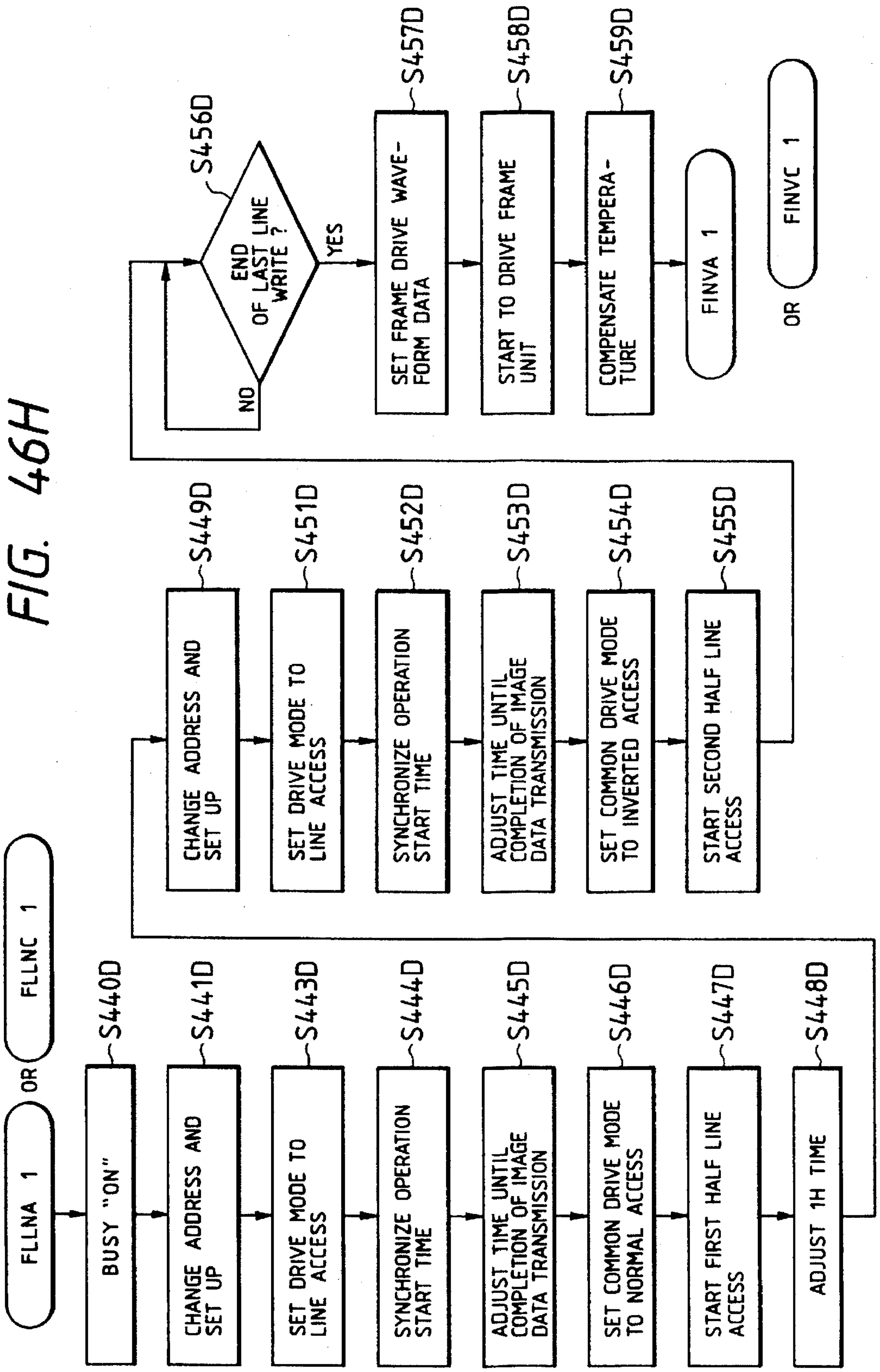
Figure 46J:
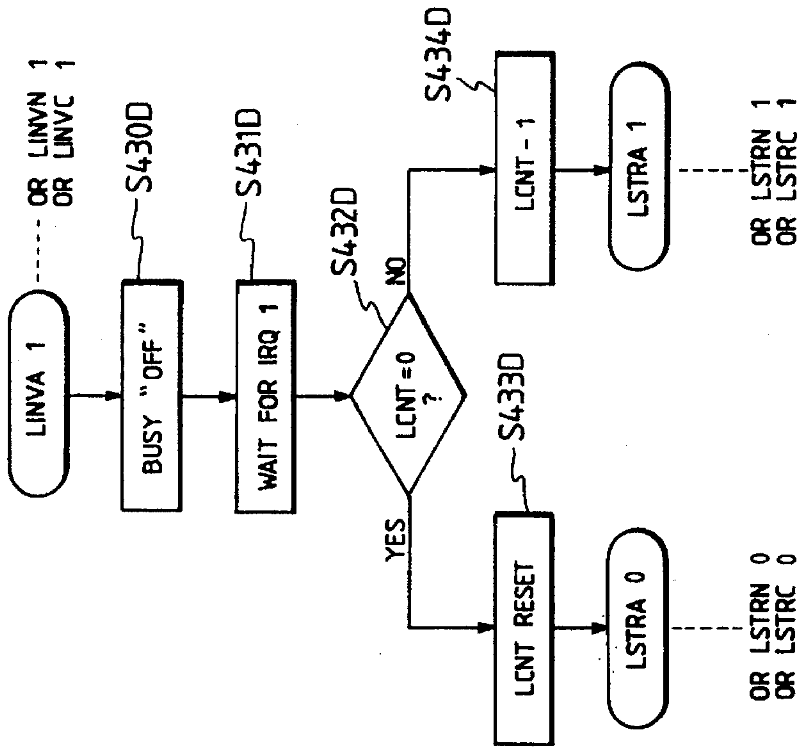
Figure 46I:
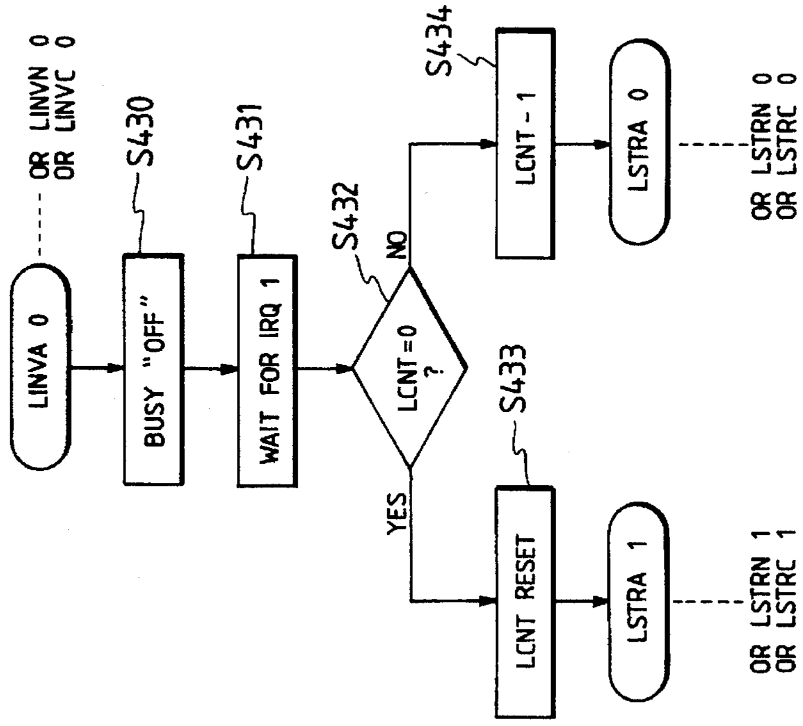
Figure 49D:
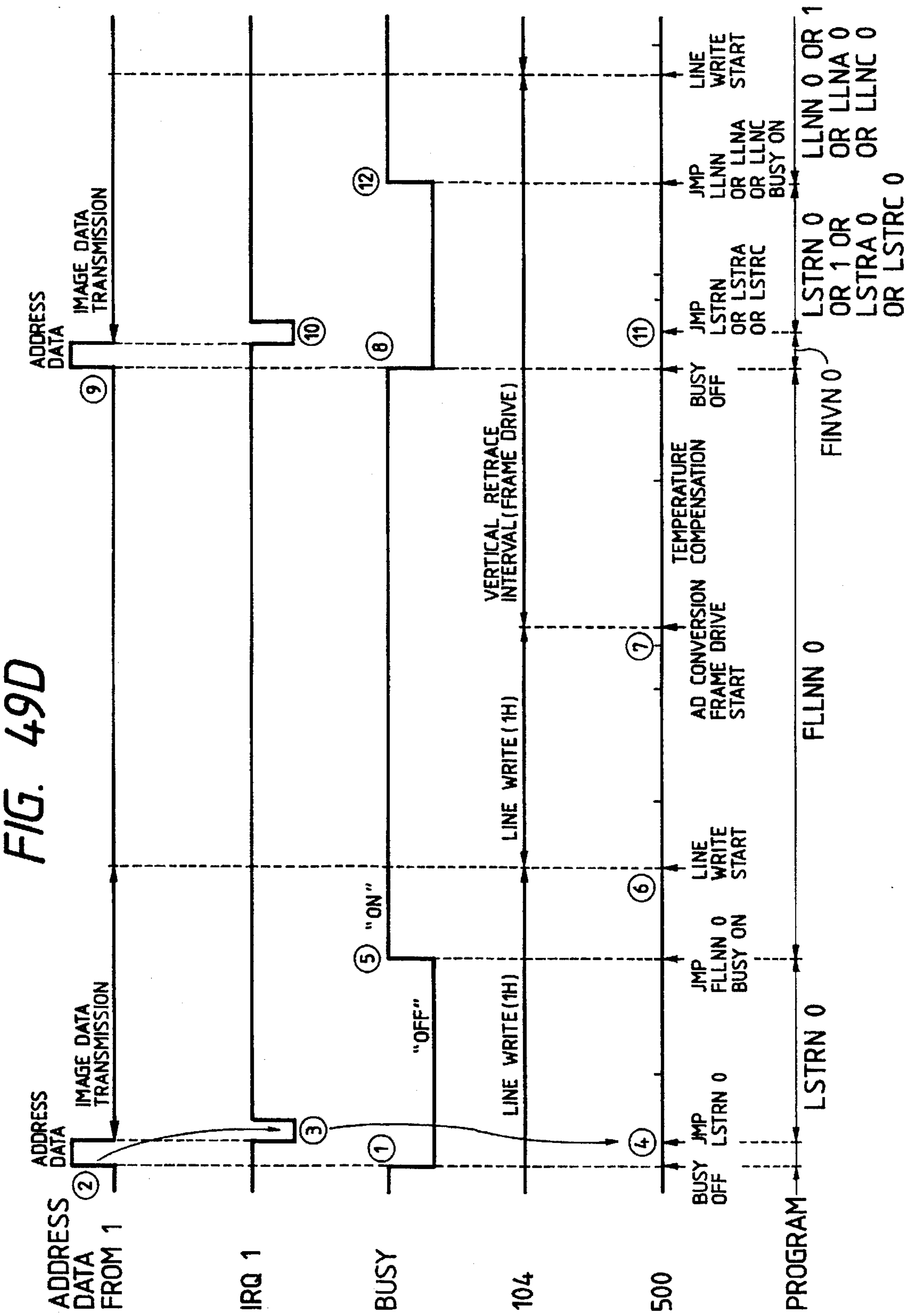
Figure 50A:
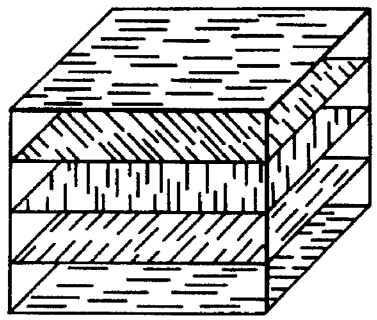
FIGS. 50A and 50B are schematic views of twisted nematic (TN) liquid crystal.
Figure 51:
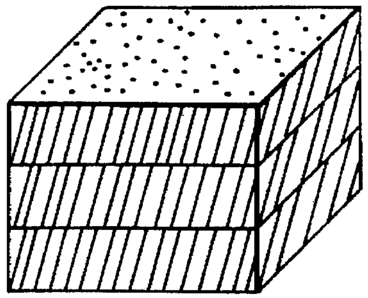
FIG. 51 is a schematic view of smectic C-phase (SmC*) liquid crystal.
Figure 50B:
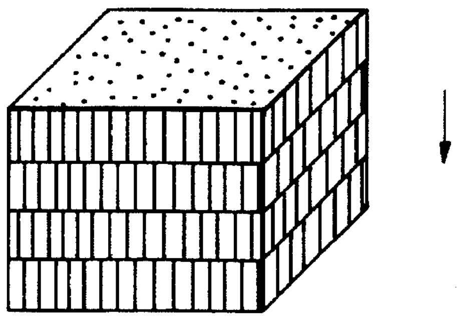
Figure 52:
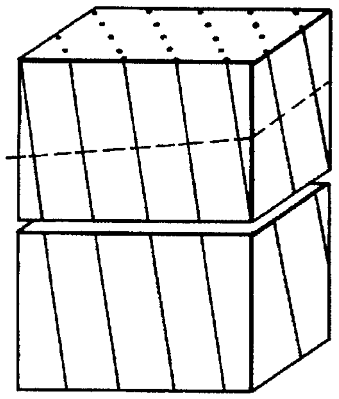
FIG. 52 is a schematic view of smectic H-phase (SmH*) liquid crystal.
Figure 53:
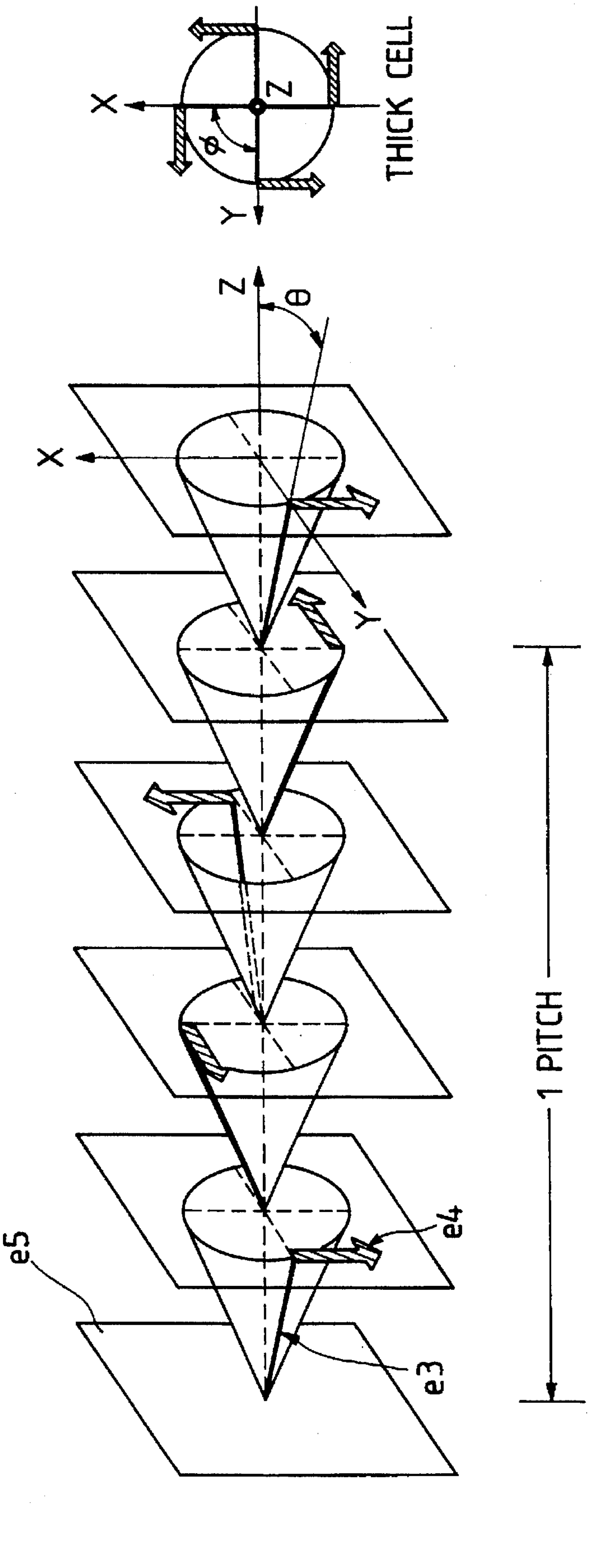
FIG. 53 is a schematic view of the structure of a ferroelectric liquid crystal (FLC) molecule.
Figure 54:
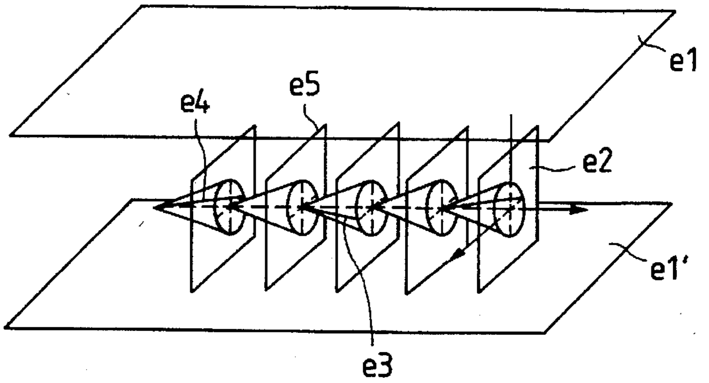
FIG. 54 is a schematic view of a display device employing ferroelectric liquid crystal.

The routine will be explained in the following, with reference to FIGS. 46F and 49D:

S480, S481, S483, S484, S485: These steps are similar to those already explained. They turn on the Busy signal (timing (5)), executes conversion and setting of the address, selects the line access mode, executes synchronization of the operation start time, and regulates the time until the completion of the image data transfer.

S485-1: It sets the wave form, as in the step S475-1. The wave data set in the FLLNN0 routine are the normal wave data, and those set in the FLLNN1 routine are inverted wave data.

S486: It starts the line access with the normal wave or the inverted wave, in a similar manner as in the step S476 (timing (6)).

S487, S488, S489, S490: These steps discriminate whether the writing of the last line in the effective display are has been completed, and, if completed, set the wave control data for the frame drive to be executed in the next step.

Then they start the drive of the frame 106 and the A/D conversion (timing (7)). The temperature compensation data are renewed simultaneously with the completion of the A/D conversion, and the sequence proceeds to a routine FINVN0 or FINVN1.

Figure 46L:
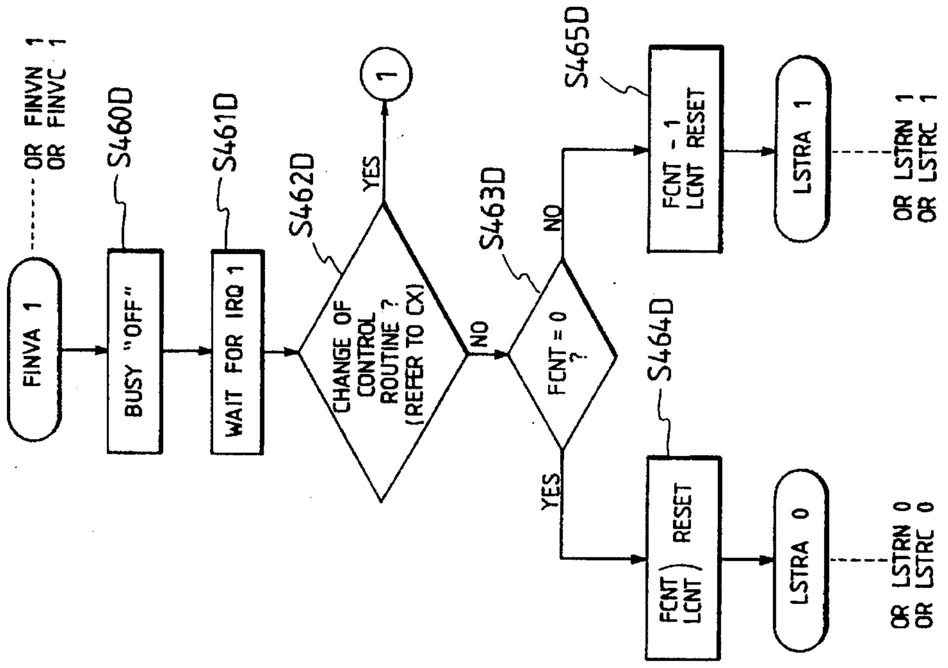
Figure 46K:
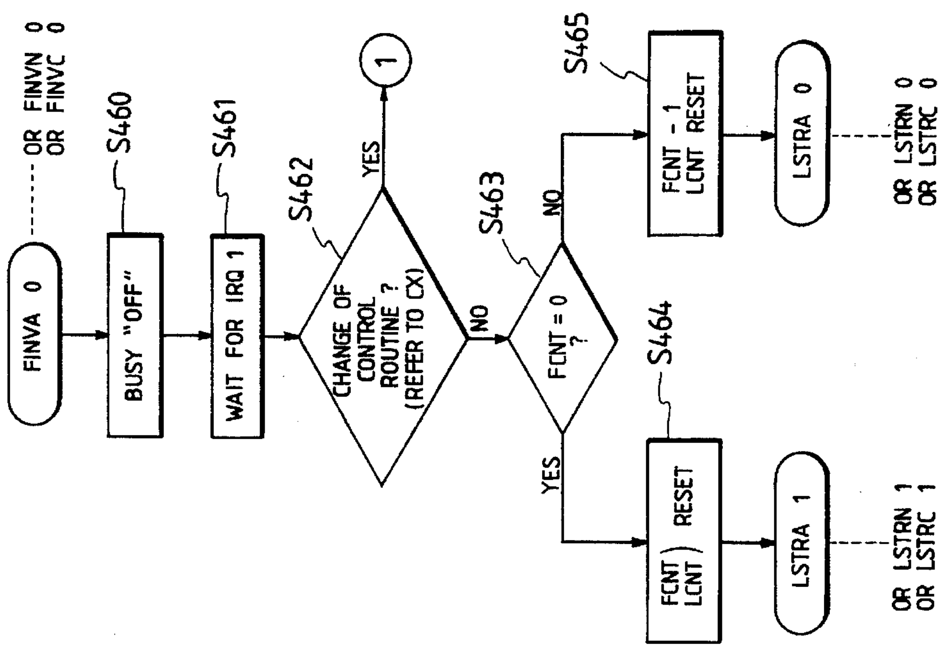

The FINVN0 and FINVN1 routines will not be explained further, as they are same as the routines already explained in FIGS. 46K and 46L.

(5.2.4) Power Supply Off

A PWOFF routine for the display control at the end of power supply is activated when the operator of the word processor 1 turns off the power supply for example with a key.

Figure 47:
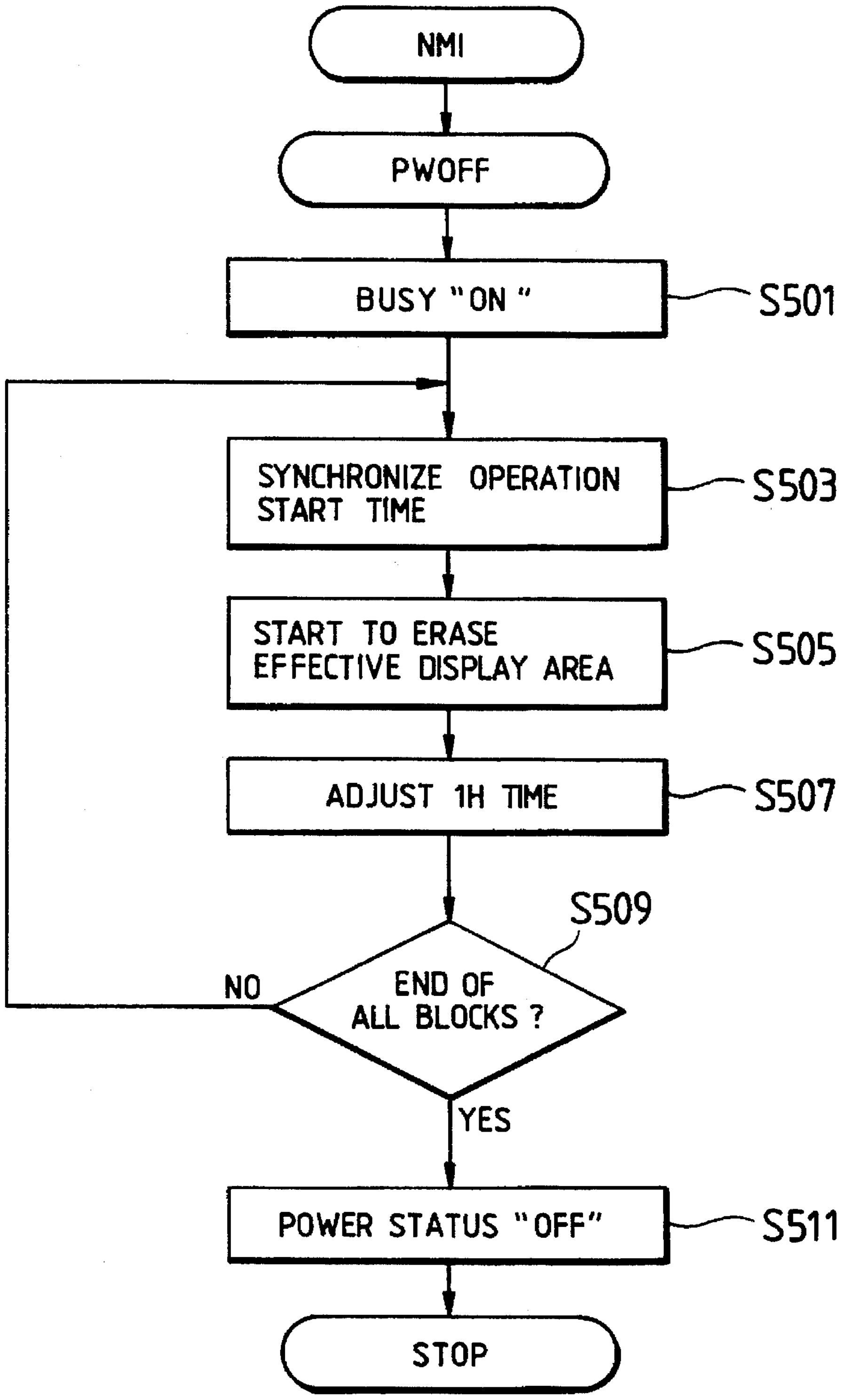
FIG. 47 is a flow chart showing an example of the detailed display control sequence at the turning-off of the power supply in the embodiment.

The display control will be explained in the following, with reference to the timing chart in FIG. 43, and the flow chart in FIG. 47.

When the operator actuates a key or the like for cutting off the power supply, the word processor 1 sends a $\overline{\text{PDOWN}}$ signal to the controller 500, whereby a non-maskable interruption request NMI is supplied to the CPU 501 of the controller 500, thereby activating the PWOFF routine. The request is an unconditional request, so that the following process is immediately started regardless of the process currently executed by the controller 500:

S501: It turns on the Busy signal and turns off the Light signal (FIG. 43: timing (8)).

S503: It executes synchronization of the operation start time, in a similar manner as explained before.

S505: It starts the drive of the effective display area 104 (timing (9)). The drive erases a block of the area 104 in a horizontal scanning period, as in the INIT routine. This drive erases the entire area 104 to "white" state, thereby improving the image quality as preparation for the next display.

S507: It regulates the horizontal scanning period, in a similar manner as already explained.

S509: The above-explained steps S503, S505 and S507 are executed at every erasure of a block. The present step discriminates whether all the blocks of the effective display area 104 have been erased.

S511: When the completion of erasure is identified in the step S509 (timing (10)), this step turns off the power status signal P ON/OFF and the Busy signal (timing (11)). The power supply to the entire display device, including the word processor 1, is cut off by the "OFF" state of the P ON/OFF signal (timing (12)).

(6) Effect of Embodiment

The above-explained embodiments provides following advantages:

(6.1) Effect of Frame Formation

In case a display device is formed with ferroelectric liquid crystal, the presence of the frame 106 on the display area 102 outside the effective display area 104 allows to not only prevent the deterioration in the aesthetic aspect of the display area 102 resulting from the unstability in the ferroelectric liquid crystal output the area 104, but also to prevent the unclear boundary of the display area 104 or the eventual error in perception of the operator.

Also the electrical frame formation by the frame electrodes positioned corresponding to the frame as in the present embodiment dispenses with the positional adjustment, in comparison with mechanical definition of the effective display area 104, for example by placing a metal or plastic frame on the display area 102 or applying coating thereon. It also avoids the dead angle which may result from the use of such mechanical member. The electrical frame formation also increases the flexibility, for example forming a frame with a color same or different from the background color of the effective display area 104.

(6.2) Effect of Temperature Compensation

The driving energy (voltage and pulse duration) of the ferroelectric liquid crystal corresponding to the effective display area 104 and the frame 106 is compensated according to the temperature immediately prior to the writing operation. It is therefore rendered possible to achieve stable drive regardless of the temperature, and to improve the reliability of the function of the display device utilizing ferroelectric liquid crystal.

Particularly if the renewal of the compensation data is conducted during the vertical flyback period as in the present embodiment, it is rendered possible to achieve highly efficient display. The efficiency of display can be further improved by driving the horizontal frames by the detected temperature data, namely the instruction from the A/D converter 950.

(6.3) Effect of Control responsive to Image Data Input

The present embodiment is capable not only of refreshing drive in which the display is refreshed continuously, regardless whether the content of display is altered or not, as in the display device lacking the memory property, but also of discontinuous drive in which the displayed data are renewed only when the content of display is altered, because there is provided means for awaiting the entry of image data from a host apparatus and the operation is started in response to the entry. Because such refereshing drive is possible, the specifications of the existing host apparatus scarcely require alteration. Also the possibility of discontinuous drive allows to reduce the power consumption, and further reduce the burden on the software or hardware of the host apparatus, as the data need to be supplied only when the display has to be altered.

Besides, since a busy signal is supplied to the host apparatus in response to the entry of image data of a unit (for example a line), there can be made various setting thereafter. In this respect, the host apparatus only requires an additional function of accepting the busy signal and suspending the transfer of the image data.

The function of the present embodiment is started or terminated according to the presence or absence of real address data supplied from the word processor 1 together with the image data. Besides the partial rewriting is made possible by identifying the block or line for access from the real address data. Furthermore the renewal of temperature compensation data in the refreshing drive is made possible during the vertical flyback period.

(6.4) Effect of presence of Display Drive Unit

It is made possible to appropriately drive the electrodes of the display device 100 utilizing ferroelectric liquid crystal (common lines, segment lines, frame common lines and frame segment lines) with various driving signal waves according to the signal wave data, as there are provided plural voltage supply lines for the electrodes, switches for connecting or disconnecting the supply lines with or from the electrodes, and means for shifting the switches according to the supplied signal wave data (common drive unit 300, segment drive unit 200 and frame drive unit 700).

Besides, as the signal wave data can be suitably modified in the course of control, it is rendered possible to effect the drive in block erasure, image formation, frame formation, image clearing etc. with suitable signal waves, with improved image quality.

(6.5) Effect of Forced Image Clear

It is rendered possible to start the use with a clear display area 102 or to easily confirm the termination of power supply, as the display area 102 of the ferroelectric liquid crystal display device 100 is cleared at the start and end of power supply.

Particularly the present embodiment is capable of the clearing operation by itself, without the supply of the clearing data (for example all white data) from the host apparatus at the start or end of the power supply, thereby alleviating the burden of the host apparatus and achieving high-speed clearing.

The self-clearing function can also be effectively applied, also during the function, by receiving an instruction from the host apparatus, instead of receiving the all white data.

(6.6) Effect of Presence of Power Supply Controller

Since the voltages supplied to the electrodes on the ferroelectric liquid crystal display device 100 is rendered variable, it is made possible to supply the electrodes with optimum voltage according to the conditions of temperature and drive.

Particularly the present embodiment is capable of supplying three different voltages (+, – and reference potential) to the common lines com, Fcom and similarly three different voltages to the segment lines seg, Fseg, thereby generating five kinds of voltages, Also the voltage regulation according to temperature etc. is made easier, since the ratios of the voltages are determined in advance with respect to a fixed value (VC) and the output voltages are determined by an output voltage, whereby five different voltages can be generated in response to a change in an output voltage.

The IC's used in the common drive elements are required to have a high voltage resistance, while those used in the segment drive elements are required to have a high speed. However, in the present embodiment, same IC's can be used for both purposes so that the manufacturing process can be simplified, as a voltage is fixed and the voltage change is conducted with a predetermined ratio with respect to the fixed voltage.

(6.7) Effect of Signal Wave Change and Inversion Drive

The operation characteristics in the line access mode can be averaged by dividing the usual temperature range of use, defining a suitable driving signal wave in each divided temperature range, and regulating the pulse duration and voltage in each driving signal wave according to the temperature.

Also the in-line inversion allows to bring the sum of driving energy to zero in the line, thereby ensuring stable state of the ferroelectric liquid crystal display device.

Also the MH inversion realizes to drive the mutually neighboring lines or mutually neighboring several lines in opposite phases, thereby preventing the operator from feeling wavyness on the display.

Besides the frame inversion displaces the timing of writing of a same color at the crossing point of the common line and the segment line. For example In FIG. 31A and FIG. 33A, the white data are written in the former half in the former case, but in the latter half in the latter case. Also at the point (segm×comn-1) in FIG. 37, the white data are written in the former half in 1F but in the latter half in 2F. Consequently the threshold characteristics of the display device for the writing in the former half are synthesized with that for the writing in the latter half, whereby the operation range on the V-ΔT is widened.

(7) Variation (7.1) Structure of Frame 106

The frame 106 is electrically formed in the present embodiment, but the present invention is not limited to such embodiment. It is also possible to cover a portion of the display area 102 corresponding to the frame 106 with a mechanical member such as plastic or by coating, thereby enabling to disregard the image quality outside the effective display area 104. Also, in case of electrical frame formation, there may be provided an independent frame driving system to enable the frame formation at a time. Furthermore, in case of electrical frame formation, the frame need not be of the same color as that of the background as explained above, but can be of the same color as that of the displayed data.

In the foregoing embodiment, the frame transparent electrodes 150, 151 are driven by the frame drive unit 700 which is independent from the drive units 200, 300, but it is also possible to provide a drive element same as or similar to the elements 210, 310 for the electrodes 150 and/or 151 and to drive these electrodes as a part of the drive control of the drive units 200, 300.

(7.2) Temperature Compensation and Partial Rewriting

In the foregoing embodiment, the temperature compensation is executed in the vertical flyback period, and such operation is made possible on the assumption that the address data and image data are periodically and continuously supplied (in refreshing mode). However, the timing of temperature compensation is not limited to the foregoing embodiment but can be suitably determined. Thus, if the address data of a particularly portion are intermittently transferred (in partial rewriting mode), there exists no vertical flyback period, so that the display control explained above is unable to execute the temperature compensation and may give rise to an unsatisfactory result.

It is therefore desirable, in the partial rewriting mode, to effect the temperature compensation at a constant interval. This can be achieved by generating the internal interruption request at a predetermined interval by means of a timer of the controller 500, thereby turning on the Busy signal and thereafter effecting the temperature compensation.

In order to realize the drive in the partial rewriting mode, the word processor is required to have a function of transferring the address data and image data of a particular portion, in addition to the functions explained in the foregoing embodiment. Furthermore, such drive is also possible by a structure in which, even if the address data are transferred in the refreshing mode as in the foregoing embodiment, the above-mentioned display control is activated only when the image data exist after the address data.

Furthermore, the temperature compensation can be made by suitable calculations, instead of the process utilizing a table, as explained in the foregoing embodiment.

(7.3) Horizontal Scanning Period and Driving Voltage

The relation between the temperature ranges and the corresponding frequency (or horizontal scanning period) or the driving voltage, shown in FIG. 9, is not limitative. A finer temperature compensation is possible, for example, by selecting narrower temperature ranges and appropriately determining the frequency and the driving voltage corresponding thereto.

(7.4) Setting of Signal Wave

In the foregoing embodiment, the signal wave data for image formation in the block access mode are not altered after they are once set in the register 630. It will however be apparent, in the system structure explained above, that the signal wave or the control data on the number of division of 1H can be altered at a suitable stage of the display control, and there can therefore be generated driving signal waves corresponding to various driving conditions.

It is furthermore possible, in the block access mode, not only to select the signal wave data according to the driving conditions as in the foregoing embodiment, but also to modify the signal wave data according to the temperature, thereby obtaining an optimum wave form. In such case, data for defining ΔT according to the temperature can be stored for example in an area EA00H–EE00H shown in FIG. 12, in a similar manner as other setting data, and the signal wave data can be altered in a procedure similar to that in the line access mode explained above. Also the device of the present invention can be utilized for determining an optimum wave form, when it is so designed as to enable arbitrary change of the wave form.

Furthermore, in the foregoing embodiment, the change of the signal wave is conducted in a program selected according to the temperature, but it can also be set by data reading utilizing a jumping table.

Furthermore, in the foregoing embodiment, the signal wave involving in-line inversion contains an interval of 1H*

However, the interval can be selected suitably, and it is also possible to generate a novel wave form by merging the normal wave and the inverted wave, if the interval is omitted. For instance, in the example shown in FIG. 34A, the omission of the interval provides a signal wave which assumes V1 in a first period 2ΔT, then V2 in a succeeding period 3ΔT, and V1 in a last period 1ΔT. In this manner it is rendered possible to combine arbitrary waves to generate another arbitrary wave of different optical response. Furthermore, the driving signal waves are not limited to those explained above, but arbitrary waves can be set even if they involve in-line inversion.

(7.5) Selection of Block Access or Line Access

In the foregoing embodiment, the selection of the block access or the line access, or, the selection of the interruption request $\overline{IRQ1}$ or $\overline{IRQ2}$, is made by the operator according to the mode of use or the form of data to be written. For example, if the size of a block on the display area 102 corresponds to the size of a row of characters to be displayed and if the data to be displayed consist solely of characters and numerals, the block access is effective in consideration of the easiness of each row of characters.

On the other hand, if the image to be displayed contains symbols of different sizes or graphic patterns, the line access will be more appropriate because the display or rewriting has to be made beyond the block size.

(7.6) Number of Scanning Lines

The foregoing embodiment has 20 scanning lines per block, and 400 scanning lines in total in the effective display area 104, but these numbers are not limitative. Since the foregoing embodiment, utilizing the ferroelectric liquid crystal display device, is free from the decrease in selection time/line even when the number of scanning lines is increased, it is possible to obtain a finer display or a larger display area by increasing the number of scanning lines.

(7.7) Erasure of Effective Display Area 104

For the initialization of the display area, the effective display area 104 is automatically erased at the start or end of power supply, without receiving the all white data from the word processor 1. However, it is naturally possible to execute such erasure only at the start or at the end of power supply. Also if the erasure of the entire effective display area becomes necessary in the course of display control in the block access mode or the line access mode, it is possible to execute such erasure without relying on the transferred data.

Such erasing operation can be made, for example, by generating a control signal such as an unconditional interruption from a key of the word processor 1, and thereby causing the controller 500 to erase the effective display area 104.

(7.8) Position of Temperature Sensor

The temperature sensor 400 is placed at a suitable position representing the temperature distribution of the ferroelectric liquid crystal experimentally determined in advance, but there may be employed plural temperature sensors for achieving more precise temperature detection.

(7.9) Display Device 100, Display Control Device 50, and Word Processor 1

The form of the signals exchanged between the word processor 1 and the control device 50, for example the signals D (including signals A/$\overline{D}$, image data and real address data), is not limited to that in the foregoing embodiment but can be suitably determined.

Also the foregoing embodiment has been limited to the display device and the display control system of a word processor, but the present invention is not restricted by such embodiment and is naturally applicable further, for example to the display of a computer terminal or the television.

Furthermore, the effective utilization of the memory property of the ferroelectric liquid crystal display device allows to build a display apparatus with a larger display area than in the conventional television apparatus.

Furthermore, the present invention is effectively applicable to the display of a still image, or an image with relatively few frequency of renewal. The present invention is particularly effective for power saving, when it is applied to a receiver for message television broadcasting or information services, a clock dial display or a 7-segment display for message display unit in various equipment, since the drive is needed only when the displayed image is to be altered.

In such case, the display area may be entirely renewed at the change of the display, or partly renewed in case of a partial change, in a similar manner as in the partial rewriting explained above. In these cases, the temperature compensation can be made by interruption of a fixed interval, so that the renewed image can be given with the corrected drive. If the interval of image renewal is long, or in case of a device capable of partial rewriting, the entire displayed image may be rewritten after the temperature compensation, for example by releasing the display data again from VRAM. In this manner uniform and satisfactory display quality can be always maintained over the entire display area.

What is claimed is:

1. A display control method for controlling a display device provided with a group of scanning electrodes and a group of signal electrodes and a display element placed therebetween, said display control method comprising the steps of:

applying, in accordance with information to be displayed, a non-zero first driving selection signal to a selected one of the group of scanning electrodes during a first period, and applying a non-zero second driving selection signal to the selected scanning electrode in a second period after the first period, each of the first and second driving selection signals being applied to the selected scanning electrode for enabling a writing operation while data signals are being applied to the group of signal electrodes, wherein the first and second periods both occur during a single horizontal scan period of a frame, wherein polarities of portions of the first driving signal are opposite to polarities of corresponding portions of the second driving signal, and wherein polarities of the first and second driving selection signals applied to a subsequent scanning electrode are inverted from polarities of the first and second driving selection signals, respectively, applied to at least one previous scanning electrode.

2. A display control device for controlling a display device having a group of scanning electrodes and a group of signal electrodes so positioned in a matrix form as to define a group of pixels, and a display element positioned between said group of scanning electrodes and said group of signal electrodes, said display control device comprising:

a signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving signals being applied to the selected scanning electrode for enabling a writing operation while data signals are being applied to the group of signal electrodes, wherein the first and second periods both occur during a single horizontal scan period of a frame, wherein the first and second periods are separated by a zero-voltage rest period, wherein polarities of portions of the first driving selection signal are opposite to polarities of corresponding portions of the second driving selection signal, and wherein said signal generator inverts the polarities of the first and second driving selection signals after all the scanning electrodes in the group have been selected at least once.

3. A display apparatus comprising:

a display device provided with a group of scanning electrodes and a group of signal electrodes and a display element placed therebetween;

display control means for controlling said display device; and a driving selection signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving selection signals being applied to the selected scanning electrode for enabling a writing operation while data signals are being applied to the group of signal electrodes, wherein the first and second periods both occur during a single horizontal scan period of a frame, wherein polarities of portions of the first driving selection signal are opposite to polarities of corresponding portions of the second driving selection signal, and wherein polarities of the driving selection signals applied to a subsequent scanning electrode are inverted from polarities of the first and second driving selection signals, respectively, applied to at least one previous scanning electrode.

4. A display control device for controlling a display device provided with a group of scanning electrodes and a group of signal electrodes and a display element placed therebetween, said display control device comprising:

a driving selection signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving selection signals being applied to the selected scanning electrode for enabling a writing operation while data signals are being applied to the group of signal electrodes; and a data supply means for supplying the information to be displayed, wherein the first and second periods both occur during a single horizontal scan period of a frame, wherein polarities of portions of the first driving selection signal are opposite to polarities of corresponding portions of the second driving selection signal, and wherein polarities of the first and second driving selection signals applied to a subsequent scanning electrode are inverted from polarities of the first and second driving selection signals, respectively, applied to at least one previous scanning electrode.

5. A display control device according to claim 4, wherein the display element comprises a ferroelectric liquid crystal.

6. A display control device for controlling a display device provided with a group of scanning electrodes and a group of signal electrodes and a display element placed therebetween, said display control device comprising:

a driving selection signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving selection signals being applied to the selected scanning electrode for enabling a writing operation while data signals are being applied to the group of signal electrodes, wherein the first and second periods both occur during a single horizontal scan period of a frame, wherein polarities of portions of the first driving selection signal are opposite to polarities of corresponding portions of the second driving selection signal, wherein the first and second driving selection signals are separated by a zero-voltage rest period, wherein the first driving selection signal comprises a bi-polar pulse, and wherein the second driving selection signal comprises a bi-polar pulse, and wherein a first pulse of the bi-polar pulse of the first driving selection signal has a longer duration than that of a second pulse of the bi-polar pulse of the first driving selection signal, and wherein a first pulse of the bi-polar pulse of the second driving selection signal has a longer duration than that of a second pulse of the bi-polar pulse of the second driving selection signal.

7. A display control device according to claim 6, wherein polarities of the first and second driving selection signals applied to a subsequent scanning electrode are inverted from polarities of the first and second driving selection signals, respectively, applied to at least one previous scanning electrode.

8. A display control device according to claim 6, wherein the display element comprises a ferroelectric liquid crystal.

9. A display control device for controlling a display device provided with a group of scanning electrodes and a group of signal electrodes and a display element placed therebetween, said display control device comprising:

a driving selection signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving selection signals being applied to the selected scanning electrode for enabling a writing operation while data signals are being applied to the group of signal electrodes, wherein the first and second periods both occur during a single horizontal scan period of a frame, wherein polarities of portions of the first driving selection signal are opposite to a polarities of corresponding portions of the second driving selection signal, and wherein polarities of the first and second driving selection signals applied to a subsequent scanning electrode are inverted from polarities of the first and second driving selection signals, respectively, applied to at least one previous scanning electrode.

10. A display control device according to claim 9, wherein the display element comprises a ferroelectric liquid crystal.

11. A display control device according to claim 9, wherein the first driving selection signal comprises a bi-polar pulse, and wherein the second driving selection signal comprises a bi-polar pulse.

12. A display control device according to claim 9, wherein the first and second driving selection signals separated by a zero-voltage rest period.

13. A display control device according to claim 12, wherein the data signal includes a zero-voltage rest period which starts simultaneously with the zero-voltage rest period between the two driving selection signals.

14. A display control device according to claim 12, wherein a section of the first driving selection signal immediately before the zero-voltage rest period has the same polarity as a section of the second driving selection signal immediately after the zero-voltage rest period.

15. A display control device according to claim 12, wherein the first driving selection signal comprises a bi-polar pulse, and wherein the second driving selection signal comprises a bi-polar pulse.

16. A display control device according to claim 15, wherein a first pulse of the bi-polar pulse of the first driving selection signal has a longer duration than that of a second pulse of the bi-polar pulse of the first driving selection signal, and wherein a first pulse of the bi-polar pulse of the second driving selection signal has a longer duration than that of a second pulse of the bi-polar pulse of the second driving selection signal.

17. A display control device for controlling a display device having a group of scanning electrodes and a group of signal electrodes so positioned in a matrix form as to define a group of pixels, and a display element positioned between said group of scanning electrodes and said group of signal electrodes, said display control device comprising:

a signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving signals being applied to the selected scanning electrode for enabling a writing operation while data signals are being applied to the group of signal electrodes, wherein the first and second periods both occur during a single horizontal scan period of a frame, wherein the first and second periods are separated by a zero-voltage rest period, wherein polarities of portions of the first driving selection signal are opposite to polarities of corresponding portions of the second driving selection signal, and wherein said signal generator inverts the polarities of the first and second driving selection signals applied to a subsequent scanning electrode from polarities of the first and second driving selection signals, respectively applied to at least one previous scanning electrode.

18. A display control device according to claim 17, wherein the display element comprises an optical modulating element having bistability characteristics when an electric field is applied.

19. A display control device according to claims 17 or 18, wherein the display element comprises a ferroelectric liquid crystal.

20. A display control device according to claim 17, wherein said signal generator inverts the polarity of the first and second driving selection signals during driving of the scanning electrodes.

21. A display control device according to claim 18, wherein said signal generator inverts the polarity of the first and second driving selection signals during driving of the scanning electrodes.

22. A display control device according to claim 19, wherein said signal generator inverts the polarity of the first and second driving selection signals during driving of the scanning electrodes.

23. A display control device according to claim 18, wherein said signal generator inverts the polarity of the driving selection signals after at least one scanning electrode has been selected.

24. A display control device according to claim 19, wherein said signal generator inverts the polarity of the driving selection signals applied to subsequent electrodes from a polarity of a driving selection signal applied to at least one previous scanning electrode.

25. A display control device according to claim 18, wherein said signal generator inverts the polarity of the driving selection signals after all the scanning electrodes in the group have been selected at least once.

26. A display control device according to claim 19, wherein said signal generator inverts the polarity of the driving selection signals after all the scanning electrodes in the group have been selected at least once.

27. A display control device according to claim 17, wherein the first driving selection signal comprises a bi-polar pulse, and wherein the second driving selection signal comprises a bi-polar pulse.

28. A display control device, for controlling a display device having a group of scanning electrodes and a group of signal electrodes, and a display element placed therebetween, said control device comprising:

a selecting signal generator for applying a non-zero first selecting signal to an n-th scanning electrode, when that electrode is selected from the group of scanning electrodes during a first frame, simultaneously with an application of a data signal to the group of signal electrodes, and for applying a non-zero second selecting signal to the n-th scanning electrode when that electrode is selected in a second frame after the first frame, wherein the second selecting signal is applied to an (n+1)th scanning electrode during the first frame and the first driving signal is applied to the (n+1)th scanning electrode during the second frame, wherein n is a predetermined positive integer, wherein each of the selecting signals is a two-phase signal in which each phase is a selection signal for enabling a writing operation, and wherein a a polarity of a portion of the first selecting signal before the rest period is opposite to a polarity of a corresponding portion of the second selecting signal after the rest period.

29. A display control device according to claim 28, wherein the display element comprises an optical modulating element having bistability characteristics when an electrical field is applied.

30. A display control device according to claims 28 or 29, wherein said optical modulating element comprises a ferroelectric liquid crystal element.

31. A display control device according to claim 28, wherein the first selecting signal comprises a bi-polar pulse, and wherein the second selecting signal comprises a bi-polar pulse.

32. A display control device according to claim 28, wherein the data signal comprises first and second portions separated by a zero-voltage rest period, and wherein the first and second selecting signals are separated by a zero-voltage rest period.

33. A display control device according to claim 32, wherein the zero-voltage rest period of the data signal and the zero-voltage rest period between the first and second selecting signals start simultaneously.

34. A display control device according to claim 32, wherein a section of the first selecting signal immediately before the zero-voltage rest period has the same polarity as a section of the second selecting signal immediately after the zero-voltage rest period.

35. A display control device according to claim 32, wherein the first selecting signal comprises a bi-polar pulse, and wherein the second selecting signal comprises a bi-polar pulse.

36. A display control device according to claim 35, wherein a first pulse of the bi-polar pulse of the first selecting signal has a longer duration than that of a second pulse of the bi-polar pulse of the first selecting signal, and wherein a first pulse of the bi-polar pulse of the second selecting signal has a longer duration than that of a second pulse of the bi-polar pulse of the second selecting signal.

37. A display control device for controlling a display device having a group of scanning electrodes and a group of signal electrodes so positioned in a matrix form as to define a group of pixels, and a display element positioned between said group of scanning electrodes and said group of signal electrodes, said display control device comprising:

a signal generator for applying, in accordance with information to be displayed, a non-zero first driving selection signal to a selected one of the group of scanning electrodes during a first period, and for applying a non-zero second driving selection signal to the selected scanning electrode in a second period after the first period, each of the first and second driving signals being applied to the selected scanning electrode for enabling a writing operation while data signals are being applied to the group of signal electrodes, wherein the first and second periods both occur during a single horizontal scan period of a frame, wherein the first and second periods are separated by a zero-voltage rest period, wherein polarities of portions of the first driving selection signals are opposite to polarities of corresponding portions of the second driving selection signals, and wherein the first and second driving selection signals are separated by a zero-voltage rest period.

38. A display control device according to claim 37, wherein the data signal includes a zero-voltage rest period which starts simultaneously with the zero-voltage rest period between the first and second driving selection signals.

39. A display control device according to claim 37, wherein a section of the first driving selection signal immediately before the zero-voltage rest period has the same polarity as a section of the second driving selection signal immediately after the zero-voltage rest period.

40. A display control device according to claim 37, wherein the first driving selection signal comprises a bi-polar pulse, and wherein the second driving selection signal comprises a bi-polar pulse.

41. A display control device according to claim 40, wherein a first pulse of the bi-polar pulse of the first driving selection signal has a longer duration than that of a second pulse of the bi-polar pulse of the first driving selection signal, and wherein a first pulse of the bi-polar pulse of the second driving selection signal has a longer duration than that of a second pulse of the bi-polar pulse of the second driving selection signal.

42. A display control device for controlling a display device provided with a group of scanning electrodes and a group of signal electrodes and a display element placed therebetween, said display control device comprising:

a scanning signal generator for applying a non-zero first scanning signal to a selected one of the group of scanning electrodes during a first period, and for applying a non-zero second scanning signal to the selected scanning electrode in a second period after the first period, each of the first and second scanning signals being applied to the selected scanning electrode for enabling a writing operation while a driving signal is being applied to a predetermined number of signal electrodes of the group of signal electrodes, wherein the first and second periods both occur during a single horizontal scan period of a frame, wherein the first and second periods are separated by a rest period, wherein polarities of portions of the first scanning signal are opposite to polarities of corresponding portions of the second scanning signal, and wherein polarities of the first and second scanning signals applied to a subsequent scanning electrode are inverted from polarities of the first and second scanning signals, respectively, applied to at least one previous scanning electrode.

43. A display control device according to claim 42, wherein the display element comprises an optical modulating element having bistability characteristics when an electric field is applied.

44. A display control device according to claim 42, wherein the display element comprises a ferroelectric liquid crystal.

45. A display control device according to claim 42, wherein said scanning signal generator inverts the polarities of the first and second scanning signals during driving of the scanning electrodes.

46. A display control device according to claim 42, wherein said scanning signal generator inverts the polarities of the first and second scanning signals applied to a subsequent scanning electrode from the respective polarities of the first and second scanning signals applied to at least one previous scanning electrode.

47. A display control device according to claim 42, wherein said scanning signal generator inverts the polarity of the scanning signals after all the scanning electrodes in the group have been selected at least once.

48. A display control device according to claim 43, wherein said scanning signal generator inverts the polarities of the first and second scanning signals during driving of the scanning electrodes.

49. A display control device according to claim 44, wherein said scanning signal generator inverts the polarity of the first and second scanning signals during driving of the scanning electrodes.

50. A display control device according to claim 43, wherein said scanning signal generator inverts the polarities of the first and second scanning signals after at least one scanning electrode has been selected.

51. A display control device according to claim 44, wherein said scanning signal generator inverts the polarities of the first and second scanning signals applied to subsequent electrodes from polarities of the first and second scanning signals, respectively, applied to at least one previous scanning electrode.

52. A display control device according to claim 43, wherein said scanning signal generator inverts the polarities of the first and second scanning signals after all the scanning electrodes in the group have been selected at least once.

53. A display control device according to claim 44, wherein said scanning signal generator inverts the polarities of the first and second scanning signals after all the scanning electrodes in the group have been selected at least once.

* * * * *

UNITED STATES PATENT AND TRADEMARK OFFICE
CERTIFICATE OF CORRECTION

PATENT NO. : 5,642,128

DATED : June 24, 1997

INVENTOR(S) : HIROSHI INOUE

It is certified that error appears in the above-identified patent and that said Letters Patent is hereby corrected as shown below:

ON THE TITLE PAGE:

AT [56] REFERENCES CITED

U.S. PATENT DOCUMENTS

Insert: --4,655,561 4/1987 Kanbe et al.--.

COLUMN 1

Line 38, "anitropy" should read --anisotropy--.

COLUMN 2

Line 66, "plates)el," should read --plates) el,--.

COLUMN 3

Line 55, "shogun)" should read --shown)--.

COLUMN 4

Line 5, "histability" should read --bistability--.

COLUMN 6

Line 12, "temperature." should read --temperature,--.

COLUMN 10

Line 66, "are" should read --is--.

UNITED STATES PATENT AND TRADEMARK OFFICE

CERTIFICATE OF CORRECTION

PATENT NO. : 5,642,128

DATED : June 24, 1997

INVENTOR(S) : HIROSHI INOUE

It is certified that error appears in the above-identified patent and that said Letters Patent is hereby corrected as shown below:

COLUMN 11

Line 30, "suitable" should read --suitably--.

COLUMN 14

Line 41, "usually" should read --usual--;
Line 53, "is conducted" should be deleted; and
Line 64, "BLK1,BLKm" should read --BLK1, ..., BLKm--.

COLUMN 17

Table continued, "RD" should read --$\overline{RD}$-- and
"WR" should read --$\overline{WR}$--.

COLUMN 21

Line 59, "to" should be deleted.

COLUMN 22

Line 13, "selecton." should read --selection.--; and
Line 59, "AT." should read --ΔT--.

COLUMN 23

Line 32, "DO-D3" should read --D0-D3--.

COLUMN 26

Line 43, "displav" should read --display--.

UNITED STATES PATENT AND TRADEMARK OFFICE
CERTIFICATE OF CORRECTION

PATENT NO. : 5,642,128

DATED : June 24, 1997

INVENTOR(S) : HIROSHI INOUE

It is certified that error appears in the above-identified patent and that said Letters Patent is hereby corrected as shown below:

COLUMN 29

Line 11, "Seg," should read --seg,--; and
Line 65, "Portions" should read --portions--.

COLUMN 32

Line 25, "24T," should read --2ΔT,--.

COLUMN 33

Line 2, "field (iF)" should read --field (1F)--.

COLUMN 35

Line 61, "$\overline{\text{IRQ}}$" should read --$\overline{\text{IRQ2}}$--.

COLUMN 36

Line 41, "onto" should read --on to--.

COLUMN 41

Line 55, "start" should read --starts--.

COLUMN 44

Line 1, "start" should read --starts--.

UNITED STATES PATENT AND TRADEMARK OFFICE

CERTIFICATE OF CORRECTION

PATENT NO. : 5,642,128

DATED : June 24, 1997

INVENTOR(S) : HIROSHI INOUE

It is certified that error appears in the above-identified patent and that said Letters Patent is hereby corrected as shown below:

COLUMN 46

Line 16, "turns" should read --turn--;
Line 17, "executes" should read --execute-- and "selects" should read --select--;
Line 18, "executes" should read --execute--; and
Line 19, "regulates" should read --regulate--.

COLUMN 48

Line 8, "whether" should read --of whether--; and
Line 22, "setting" should read --settings--.

COLUMN 49

Line 35, "wavyness" should read --waviness--.

COLUMN 52

Line 7, "few" should read --low--.

COLUMN 54

Line 63, "a" should be deleted.

UNITED STATES PATENT AND TRADEMARK OFFICE

CERTIFICATE OF CORRECTION

PATENT NO. : 5,642,128

DATED : June 24, 1997

INVENTOR(S) : HIROSHI INOUE

It is certified that error appears in the above-identified patent and that said Letters Patent is hereby corrected as shown below:

COLUMN 55

Line 9, "separated" should read --are separated--.

COLUMN 56

Line 53, "a" (first occurrence) should be deleted.

Signed and Sealed this

Seventeenth Day of March, 1998

Attest:

BRUCE LEHMAN

*Attesting Officer*

*Commissioner of Patents and Trademarks*